(12) United States Patent
Coowar et al.

(10) Patent No.: US 9,368,836 B2
(45) Date of Patent: *Jun. 14, 2016

(54) ADDITIVE FOR LITHIUM ION RECHARGEABLE BATTERY CELLS

(71) Applicant: Nexeon Ltd., Oxfordshire (GB)

(72) Inventors: Fazlil Coowar, Southampton (GB); Mamdouh Elsayed Abdelsalam, Southampton, GA (US); Michael Jonathan Lain, Oxon (GB)

(73) Assignee: Nexeon Ltd., Oxfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/567,242

(22) Filed: Dec. 11, 2014

(65) Prior Publication Data

US 2015/0093653 A1   Apr. 2, 2015

Related U.S. Application Data

(63) Continuation of application No. 13/265,464, filed as application No. PCT/GB2011/000856 on Jun. 7, 2011, now Pat. No. 8,945,774.

(30) Foreign Application Priority Data

Jun. 7, 2010 (GB) .................................. 1009519.8

(51) Int. Cl.
*H01M 6/16* (2006.01)
*H01M 4/58* (2010.01)
(Continued)

(52) U.S. Cl.
CPC .......... *H01M 10/0567* (2013.01); *H01M 4/134* (2013.01); *H01M 4/38* (2013.01);
(Continued)

(58) Field of Classification Search
CPC .............. H01M 10/056; H01M 4/134; H01M 10/0525; H01M 10/05; Y02E 60/122
USPC ....................................... 429/338, 231.8, 232
See application file for complete search history.

(56) References Cited

U.S. PATENT DOCUMENTS 3,351,445 A   11/1967   Fielder et al.
4,002,541 A   1/1977    Streander
(Continued)

FOREIGN PATENT DOCUMENTS

CN   1447916 A   10/2003
CN   1821446 A   8/2006
(Continued)

OTHER PUBLICATIONS

Badel et al., "Formation of Ordered Pore Arrays at the Nanoscale by Electrochemical Etching of N-Type Silicon", Superlattices and Microstructures, 36 (2004) 245-253.
(Continued)

*Primary Examiner* — M'Baye Diao
(74) *Attorney, Agent, or Firm* — Fay Sharpe LLP

(57) ABSTRACT

A lithium ion rechargeable battery cell includes an anode having electroactive material-containing particles wherein the electroactive material is selective from one or more of silicon, germanium, and tin. A cathode includes an active material adapted to incorporate lithium and also to liberate lithium electrochemically. The anode is adapted to incorporate lithium during lithiation. Also provided is an electrolyte, wherein the electrolyte includes both a cyclic carbonate having a vinyl group and a fluorinated cyclic carbonate. The total amount of the cyclic carbonate including a vinyl group and the fluorinated cyclic carbonate together is in the range of 3.5 wt % to 70 wt % based on the total weight of the electrolyte solution.

22 Claims, 14 Drawing Sheets

(51) Int. Cl.

| | |
|---|---|
| *H01M 4/62* | (2006.01) |
| *H01M 10/0567* | (2010.01) |
| *H01M 4/134* | (2010.01) |
| *H01M 10/0525* | (2010.01) |
| *H01M 10/056* | (2010.01) |
| *H01M 10/0566* | (2010.01) |
| *H01M 10/0568* | (2010.01) |
| *H01M 10/0569* | (2010.01) |
| *H02J 7/00* | (2006.01) |
| *H01M 4/38* | (2006.01) |
| *H01M 10/44* | (2006.01) |

(52) U.S. Cl.
CPC ............ *H01M 4/386* (2013.01); *H01M 4/387* (2013.01); *H01M 10/056* (2013.01); *H01M 10/0525* (2013.01); *H01M 10/0566* (2013.01); *H01M 10/0568* (2013.01); *H01M 10/0569* (2013.01); *H02J 7/0052* (2013.01); *H01M 10/44* (2013.01); *H01M 2300/0025* (2013.01); *H01M 2300/0034* (2013.01); *Y02E 60/122* (2013.01)

(56) References Cited

U.S. PATENT DOCUMENTS

| | | | |
|---|---|---|---|
| 4,436,796 A | 3/1984 | Huggins et al. | |
| 4,950,566 A | 8/1990 | Huggins et al. | |
| 5,260,148 A | 11/1993 | Idota | |
| 5,262,021 A | 11/1993 | Lehmann et al. | |
| 5,660,948 A | 8/1997 | Barker | |
| 5,907,899 A | 6/1999 | Dahn et al. | |
| 5,980,722 A | 11/1999 | Kuroda et al. | |
| 6,022,640 A | 2/2000 | Takada et al. | |
| 6,042,969 A | 3/2000 | Yamada et al. | |
| 6,063,995 A | 5/2000 | Bohland et al. | |
| 6,190,951 B1 | 2/2001 | Nakahori et al. | |
| 6,235,427 B1 | 5/2001 | Idota et al. | |
| 6,296,969 B1 | 10/2001 | Yano et al. | |
| 6,334,939 B1 | 1/2002 | Zhou et al. | |
| 6,337,156 B1 | 1/2002 | Narang et al. | |
| 6,353,317 B1 | 3/2002 | Green et al. | |
| 6,399,177 B1 | 6/2002 | Fonash et al. | |
| 6,399,246 B1 | 6/2002 | Vandayburg et al. | |
| 6,589,696 B2 | 7/2003 | Matsubara et al. | |
| 6,605,386 B1 | 8/2003 | Kasamatsu et al. | |
| 6,620,547 B1 | 9/2003 | Sung et al. | |
| 6,815,123 B2 * | 11/2004 | Sun .................... | B01D 39/1692 210/500.21 |
| 6,887,511 B1 | 5/2005 | Shima et al. | |
| 6,916,679 B2 | 7/2005 | Snyder et al. | |
| 7,033,936 B1 | 4/2006 | Green | |
| 7,051,945 B2 | 5/2006 | Empedocles et al. | |
| 7,070,632 B1 | 7/2006 | Visco et al. | |
| 7,094,499 B1 | 8/2006 | Hung | |
| 7,144,655 B2 * | 12/2006 | Jenson .................. | A61N 1/3787 429/162 |
| 7,147,894 B2 | 12/2006 | Zhou et al. | |
| 7,192,673 B1 | 3/2007 | Ikeda et al. | |
| 7,311,999 B2 | 12/2007 | Kawase et al. | |
| 7,318,982 B2 | 1/2008 | Gozdz et al. | |
| 7,348,102 B2 | 3/2008 | Li et al. | |
| 7,358,011 B2 | 4/2008 | Fukuoka et al. | |
| 7,378,041 B2 | 5/2008 | Asao et al. | |
| 7,425,285 B2 | 9/2008 | Asao et al. | |
| 7,476,469 B2 | 1/2009 | Ota et al. | |
| 7,569,202 B2 | 8/2009 | Farrell et al. | |
| 7,659,034 B2 | 2/2010 | Minami et al. | |
| 7,674,552 B2 | 3/2010 | Nakai et al. | |
| 7,767,346 B2 | 8/2010 | Kim et al. | |
| 7,862,933 B2 | 1/2011 | Okumura et al. | |
| 7,879,734 B2 | 2/2011 | Fukutani et al. | |
| 8,034,485 B2 | 10/2011 | Dahn et al. | |
| 8,585,918 B2 | 11/2013 | Green et al. | |
| 8,597,831 B2 | 12/2013 | Green et al. | |
| 8,772,174 B2 | 7/2014 | Green et al. | |
| 2001/0023986 A1 | 9/2001 | Mancevski | |
| 2002/0074972 A1 | 6/2002 | Narang et al. | |
| 2002/0148727 A1 | 10/2002 | Zhou et al. | |
| 2003/0135989 A1 | 7/2003 | Huggins et al. | |
| 2004/0072067 A1 | 4/2004 | Minami et al. | |
| 2004/0126659 A1 | 7/2004 | Graetz et al. | |
| 2004/0151987 A1 | 8/2004 | Kawase et al. | |
| 2004/0166319 A1 | 8/2004 | Li et al. | |
| 2004/0185346 A1 | 9/2004 | Takeuchi et al. | |
| 2004/0197660 A1 | 10/2004 | Sheem et al. | |
| 2004/0214085 A1 | 10/2004 | Sheem et al. | |
| 2004/0224231 A1 | 11/2004 | Fujimoto et al. | |
| 2004/0241548 A1 | 12/2004 | Nakamoto et al. | |
| 2005/0042515 A1 | 2/2005 | Hwang et al. | |
| 2005/0079414 A1 | 4/2005 | Yamamoto et al. | |
| 2005/0079420 A1 | 4/2005 | Cho et al. | |
| 2005/0118503 A1 | 6/2005 | Honda et al. | |
| 2005/0191550 A1 | 9/2005 | Satoh et al. | |
| 2005/0193800 A1 | 9/2005 | DeBoer et al. | |
| 2005/0214644 A1 | 9/2005 | Aramata et al. | |
| 2006/0003226 A1 | 1/2006 | Sawa et al. | |
| 2006/0019115 A1 | 1/2006 | Wang et al. | |
| 2006/0019168 A1 | 1/2006 | Li et al. | |
| 2006/0024582 A1 | 2/2006 | Li et al. | |
| 2006/0051670 A1 | 3/2006 | Aramata et al. | |
| 2006/0057463 A1 | 3/2006 | Gao et al. | |
| 2006/0088767 A1 | 4/2006 | Li et al. | |
| 2006/0097691 A1 | 5/2006 | Green | |
| 2006/0134516 A1 | 6/2006 | Im et al. | |
| 2006/0134518 A1 | 6/2006 | Kogetsu et al. | |
| 2006/0147800 A1 | 7/2006 | Sato et al. | |
| 2006/0154071 A1 | 7/2006 | Homma et al. | |
| 2006/0166093 A1 | 7/2006 | Zaghib et al. | |
| 2006/0175704 A1 | 8/2006 | Shimizu et al. | |
| 2006/0257307 A1 | 11/2006 | Yang | |
| 2006/0263687 A1 | 11/2006 | Leitner et al. | |
| 2006/0275663 A1 | 12/2006 | Matsuno et al. | |
| 2006/0275668 A1 | 12/2006 | Peres et al. | |
| 2006/0286448 A1 | 12/2006 | Snyder et al. | |
| 2007/0003835 A1 | 1/2007 | Hasegawa et al. | |
| 2007/0026313 A1 | 2/2007 | Sano | |
| 2007/0031733 A1 | 2/2007 | Kogetsu et al. | |
| 2007/0037063 A1 | 2/2007 | Choi et al. | |
| 2007/0048609 A1 | 3/2007 | Ueda et al. | |
| 2007/0059598 A1 | 3/2007 | Yang | |
| 2007/0065720 A1 | 3/2007 | Hasegawa et al. | |
| 2007/0072074 A1 | 3/2007 | Yamamoto et al. | |
| 2007/0087268 A1 | 4/2007 | Kim et al. | |
| 2007/0099084 A1 | 5/2007 | Huang et al. | |
| 2007/0099085 A1 | 5/2007 | Choi et al. | |
| 2007/0105017 A1 | 5/2007 | Kawase et al. | |
| 2007/0117018 A1 | 5/2007 | Huggins | |
| 2007/0122702 A1 | 5/2007 | Sung et al. | |
| 2007/0148544 A1 | 6/2007 | Le | |
| 2007/0172732 A1 | 7/2007 | Jung et al. | |
| 2007/0184345 A1 | 8/2007 | Neudecker et al. | |
| 2007/0190413 A1 | 8/2007 | Lee et al. | |
| 2007/0202395 A1 | 8/2007 | Snyder et al. | |
| 2007/0202402 A1 | 8/2007 | Asahina et al. | |
| 2007/0207080 A1 | 9/2007 | Yang | |
| 2007/0207385 A1 | 9/2007 | Liu et al. | |
| 2007/0209584 A1 | 9/2007 | Kalynushkin et al. | |
| 2007/0212538 A1 | 9/2007 | Niu | |
| 2007/0218366 A1 | 9/2007 | Kalynushkin et al. | |
| 2007/0224508 A1 | 9/2007 | Aramata et al. | |
| 2007/0224513 A1 | 9/2007 | Kalynushkin et al. | |
| 2007/0238021 A1 | 10/2007 | Liu et al. | |
| 2007/0243469 A1 | 10/2007 | Kim et al. | |
| 2007/0264564 A1 | 11/2007 | Johnson et al. | |
| 2007/0264574 A1 | 11/2007 | Kim et al. | |
| 2007/0269718 A1 | 11/2007 | Krause et al. | |
| 2007/0277370 A1 | 12/2007 | Kalynushkin et al. | |
| 2008/0003496 A1 | 1/2008 | Neudecker et al. | |
| 2008/0003503 A1 | 1/2008 | Kawakami et al. | |
| 2008/0020281 A1 | 1/2008 | Kogetsu et al. | |
| 2008/0038638 A1 | 2/2008 | Zhang et al. | |
| 2008/0090149 A1 | 4/2008 | Sano et al. | |

(56) References Cited

U.S. PATENT DOCUMENTS

| | | |
|---|---|---|
| 2008/0096110 A1 | 4/2008 | Bito et al. |
| 2008/0107967 A1 | 5/2008 | Liu et al. |
| 2008/0113271 A1 | 5/2008 | Ueda et al. |
| 2008/0118834 A1 | 5/2008 | Yew et al. |
| 2008/0124631 A1 | 5/2008 | Fukui et al. |
| 2008/0131782 A1 | 6/2008 | Hagiwara et al. |
| 2008/0138710 A1 | 6/2008 | Liaw et al. |
| 2008/0138716 A1 | 6/2008 | Iwama et al. |
| 2008/0145752 A1 | 6/2008 | Hirose et al. |
| 2008/0145759 A1 | 6/2008 | Sung et al. |
| 2008/0160415 A1 | 7/2008 | Wakita et al. |
| 2008/0176139 A1 | 7/2008 | White et al. |
| 2008/0206631 A1 | 8/2008 | Christensen et al. |
| 2008/0206641 A1 | 8/2008 | Christensen et al. |
| 2008/0233479 A1 | 9/2008 | Sung et al. |
| 2008/0233480 A1 | 9/2008 | Sung et al. |
| 2008/0241647 A1 | 10/2008 | Fukui et al. |
| 2008/0241703 A1 | 10/2008 | Yamamoto et al. |
| 2008/0248250 A1 | 10/2008 | Flemming et al. |
| 2008/0261112 A1 | 10/2008 | Nagata et al. |
| 2008/0305391 A1 | 12/2008 | Hirose et al. |
| 2009/0053589 A1 | 2/2009 | Obrovac et al. |
| 2009/0078982 A1 | 3/2009 | Rachmady et al. |
| 2009/0087731 A1 | 4/2009 | Fukui et al. |
| 2009/0101865 A1 | 4/2009 | Matsubara et al. |
| 2009/0117466 A1 | 5/2009 | Zhamu |
| 2009/0186267 A1 | 7/2009 | Tiegs |
| 2009/0239151 A1 | 9/2009 | Nakanishi et al. |
| 2009/0253033 A1 | 10/2009 | Hirose et al. |
| 2009/0269677 A1 | 10/2009 | Hirose et al. |
| 2009/0305129 A1 | 12/2009 | Fukui et al. |
| 2010/0085685 A1 | 4/2010 | Pinwill |
| 2010/0092868 A1 | 4/2010 | Kim et al. |
| 2010/0124707 A1 | 5/2010 | Hirose et al. |
| 2010/0136437 A1 | 6/2010 | Nishida et al. |
| 2010/0196760 A1 | 8/2010 | Green |
| 2010/0285358 A1 | 11/2010 | Cui et al. |
| 2010/0297502 A1 | 11/2010 | Zhu et al. |
| 2010/0330419 A1 | 12/2010 | Cui et al. |
| 2011/0104480 A1 | 5/2011 | Malekos et al. |
| 2011/0250498 A1 | 10/2011 | Green et al. |

FOREIGN PATENT DOCUMENTS

| | | |
|---|---|---|
| CN | 101266919 A | 9/2008 |
| CN | 101371381 A | 2/2009 |
| CN | 101442124 A | 5/2009 |
| CN | 101471457 A | 7/2009 |
| DE | 199 22 257 A1 | 11/2000 |
| DE | 103 47 570 A1 | 5/2005 |
| EP | 0 281 115 | 9/1988 |
| EP | 0 553 465 A1 | 8/1993 |
| EP | 0 820 110 A2 | 1/1998 |
| EP | 1 011 160 A1 | 6/2000 |
| EP | 0 936 687 B1 | 12/2001 |
| EP | 1 231 653 A1 | 8/2002 |
| EP | 1 231 654 A1 | 8/2002 |
| EP | 1 258 937 A1 | 11/2002 |
| EP | 1 083 614 B1 | 5/2003 |
| EP | 1 313 158 A2 | 5/2003 |
| EP | 1 335 438 A1 | 8/2003 |
| EP | 1 289 045 B1 | 3/2006 |
| EP | 1 657 769 A1 | 5/2006 |
| EP | 1 850 409 A1 | 10/2007 |
| EP | 1 771 899 B1 | 2/2008 |
| EP | 1 657 768 B1 | 5/2008 |
| EP | 2 058 882 | 5/2009 |
| EP | 2 204 868 A3 | 7/2010 |
| FR | 2 885 913 B1 | 8/2007 |
| GB | 0 980 513 | 1/1965 |
| GB | 1 014 706 | 12/1965 |
| GB | 2 395 059 A | 5/2004 |
| GB | 2 464 157 B | 1/2010 |
| GB | 2 464 158 | 4/2010 |
| JP | 02-209492 A | 8/1990 |
| JP | 06-283156 | 10/1994 |
| JP | 10-046366 | 2/1998 |
| JP | 10-083817 | 3/1998 |
| JP | 10-199524 | 7/1998 |
| JP | 2000-003727 | 1/2000 |
| JP | 2000-173594 | 6/2000 |
| JP | 2000-348730 A | 12/2000 |
| JP | 2001-291514 | 10/2001 |
| JP | 2002-279974 A | 9/2002 |
| JP | 2002260637 A | 9/2002 |
| JP | 2002-313319 A | 10/2002 |
| JP | 2002313345 A | 10/2002 |
| JP | 2003-017040 | 1/2003 |
| JP | 2003-168426 | 6/2003 |
| JP | 2003522367 A | 7/2003 |
| JP | 04-607488 | 2/2004 |
| JP | 2004-071305 | 3/2004 |
| JP | 2004-095264 | 3/2004 |
| JP | 2004-214054 | 7/2004 |
| JP | 2004-281317 | 10/2004 |
| JP | 2004-296386 A | 10/2004 |
| JP | 2004-533699 A | 11/2004 |
| JP | 2005-310759 A | 11/2005 |
| JP | 2006-505901 A | 2/2006 |
| JP | 2006-276214 | 10/2006 |
| JP | 2006-290938 | 10/2006 |
| JP | 2006-335410 | 12/2006 |
| JP | 2007080827 A | 3/2007 |
| JP | 2007-165079 A | 6/2007 |
| JP | 2007318057 A | 12/2007 |
| JP | 2008-034266 | 2/2008 |
| JP | 2008-186732 | 8/2008 |
| JP | 2008210618 A | 9/2008 |
| JP | 2008-234988 | 10/2008 |
| JP | 2008-235258 A | 10/2008 |
| JP | 2008277000 A | 11/2008 |
| JP | 2009523923 A | 6/2009 |
| JP | 2009-252348 A | 10/2009 |
| JP | 2010192444 A | 9/2010 |
| JP | 5000787 B2 | 8/2012 |
| JP | 2013510405 A | 3/2013 |
| KR | 20050090218 A | 9/2005 |
| KR | 2007-023141 | 2/2007 |
| KR | 2007-0110569 A | 11/2007 |
| KR | 2008-038806 A | 5/2008 |
| KR | 20100066441 A | 6/2010 |
| NL | 1015956 | 8/2000 |
| SU | 471402 | 5/1975 |
| SU | 544019 | 1/1977 |
| WO | WO 99/33129 | 7/1999 |
| WO | WO 01/13414 A1 | 2/2001 |
| WO | WO 01/35473 A1 | 5/2001 |
| WO | WO 01/96847 A1 | 12/2001 |
| WO | WO 02/25356 A2 | 3/2002 |
| WO | WO 02/47185 A2 | 6/2002 |
| WO | WO 03/063271 A1 | 7/2003 |
| WO | WO 03/075372 A2 | 9/2003 |
| WO | WO 2004/042851 A2 | 5/2004 |
| WO | WO 2004/052489 A2 | 6/2004 |
| WO | WO 2004/083490 A2 | 9/2004 |
| WO | WO 2004/109839 A1 | 12/2004 |
| WO | WO 2005/011030 A1 | 2/2005 |
| WO | WO 2005/113467 A1 | 12/2005 |
| WO | WO 2005/119753 A2 | 12/2005 |
| WO | WO 2006/067891 A1 | 6/2006 |
| WO | WO 2006/073427 A2 | 7/2006 |
| WO | WO 2006/120332 A2 | 11/2006 |
| WO | WO 2007/044315 A1 | 4/2007 |
| WO | WO 2007/083152 A1 | 7/2007 |
| WO | WO 2007/083155 | 7/2007 |
| WO | WO 2007/114168 A1 | 10/2007 |
| WO | WO 2007/136164 A1 | 11/2007 |
| WO | WO 2008/029888 A1 | 3/2008 |
| WO | WO 2008/044683 A1 | 4/2008 |
| WO | WO 2008/072460 A1 | 6/2008 |
| WO | WO 2008/097723 A1 | 8/2008 |
| WO | WO 2008/139157 A1 | 11/2008 |
| WO | WO 2009/010757 | 1/2009 |

(56) References Cited

FOREIGN PATENT DOCUMENTS

| WO | WO 2009/010758 | 1/2009 |
|---|---|---|
| WO | WO 2009/010759 | 1/2009 |
| WO | WO 2009/026466 | 2/2009 |
| WO | WO 2009/120404 A1 | 10/2009 |
| WO | WO 2009/128800 | 10/2009 |
| WO | WO 2010/040985 | 4/2010 |
| WO | WO 2010/040986 | 4/2010 |
| WO | WO 2010/060348 A1 | 6/2010 |
| WO | WO 2010/128310 A1 | 11/2010 |
| WO | WO 2010/130975 A1 | 11/2010 |
| WO | WO 2010/130976 A1 | 11/2010 |

OTHER PUBLICATIONS

Barraclough et al., "Cold Compaction of Silicon Powders Without a Binding Agent", Materials Letters 61 (2007) 485-487.

Beaulieu et al., "Colossal Reversible Volume Changes in Lithium Alloys", Electrochemical and Solid-State Letters, 4 (9) (2001) A137-A140.

Beaulieu et al., "Reaction of Li with Grain-Boundary Atoms in Nanostructured Compounds", Journal of the Electrochemical Society, 147 (9) (2000) 3206-3212.

Besenhard et al., "Will Advanced Lithium-Alloy Anodes Have a Chance in Lithium-Ion Batteries?", Journal of Power Sources, 68 (1997) 87-90.

Boukamp et al., "All-Solid Lithium Electrodes with Mixed-Conductor Matrix", J. Electrochem. Soc.: Electrochemical Science and Technology, vol. 128, No. 4, (1981) 725-729.

Bourderau, et al., "Amorphous Silicon as a Possible Anode Material for Li-Ion Batteries", Journal of Power Sources, 81-82 (1999) 233-236.

Canham, L. T., "Diffusion of Li in Si", Properties of Silicon, EMIS Datareviews Series No. 4 (1987) 454-462.

Chan et al., "Surface Chemistry and Morphology of the Solid Electrolyte Interphase on Silicon Nanowire Lithium-Ion Battery Anodes", Journal of Power Sources, 189(2), 1132-1140, (2009).

Chang et al., "Ultrafast Growth of Single-Crystalline Si Nanowires", Materials Letters, 60 (2006) 2125-2128.

Chen et al., Binder Effect on Cycling Performance of Silicon/Carbon Composite Anodes for Lithium Ion Batteries, 36 (2006) 1099-1104.

Chen et al., "Effect of Vinylene Carbonate (VC) as Electrolyte Additive on Electrochemical Performance of Si Film Anode for Lithium Ion Batteries", Journal of Power Sources, 174(2), 538-543, (2007).

Chen et al., "Selective Etching of Silicon in Aqueous Ammonia Solution", Sensors and Actuators, A 49 (1995) 115-121.

Chevrier et al., "Methods for Successful Cycling of Alloy Negative Electrodes in Li-Ion Cells", $220^{th}$ ECS Meeting, Abstract #1237 (2011).

Choi et al., "Effect of Fluoroethylene Carbonate Additive on Interfacial Properties of Silicon Thin-Film Electrode", Journal of Power Sources, 161(2), 1254-1259 (2006).

Colinge, Jean-Pierre, "Silicon-on-Insulator Technology: Materials to VLSI", Chapter 2, SOI Materials, (1991), Cover page and p. 38.

Deal et al., "General Relationship for the Thermal Oxidation of Silicon", Journal of Applied Physics, vol. 36, No. 12, (Dec. 1965) 3770-3778.

De Angelis et al., "Water Soluble Nanoporous Nanoparticles for In Vivo Targeted Drug Deliver and Controlled Release in B Cells Tumor Context", Nanoscale, 1020, vol. 2, p. 2230-2236.

El Ouatani et al., "The Effect of Vinylene Carbonate Additive on Surface Film Formation on Both Electrodes in Li-Ion Batteries", J. Electrochem. Soc., 156(2), A103-A113 (2009).

Feng et al., "Lithography-Free Silicon Micro-Pillars as Catalyst Supports for Microfabricated Fuel Cell Applications", Electrochemistry Communications, 8 (2006) 1235-1238.

Garrido, et al., The Role of Chemical Species in the Passivation of <100> Silicon Surfaces by HF in Water-Ethanol Solutions, J. Electrochem Soc., vol. 143, No. 12, 1996, p. 4059-4066.

Green et al., "Mesoscopic Hemisphere Arrays for use as Resist in Solid State Structure Fabrication", J. Vac. Sci. Technol. B 17(5) (1999) 2074-2083.

Green et al., "Quantum Pillar Structures on n+ Gallium Arsenide Fabricated Using "Natural" Lithography", Appl. Phys. Lett., 62 (3) (1993) 264-266.

Green et al., "Structured Silicon Anodes for Lithium Battery Applications", Electrochemical and Solid-State Letters, 6 (5) (2003) A75-A79.

Han et al., "Neutralized Poly (Acrylic Acid) as Polymer Binder for High Capacity Silicon Negative Electrodes", $220^{th}$ ECS Meeting, Abstract #1250 (2011).

Heinze et al., "Viscosity Behaviour of Multivalent Metal Ion-Containing Carboxymethyl Cellulose Solutions", Die Angewandte Makromolekulare Chamie 220, 123-132, (Nr. 3848), (1994).

Hochgatterer et al., "Silicon/Graphite Composite Electrodes for High Capacity Anodes: Influence of Binder Chemistry on Cycling Stability", Electrochemical and Solid-State Letters, 11 (5) (2008) A76-A80.

Huggins, Robert A., "Lithium Alloy Anodes" in Handbook of Battery Materials, J.O. Besenhard Ed., Wiley-VCH, Weinheim, 361-381 (1999).

Ivanovskaya et al., "The Effect of Treatment of Cation-Selective Glass Electrodes With AgNO3 Solution on Electrode Properties", Sensors and Actuators B 24-25 (1995) 304-308.

Jianfeng et al., "Large-Scale Array of Highly Oriented Silicon-Rich Micro/Nanowires Induced by Gas Flow Steering", Solid State Communications, 133 (2005) 271-275.

Kasavajjula et al., "Nano- and Bulk-Silicon-Based Insertion Anodes for Lithium-Ion Secondary Cells", Journal of Power Sources, 163 (2007) 1003-1039.

Key to Metal Aluminum—Silicon Alloys, www.keytometals.com/Article80.

Kim et al., "(110) Silicon Etching for High Aspect Ratio Comb Structures", 1997 6th International Conference on Emerging Technologies and Factory Automation Proceedings, (1997) 248-252.

Kim et al., "Improvement of Silicon Powder Negative Electrodes by Copper Electroless Deposition for Lithium Secondary Batteries", Journal of Power Sources, 147 (2005) 227-233.

Kleimann et al., "Formation of Wide and Deep Pores in Silicon by Electrochemical Etching", Materials Science and Engineering, B69-70 (2000) 29-33.

Kolasinski, Kurt W., "Silicon Nanostructures from Electroless Electrochemical Etching", Current Opinion in Solid State and Materials Science, 9 (2005) 73-83.

Komba et al., "Functional Interface of Polymer Modified Graphite Anode", Journal of Power Sources, 189, (2009), 197-203.

Komba et al., "Polyacrylate as Functional Binder for Silicon and Grapite Composite Electrode in Lithium-Ion Batteries", Electrochemistry, 79(1), (2010), 6-9.

Komba et al., "Polyacrylate Modifier for Graphite Anode of Lithium-Ion Batteries", Electrochemical and Solid-State Letters, 12(5), (2009), A107-A110.

Komba et al., "Study on Polymer Binders for High-Capacity SiO Negative Electrode of Li-Ion Batteries", Journal of Physical Chemistry, 115, (2011), 13487-13495.

Lang, Walter, "Silicon Microstructuring Technology", Materials Science and Engineering, R17 (1996) 1-55.

Lee et al., "Effect of Poly (Acrylic Acid) on Adhesion Strength and Electrochemical Performance of Natural Graphite Negative Electrode for Lithium-Ion Batteries", Journal of Power Sources, 161(1), (2006), 612-616.

Li et al., "A High Capacity Nano-Si Composite Anode Material for Lithium Rechargeable Batteries", Electrochemical and Solid-State Letters, 2 (11) (1999) 547-549.

Li et al., "Sodium Carboxymethyl Cellulose: A Potential Binder for Si Negative Electrodes for Li-Ion Batteries", Electrochemical and Solid-State Letters, 10(2) (2007), A17-A20.

Li et al., "The Crystal Structural Evolution of Nano-Si Anode Caused by Lithium Insertion and Extraction at Room Temperature", Solid State Ionics, 135 (2000) 181-191.

(56) References Cited

OTHER PUBLICATIONS

Liu et al., "A Novel Method of Fabricating Porous Silicon Material: Ultrasonically Enhanced Anodic Electrochemical Etching", Solid State Communications, 127 (2003) 583-588.
Liu et al., "Effect of Electrode Structure on Performance of Si Anode in Li-Ion Batteries: Si Particle Size and Conductive Additive", Journal of Power Source, 140 (2005) 139-144.
Liu et al., "Enhanced Cycle Life of Si Anode for Li-Ion Batteries by Using Modified Elastomeric Binder", Electrochemical and Solid-State Letters, 8(2) (2005), A100-A103.
Lu et al., "A Study of the Mechanisms of Erosion in Silicon Single Crystals Using Hertzian Fracture Tests", Wear, 186-187 (1995) 105-116.
Maranchi et al., "Interfacial Properties of the a-Si/Cu: Active-Inactive Thin-Film Anode Systems for Lithium-Ion Batteries", Journal of the Electrochemical Society: 153 (6) (2006) A1246-A1253.
Nakahata et al., "Fabrication of Lotus-Type Porous Silicon by Unidirectional Solidification in Hyrdogen", Materials Science and Engineering A 384 (2004) 373-376.
Niparko, J.K. (Editor), "Cochlear Implant Technology", Pub., Lippincott Williams and Wilkins, Philadelphia, (2000) 108-121.
Obrovac et al., "Structural Changes in Silicon Anodes During Lithium Insertion/Extraction", Electrochemical and Solid-State Letters, 7(5), (2004), A96-A96.
Ohara et al., "A Thin Film Silicon Anode for Li-Ion Batteries Having a Very Large Specific Capacity and Long Cycle Life", Journal of Power Sources, 136 (2004) 303-306.
Pei et al., "Silicon Nanowires Grown from Silicon Monoxide Under Hydrothermal Conditions", Journal of Crystal Growth, 289 (2006) 423-427.
Peng et al., "Dendrite-Assisted Growth of Silicon Nanowires in Electroless Metal Deposition", Adv. Funct. Mater., 13, No. 2 (2003) 127-132.
Peng et al., "Fabrication of Large-Area Silicon Nanowire p-n Junction Diode Arrays", Adv. Mater. (2004), vol. 16, No. 1, 73-76.
Peng et al., "Silicon Nanowires for Rechargeable Lithium-ion Battery Anodes", Applied Physics Letters (2008) vol. 93, No. 3, pp. 33105-1 to 33105-3.
Peng et al., "Simultaneous Gold Deposition and Formation of Silicon Nanowire Arrays", Journal of Electroanalytical Chemistry, 558 (2003) 35-39.
Peng et al., "Synthesis of Large-Area Silicon Nanowire Arrays via Self-Assembling Nanoelectrochemistry", Adv. Mater., 14, No. 16 (2002) 1164-1167.
Peng et al., "Uniform, Axial-Orientation Alignment of One-Dimensional Single-Crystal Silicon Nanostructure Arrays", Angew. Chem. Ind. Ed., 44 (2005) 2737-2742.
Peng, et al., "Fabrication of Single-Crystalline Silicon Nanowires by Scratching a Silicon Surface with Catalytic Metal Particles", Adv. Funct. Mater., 16 (2006), 387-394.
Peng, K. et al., "Metal-Particle-Induced, Highly Localized Site-Specific Etching of Si and Formation of Single-Crystalline Si Nanowires in Aqueous Fluoride Solution", Chemistry A European Journal 2006, 12, pp. 7942-7947 (2006).
Qiu et al., "From Si Nanotubes to Nanowires: Synthesis, Characterization, and Self-Assembly", Journal of Crystal Growth, 277 (2005) 143-148.
Qiu et al., "Self-Assembled Growth and Optical Emission of Silver-Capped Silicon Nanowires", Applied Physics Letters, vol. 84, No. 19, (2004) 3867-3869.
Russo, et al., "A Mechanical Approach to Porous Silicon Nanoparticles Fabrication", Materials 2011, vol. 4, p. 1023-1033.
Sharma et al., "Thermodynamic Properties of the Lithium—Silicon System", J. Electrochem. Soc.: Electrochemical Science and Technology, vol. 123 (1976) 1763-1768.
Shin et al., "Porous Silicon Negative Electrodes for Rechargeable Lithium Batteries", Journal of Power Sources, 139 (2005) 314-320.
Sugama, et al., "Nature of Interfacial Interaction Mechanisms Between Polyacrylic Acid Macromolecules and Oxide Metal Surfaces", Journal of Materials Science, 19 (1984) 4045-4056.
Takami et al., "Silicon Fiber Formed on Silicon Without Using a Gas Process", Journal of Applied Physics, vol. 91, No. 12, 2-5 (2002).
Tokoro et al., "Anisotropic Etching Properties of Silicon in KOH and TMAH Solutions", Proceedings of the 1998 International Symposium on Micromechatronics and Human Science (1998) 65-70.
Tsuchiya et al., "Structural Fabrication Using Cesium Chloride Island Arrays as a Resist in a Fluorocarbon Reactive Ion Etching Plasma", Electrochemical and Solid-State Letters, 3 (1) (2000) 44-46.
Ui et al., "Improvement of Electrochemical Characteristics of Natural Graphite Negative Electrode Coated With Polyacrylic Acid in Pure Propylene Carbonate Electrolyte", Journal of Power Sources, 173(1), (2007), 518-521.
Wagner et al., "Vapor-Liquid-Solid Mechanism of Single Crystal Growth", Applied Physics Letters, vol. 4, No. 5 (1964) 89-90.
Wen et al., "Chemical Diffusion in Intermediate Phases in the Lithium—Silicon System", Journal of Solid State Chemistry, 37 (1981) 271-278.
Weydanz et al., "A Room Temperature Study of the Binary Lithium—Silicon and the Ternary Lithium—Chromium—Silicon System for use in Rechargeable Lithium Batteries", Journal of Power Sources, 81-82 (1999) 237-242.
Winter, et al., "Insertion Electrode Materials for Rechargeable Lithium Batteries", Advanced Materials, 1998, 10, No. 10.
Wong et al., "Controlled Growth of Silicon Nanowires Synthesized via Solid-Liquid-Solid Mechanism", Science and Technology of Advanced Materials, 6 (2005) 330-334.
Yabuuchi et al., "Graphite-Silicon-Polyacrylate Negative Electrodes in Ionic Liquid Electrolyte for Safer Rechargeable Li-Ion Batteries", Advanced Energy Materials, 1, (2011), 759-765.
Yan et al., "Growth of Amorphous Silicon Nanowires via a Solid-Liquid-Solid Mechanism", Chemical Physics Letters, 323 (2000) 224-228.
Yan et al., "$H_2$-Assisted Control Growth of Si Nanowires", Journal of Crystal Growth, 257 (2003) 69-74.
Ye et al., Controllable Growth of Silver Nanostructures by a Simple Replacement Reaction and Their SERS Studies, Solid State Sciences 11 (2009), p. 1088-1093.
Yoshio et al., "Electrochemical Behaviors of Silicon Based Anode Material", Journal of Power Sources, 153 (2006) 375-379.
Zhang et al., "A Review on Electrolyte Additives for Lithium-Ion Batteries", Journal of Power Sources, 162(2), 1379-1394, (2006).
Zhang et al., "Bulk-Quantity Si Nanowires Synthesized by SiO Sublimation", Journal of Crystal Growth, 212 (2000) 115-118.
Zhang et al., "Catalytic Growth of x-FiSi$_2$ and Silicon Nanowires", Journal of Crystal Growth, 280 (2005) 286-291.
Zhang et al., "Synthesis of Thin Si Whiskers (Nanowires) Using SiCl$_4$", Journal of Crystal Growth, 2006 (2001) 185-191.
"Peng Yun, et al. "Comparative Analysis of Two Different Treatment Technology in PCB Spent Etching-Cyclic Regeneration Technique and Copper Sulfate Processing Technique", Printed Circuit Information, No. 7, pp. 51-53, dated Jul. 10, 2007."
Uzun, Orhan et al., "Production and Structure of Rapidly Solidified Al—Si Alloys", Turk J Phys, 25, pp. 455-466 (2001).

\* cited by examiner

ADDITIVE FOR LITHIUM ION RECHARGEABLE BATTERY CELLS

This application is a continuation of U.S. patent application Ser. No. 13/265,464 which was filed on Apr. 24, 2012 and is still pending. That application is the entry into the national phase of International Application Serial No. PCT/GB2011/000856 filed on Jun. 7, 2011 and claiming priority from British Application Serial No. GB 1009519.8 filed on Jun. 7, 2010

TECHNICAL FIELD

The invention relates to lithium ion rechargeable battery cells, to electrolyte solutions used in such cells and especially to electrolyte solutions containing certain amounts of additives.

BACKGROUND ART

Lithium-ion rechargeable battery cells currently use a carbon/graphite-based anode. The basic composition of a conventional lithium-ion rechargeable battery cell including a graphite-based anode electrode is shown in FIG. 1. A battery may include a single cell but may also include more than one cell.

The battery cell generally comprises a copper current collector 10 for the anode and an aluminium current collector 12 for the cathode, which are externally connectable to a load or to a recharging source as appropriate. It should be noted that the terms "anode" and "cathode" are used in the present specification as those terms are understood in the context of batteries placed across a load, i.e. the term "anode" denotes the negative pole and the term "cathode" the positive pole of the battery. A graphite-based composite anode layer 14 overlays the current collector 10 and a lithium containing metal oxide-based composite cathode layer 16 overlays the current collector 12. A porous plastic spacer or separator 20 is provided between the graphite-based composite anode layer 14 and the lithium containing metal oxide-based composite cathode layer 16: a liquid electrolyte material is dispersed within the porous plastic spacer or separator 20, the composite anode layer 14 and the composite cathode layer 16. In some cases, the porous plastic spacer or separator 20 may be replaced by a polymer electrolyte material and in such cases the polymer electrolyte material is present within both the composite anode layer 14 and the composite cathode layer 16.

When the battery cell is fully charged, lithium has been transported from the lithium containing metal oxide via the electrolyte into the graphite-based anode where it is intercalated by reacting with the graphite to create a lithium carbon compound, typically $LiC_6$. The graphite, being the electrochemically active material in the composite anode layer, has a maximum theoretical capacity of 372 mA h g$^{-1}$. For the avoidance of doubt, the term "active material" is taken to describe any material into which lithium ions can be inserted and extracted during operation of the battery cell.

It is well known that silicon can be used instead of graphite as the active anode material (see, for example, Insertion Electrode Materials for Rechargeable Lithium Batteries, M. Winter, J. O. Besenhard, M. E. Spahr, and P. Novak in Adv. Mater. 1998, 10, No. 10 and Nano- and bulk-silicon-based insertion anodes for lithium-ion secondary cells, U. Kasavajjula, C. Wang and A. J. Appleby in J. Power Sources 163, pp 1003-1039, 2007). It is generally believed that silicon, when used as an active anode material in a lithium-ion rechargeable cell, can provide a significantly higher capacity than the currently used graphite. Crystalline silicon, when converted to the compound $Li_{21}Si_5$ by reaction with lithium in an electrochemical cell, has a maximum theoretical capacity of 4,200 mAh/g, considerably higher than the maximum capacity for graphite. However there are several different Li—Si alloys that can be formed by lithium insertion, depending on e.g. temperature, crystalline state, charge voltage and charge rates. For example, at room temperature it is believed that the maximum achievable capacity is close to 3,600 mAh/g with the alloy $Li_{15}Si_4$. ("Structural changes in silicon anodes during lithium insertion/extraction", M. N. Obrovac and Leif Christensen, Electrochem. & Solid State Lett., 7, A93-A96, 2004). Thus, if graphite can be replaced by silicon in a lithium rechargeable battery, a substantial increase in stored energy per unit mass and per unit volume can be achieved. Unfortunately silicon anode material in Li-ion cells undergoes a huge volume change between the charged and the discharged states associated with the insertion and removal of lithium ions into the silicon material during the charging and discharging stages of the cells. The volume of a fully lithiated Li—Si alloy can be 3-4 times larger than the unalloyed silicon volume. This is much larger than the volume change seen in carbon anodes. As a consequence of such expansion and contraction, which on each cycle causes mechanical degradation of the silicon material and electrical isolation of sections, the electrodes can have a short cycle life.

It is believed that the likelihood of structural breakdown of the anode active material during expansion and contraction can increase if crystalline and amorphous Li—Si alloy phases are allowed to co-exist during a charge-discharge cycle. If the initial anode material is crystalline silicon then, during the first charge cycle as lithium is inserted, it loses its crystalline structure and becomes an amorphous Li—Si alloy. If at this amorphous stage, the anode is then delithiated, i.e. the cell is discharged, then the silicon anode material remains amorphous. However, if the silicon anode material proceeds to full lithiation, then as the anode potential approaches zero volts, a crystalline $Li_{15}Si_4$ phase forms. On discharge (delithiation), this crystalline alloy phase converts back into the amorphous Li—Si alloy. Although this crystalline phase provides the highest charge capacity, it is preferable to avoid its formation because of the additional stresses induced in the anode material from the repeated crystalline to amorphous transitions in subsequent cycles. Formation of the crystalline phase can be prevented by avoiding excessive charging of the silicon anode material and setting a lower voltage limit on the anode during charging (that is, not allowing it to be charged beyond a lower voltage level which depends, amongst other things, on the internal cell resistance but is typically in the range of 15-50 mV). Setting a limit on the charge level of the silicon anode material also helps to control mechanical stresses in the anode and minimise cracking of the silicon material. For this reason it is preferable not to charge the silicon material above 3,400 mAhr per gram of silicon, and most preferable to set an upper limit of no more than 2,500 mAhr/g. This equates to a charge that is less than 80%, and preferably no more than 60%, of the theoretical maximum of an active mass consisting wholly of silicon, and such percentages also apply in the case of an active mass formed of a mixture of silicon and one or more other active materials, e.g. carbon; the theoretical maximum charge for carbon is 372 mAh/g and for silicon is 4200 mAh/g.

Another factor affecting cell performance is the formation a solid electrolyte interface (SEI) layer on the silicon surface. Initially the surface of the silicon material has a thin native oxide layer on it which has a low conductivity. During the first charge, this layer is replaced by an SEI layer of higher ionic conductivity formed from reactions with the electrolyte and reduction of the solvents. The SEI can be composed of various different products, for example $Li_2CO_3$, LiF, $Li_2O$, lithium alkyl carbonates, polymeric hydrocarbons and others. Each product will start forming at different stages of the charging process, dependent on the anode potential. Some illustrative reactions are as follows:—

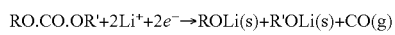

$RO.CO.OR' + 2Li^+ + 2e^- \rightarrow ROLi(s) + R'OLi(s) + CO(g)$

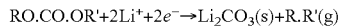

$RO.CO.OR' + 2Li^+ + 2e^- \rightarrow Li_2CO_3(s) + R.R'(g)$

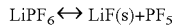

$LiPF_6 \leftrightarrow LiF(s) + PF_5$

$Li_2CO_3(s) + PF_5 \rightarrow 2LiF(s) + POF_3 + CO_2(g)$

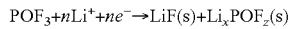

$POF_3 + nLi^+ + ne^- \rightarrow LiF(s) + Li_xPOF_z(s)$ where R and R' are generally alkyl groups; RO.CO.OR' is present in the cell as part of the electrolyte to provide a solvent for a lithium salt, e.g. $LiPF_6$. A stable SEI layer with good ionic conductivity that can withstand the volume changes is essential to the proper working of the cells, and in this regard certain SEI products are much better than others. For example, one preferred component of the SEI is generally perceived to be $Li_2CO_3$.

A drawback of the SEI formation is that it consumes some of the lithium and electrolyte components, and ties them up in the system, preventing them from contributing to the charge capacity of the cell. Excessive SEI formation will lead to an increased ionic resistance and degrade the cell performance. Therefore it is preferable to control the surface area and the surface area to volume ratio of the silicon anode material. After the first cycle, the repeated expansion and contraction of the silicon during cycling can cause cracks in the SEI, exposing fresh silicon surfaces, leading to production of more SEI layer, consuming further liquid electrolyte and lithium. This reduces the cell charge/discharge efficiency, can cause the cell to dry out, and further reduces available cycle life. The cracking typically occurs at a low anode potential during charging (when the volume expansion is largest) and at this point numerous SEI products are able to form at once on the exposed surface. It is thought that this can lead to the formation of poor quality SEI layers and to avoid this it is desirable to have preferred SEI products form over the others.

It should be recognised that the main part of the SEI layer is formed during the first few charge cycles and this process contributes to the irreversible capacity and lower charge efficiencies typically experienced in the early cycles. In subsequent cycles, new areas of SEI will be continually formed where silicon is exposed through cracking or where the original SEI layer cracks or degrades and this process contributes to running losses of lithium and helps determine the running charge efficiency. The quality of the original SEI layer will have a significant influence on the quality of the new SEI formation during later cycles. An SEI layer preferably has the following properties:

Uniform (smooth), non-porous covering of every part of the exposed silicon surface (preferably a full covering formed during the first cycle)
High ionic conductivity
Low electronic conductivity
Relatively thin
Stable
Flexible—can stretch with the silicon material as it expands and contracts (the more it cracks the more SEI will be formed and the more lithium is consumed)

The SEI formation process can be influenced through the use of electrolyte additives. The use of cyclic carbonates containing a vinyl group such vinylene carbonate (VC), halogenated cyclic carbonates such as fluoroethylene carbonate (FEC) and difluoroethylene carbonate (DFEC), $CO_2$, silyl esters such as sultones and esters of phosphoric and boric acid have been used as electrolyte additives.

Any additive to the electrolyte must not adversely affect the properties of the electrolyte; an electrolyte can be adversely affected by the addition of additives and, even with the addition of additives, the electrolyte should:

not be overly depleted of lithium by the additions
maintain a high ionic conductivity
not be too viscous
operate safely at temperatures experienced in the cells
electrochemically compatible with the cathode material (an SEI layer forms on the cathode too and we do not want the cathode performance to be reduced)

The concentrations of additives should be such that, on the one hand, they are effective while, on the other hand, they should not compromise the role of the electrolyte and especially the above properties.

Vinylene Carbonate (VC):

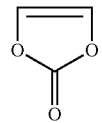

is known as an electrolyte additive for graphite anode cells to improve the charging and discharging performance of the cells. See, for example, U.S. Pat. No. 7,862,933, JP 04607488 and J. Electrochem. Soc., 156(2), A103-A113 (2009). We believe that it (VC) changes the composition or properties of the SEI layer on the graphite anode, which has a completely different composition to the SEI on a silicon-based anode. Typically, the VC content of the electrolyte in cells having a graphite anode is around 2 wt %.

Fluoroethylene Carbonate (FEC):

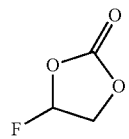

is also known as an additive to battery electrolytes, as described below and in, for example, U.S. Pat. No. 7,862,933, US 2010/0136437, JP 04607488, JP 2008234988 and US 2007/0072074.

Electrolyte solutions containing silyl, borate and phosphate esters as additives are disclosed in JP 04607488, JP 2008234988 and US 2010/0136437.

Further, the structure of the anode material greatly affects the formation of the SEI layer. The present invention is concerned with a structured silicon material that is open (i.e. contains space within the mass) and allows the growth of the SEI layer and the expansion of the silicon-containing anode during charging, i.e. lithiation, of the anode. The porosity of an anode made of such structured silicon may be relatively high, e.g. >30% volume porosity or >40%. The open structure can be brought about by the structure of the particle itself, e.g. it could have structural elements, e.g. pillars or similar protrusions, on its surface that provide spaces between the elements that allow for the growth of the SEI and the expansion of the silicon during lithiation. In another embodiment, the structure of the particle could contain voids within it that fulfil the same function. Alternatively, the particles could be shaped such that they allow space between the particles for the growth of the SEI and the expansion of the silicon during lithiation when deposited onto the current collector of an anode. Such particles will generally be elongated and have an aspect ratio (ratio of the smallest to largest dimension) of at least 5 and optionally at least 10, e.g. at least 25. Such structures have a more convoluted surface morphology than simple (i.e. unstructured) silicon particles or films and have lots of sharp corners and changes in surface directions, which makes it more difficult to form a thin, flexible (elastic), non-porous SEI coating over the whole exposed silicon surface. The porous nature of a mass formed from the structured silicon increases the likelihood of having void spaces created within the mass that have narrow access paths for the electrolyte and so it is particularly important that the viscosity of any electrolyte used should not be so high that the electrolyte cannot migrate into and out of such void spaces, which would render such spaces dead.

Chan et al in *Journal of Power Sources* 189 (2009) 1132-1140 investigated the formation of an SEI layer on silicon nanowires during lithiation in a standard electrolyte free of additives. They found that the morphology of the SEI layer was very different compared to that typically found on thin film anodes: less uniform, a reduced level of LiF and some particle deposits adjacent to the nanowires on the anode substrate rather than adhered to the surface of the silicon. This shows that the morphology and composition of the SEI layer for highly structured, porous silicon material is very different to other silicon anodes where additives have previously been used.

The structured silicon material used in the electrodes of the present invention therefore provides a special problem to find additive(s) and a range of additive concentrations to achieve the properties outlined above. It will be appreciated from the foregoing that there is a need for electrolyte solutions, which facilitate the formation of a stable SEI layer on the surface of structured electroactive materials, particularly structured silicon materials.

The relevant prior art of which we are aware is:

U.S. Pat. No. 7,476,469 discloses a rechargeable (secondary) battery that includes an anode, a lithium cobalt oxide cathode and an intervening body of non-aqueous electrolyte. The anode may be, amongst other materials, an amorphous silicon thin film layer that is sputtered onto a current collector and is typically 1-20 μm thick; although the specification also teaches the use of microcrystalline silicon, no examples are given of the use of this. The electrolyte contains cyclic or chain carbonates, including ethylene carbonate. The electrolyte can also contain vinylene carbonate, which is said to improve the charge-discharge cycle performance characteristics. The amount of vinylene carbonate is stated to be 0.5-80% by volume of the other components of the electrolyte. However, the teaching of this citation is limited to the type of anode material used (a thin film of amorpohous silicon or fine crystalline silicon with nm-sized grains).

US-2009/0053589 discloses a battery cell having a cathode, an anode and electrolyte. The anode contains, as active material, a powdered or thin film special alloy, e.g. of silicon, tin and a transition metal, in various microcrystalline and amorphous phases, which are expensive. The microcrystalline materials may have a crystallite dimension of 5-90 nm. The electrolyte can include various cyclic carbonates, including VC or FEC. In the Examples, the amount of VC or FEC is 10% of the electrolyte, which is said to reduce the capacity loss in the first cycle. Again this teaching is limited to the special powdered or thin film alloy anode material used.

US2009/0305129 discloses a lithium secondary battery having an anode that includes polycrystalline particles of silicon or of a silicon alloy prepared by thermal decomposition. In order to increase the cycle performance of the battery, the silicon anode material must have a crystallite size in the nanometer range (less than 100 nm) within silicon particles having a diameter of 3-30 μm. The specification teaches that $CO_2$ (in an amount of about 0.4 wt %) and/or a fluorine-containing carbonate, e.g. FEC (in an amount of about 10 wt %), may be added to an ethylene carbonate/diethylene carbonate electrolyte since they are said to allow the reaction of the silicon particles with lithium to happen smoothly and increase the number of charging/discharging cycles before failure. The purity of the silicon is 95% or higher.

Nam-Soon Choi et al in *Journal of Power Sources* 161 (2006) 1254-1259 discloses that the lifetime of a thin film silicon electrode having a thickness of 200 nm can be improved by the addition of 3% FEC to an ethylene carbonate/diethylene carbonate electrolyte.

L. El Ouatani et al in *Journal of the Electrochem. Soc.* 156 (2009) A103-A113 discloses that the addition of VC forms a thinner SEI layer on graphite anodes than layers formed with no VC, and that VC introduces extra oxygen containing compounds into the SEI. One of these compounds is a polymer derived from VC. This is clearly different from the lithium containing dimer which is one of the main reaction products from the reduction of ethylene carbonate (EC) solvent within the electrolyte, which occurs according to equation 1:

We believe that the VC is reduced according to the equation 2:

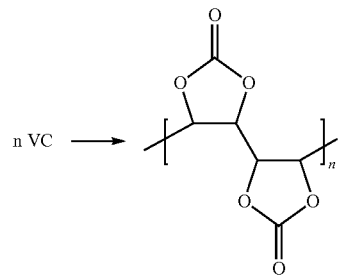

to form the polymer identified.

Both of the above reactions are believed to proceed via a radical reduction mechanism. It is possible that some of the lithium conduction mechanism of the SEI layer comes through oxygen containing hydrocarbons, in a manner analogous to the conduction mechanism in poly (ethylene oxide): LiX materials. In this case, the lithium conduction is likely to be better with the polymer derived from VC, compared to the dimer derived from EC.

Libao Chen et al. in *Journal of Power Sources* 174 (2007) 538-543 discloses that the presence of 1 wt % VC to the electrolyte improved the cycling performance of a thin silicon film of 250 nm thickness compared to similar film with an electrolyte free of VC. The improvement was attributed to a thinner, more uniform SEI layer on the surface of the silicon anode with VC additive. The SEI layers were found to contain significant amounts of LiF. Unexpectedly, small quantities of $SiO_x$ were also observed and this is thought to be due to interaction of the electrolyte with lithiated silicon via holes in the SEI layer. The silicon material must have a small particle size because the width of the whole film is only 250 nm.

Sheng Shui Zhang in *Journal of Power Sources* 162 (2006) 1379-1394 discloses that FEC can decompose to VC and HF. The presence of hydrogen fluoride would normally be considered detrimental to lithium ion battery performance, because it reacts with lithium carbonate to produce lithium fluoride, water and carbon dioxide. However, there are reports that HF improves the quality of SEI layers on lithium metal electrodes, smoothing the deposits and reducing the risk of dendrite formation.

It has been suggested that the internal stresses generated in the silicon material from repeated expansion and contraction can be reduced by using silicon material of very small (sub-micron) dimensions. However this also causes disadvantages: in the case of thin films (see for example the Libao Chen et al. article discussed above), it reduces the available anode capacity per unit volume; in the case of sub-micron particles it increases the silicon surface area to volume ratio, which increases the proportion of SEI formed during operation and the consumption of lithium and the electrolyte. The long range connectivity within the active material is also poorer with spherical nano-particles.

Batteries suitable for use in hybrid electric vehicles are disclosed in U.S. Pat. No. 7,862,933. Each battery comprises a graphite based anode, a cathode, a separator and an electrolyte solution. The electrolyte solution comprises as a base solvent a mixture of a cyclic carbonate, a linear or chain carbonate and a cyclic carbonate containing a vinyl group; although these carbonate species may include halogen substituents, such substituents are not exemplified and batteries containing from 0.2 to 0.4 vol % VC only as substituent are exemplified.

US 2010/0124707 discloses batteries suitable for use in portable electronic devices. Each battery comprises a cathode, an anode and an electrolyte solution. The anode comprises a current collector having a layer of an anode active material applied thereto. The anode active material is disclosed as containing a plurality of spherical and non-spherical anode active material particles having silicon as an element and is prepared by spraying a silicon-containing material onto the surface of a surface roughened current collector. An electrolyte solution typically contains a mixture of a cyclic carbonate and a linear or chain carbonate, both of which may contain a halogen as a substituent or a halogenated substituent. Cyclic carbonates including a vinyl group, sultones and acid anhydrides may be used as additives. Examples of simple and complex lithium salts as the electrolyte salt are disclosed. There are no examples of batteries containing a mixture of a cyclic carbonate containing a vinyl group or a halogenated cyclic carbonate. Further there are no examples of base solvents other than unsubstituted cyclic carbonates and linear carbonates.

Rechargeable lithium ion batteries including an anode made by sintering a layer comprising particles of an active material including silicon and/or silicon alloy and a binder on a surface of a current collector are disclosed in US 2006/0003226. The anode active particles typically have an average diameter of not more than 100 µm, suitably not more than 50 µm and preferably not more than 10 µm. The batteries also include a non-aqueous electrolyte comprising a mixture of a cyclic and a linear carbonate and having carbon dioxide ($CO_2$) dissolved therein. The dissolved $CO_2$ is believed to limit expansion of the anode material through the formation of a stable SEI layer on the electrode surface. The electrolyte may also optionally contain at least 1 wt % of fluorinated cyclic or chain carbonate; no examples of electrolyte solutions including a fluorinated solvent are included. Batteries including electrolyte solutions containing $CO_2$ were observed to exhibit longer cycle lifetimes compared to batteries in which the electrolyte includes VC as an additive.

U.S. Pat. No. 7,674,552 discloses a lithium ion battery having a lithium fluoride-lithium hydroxide coated anode, a cathode and an electrolyte. The anode is formed by depositing a layer of an anode active material onto a current collector using techniques such as vapour deposition, electroplating or by deposition of a slurry comprising a dispersion of a particulate electroactive material; only vapour deposition techniques are disclosed. The electrolyte suitably comprises a solution of $LiClO_4$ in a solvent comprising a mixture (typically a 1:1 mixture) of a fluorinated cyclic carbonate and a linear or chain carbonate; other suitable solvents include sulpholane, acetonitrile and VC. The anode coating is formed by charging the battery including this electrolyte over at least 30 cycles. The ratio of $Li_2F^+$ to $Li_2OH^+$ in the coating was at least 1. Batteries having a higher $Li_2F^+$ to $Li_2OH^+$ ratio exhibited superior charge and discharge efficiencies over 30 cycles.

US 2010/0136437 discloses a method of forming a fluoride coating on a copper coated particulate silicon electroactive anode material by charging a battery including the anode in an electrolyte solvent including a cyclic fluoride containing carbonate over more than 100 charge/discharge cycles; the first charge discharge operation is carried out at a charge rate of between 0.005 and 0.03 C. The electrolyte suitably contains 15 to 40 vol % of a fluorinated cyclic carbonate such as fluoroethylene carbonate and may optionally further contain 0.5 to 5 wt % VC, 0.1 to 1.5 wt % 1,4-butanediol dimethylsulfonate and/or 0.1 to 1 wt % of dimethylsulfone. There are, however, no examples of electrolyte solvents including one or more of VC, 1,4-butanediol dimethylsulfonate and/or 0.1 to 1 wt % of dimethylsulfone. Examples of batteries prepared in accordance with US 2010/0136437 include silicon particles having an average particle size of between 0.3 and 3 µm and an electrolyte solution comprising a mixture of diethylene carbonate (DEC) with either ethylene carbonate (EC) or fluoroethylene carbonate (FEC).

JP04607488 discloses lithium ion batteries including an anode having an anode active material that can be formed from a material such as silicon, tin or graphite or oxides thereof; only anodes comprising an electroactive graphite are disclosed. The battery further includes a cathode, a separator and an electrolyte. The electrolyte suitably comprises a base solvent comprising a mixture of a cyclic carbonate and a chain carbonate in a ratio in the range 5:95 to 80:20, preferably 4:6 and a 0.1 to 10 wt % of silyl ester additive. Silyl esters of carbonic, phosphoric and boric acid are envisaged. Further optional additives include 0.2 to 0.5 wt % of a tetrafluoroborate and 0.1 to 10 wt % of a cyclic carbonate including a vinyl group. The silyl ester is believed to reduce the irreversible first cycle losses of the battery. The borate contributes to maintaining the viscosity of the electrolyte solution and the optional presence of VC is believed to reduce the extent of reductive cleavage of the electrolyte solvents.

JP 2008234988 discloses an anode having an active material applied to a copper current collector. The active material includes a silicon base layer to which is applied one or more coating layers comprising an alkali metal salt of a transtition metal fluoride such as fluorides of scandium, ytterbium, titanium and hafnium. The anodes are included in a battery structure together with a cathode, a separator and an electrolyte. The electrolyte typically comprises a mixture of cyclic and chain carbonates as base solvents and 1 to 2 wt % of an additive such as a sultone, succinic acid, succinic anhydride or sulfobenzoic anhydride to improve the cell performance by between 1 and 5%; this effect is most noticeable when the electrolyte is a mixture of DEC and FEC.

Lithium ion batteries comprising a thin film silicon-based alloy material applied to a negative electrode are disclosed in U.S. Pat. No. 7,659,034. 0.05 wt % or more of carbon dioxide or vinylethylene carbonate may optionally be added to the electrolyte solvent to prolong cell life and to enhance capacity retention.

US 2007/0037063 discloses a rechargeable lithium ion battery including an electrolyte solution containing an ethylene carbonate compound. Typically the base electrolyte solvent comprises a mixture of a cyclic carbonate and a chain or linear carbonate in a 30:70 ratio. The electrolyte solvent optionally further includes 0.1 to 15 wt % FEC and optionally up 3 wt % of VC. The performance of a cell comprising an electrolyte including an FEC additive was associated with a better irreversible cycle efficiency compared to cells including electrolytes.

US 2007/0072074 discloses a method for reducing gas generation in lithium ion batteries by including 2 to 10 wt % of an FEC additive in the electrolyte solution in combination with a 0.1 to 1M of an electrolyte salt including $LiBF_4$. The electrolyte may also contain up to 2 wt % of VC. Silicon-based anodes can be prepared by either applying a slurry of a silicon-containing particulate material to the current collector or by using vapour deposition techniques to form a silicon-containing thin film on a current collector. The preparation of anodes using vapour deposition techniques only is disclosed. There is no disclosure of the size or shape of the silicon-containing particles used to prepare the anodes.

US 2008/0241647 discloses a cylindrical lithium ion battery comprising a cathode, an electrolyte and an anode. The anode comprises an anode active material comprising silicon-containing and/silicon alloy particles having a principle diameter in the range 5 to 15 µm. The electrolyte suitably comprises a base solvent comprising a mixture of a cyclic and a chain carbonate and further comprises up to 0.4 wt % and optionally up to 10 wt % of $CO_2$. US 2004/0151987 discloses a battery comprising a cathode, an anode, a separator and an electrolyte. The anode is suitably formed from a silicon-containing slurry or from a vapour deposited silicon thin film onto the surface of the current collector. Silicon-containing slurries suitably contain silicon particles having a diameter of around 10 µm. The electrolyte suitably comprises a base solvent comprising a mixture of a cyclic carbonate and a chain carbonate in a ratio of 3:7 and 0.1 to 30 wt %, preferably 5 wt % of a vinylene carbonate additive.

There is, as indicated above, a need for lithium ion batteries, which contain electrolytes which contribute to the formation of a strong and flexible SEI layer and which maintain the charge and discharge capacity over a prolonged charge/discharge life. The present invention addresses these needs.

DISCLOSURE OF THE INVENTION

We believe that the balance between achieving (a) a good SEI layer that is neither too thick nor too thin, (b) a good anode performance and (c) a good anode lifetime is best achieved by using a specific structured electroactive material or electroactive particles in the presence of a cyclic carbonate including a vinyl group, a halogenated cyclic carbonate or a mixture thereof in specific amounts. Preferably the structured electroactive material or electroactive particles include or are a structured silicon material or silicon-containing particles. Preferably the cyclic carbonate including a vinyl group is selected from the group comprising vinylene carbonate, methyl vinylene carbonate, ethyl vinylene carbonate, propyl vinylene carbonate, phenyl vinylene carbonate, dimethyl vinylene carbonate, diethyl vinylene carbonate, dipropyl vinylene carbonate, diphenyl vinylene carbonate, vinyl ethylene carbonate and 4,5-divinyl ethylene carbonate. Vinyl ethylene carbonate, divinyl ethylene carbonate and vinylene carbonate are preferred. Further, the halogenated cyclic carbonate is suitably selected from but not limited to the group comprising 4-fluoro-1,3-dioxolane-2-one, 4-chloro-1,3-dioxolane-2-one, 4,5-difluoro-1,3-dioxolane-2-one, tetrafluoro 1,3-dioxolane-2-one, 4-fluoro-5-chloro-1,3-dioxolane-2-one, 4,5-dichloro-1,3-dioxolane-2-one, tetrachloro-1,3-dioxolane-2-one, 4,5-bistrifluoromethyl-1,3-dioxolane-2-one, 4-trifluoromethyl-1,3-dioxolane-2-one, 4,5-difluoro 4,5-dimethyl-1,3-dioxolane-2-one, 4-methyl-5,5-difluoro-1,3-dioxolane-2-one, 4-ethyl-5,5-difluoro-1,3-dioxolane-2-one, 4-trifluoromethyl-5-fluoro-1,3-dioxolane-2-one, 4-trifluoromethyl-5-methyl-1,3-dioxolane-2-one, 4-fluoro-4,5-dimethyl-1,3-dioxolane-2-one, 4,4-difluoro 5-(1,1-difluoroethyl)-1,3-dioxolane-2-one, 4,5-dichloro-4,5-dimethyl-1,3-dioxolane-2-one, 4-ethyl-5-fluoro-1,3-dioxolane-2-one, 4-ethyl-4,5-difluoro 1,3-dioxolane-2-one, 4-ethyl-4,5,5-trifluoro-1,3-dioxolane-Z-one, 4-fluoro-4-trifluoromethyl-1,3-dioxolane-2-one. Fluorinated cyclic carbonates and mixtures thereof are preferred. Fluoroethylene carbonate (4-fluoro-1,3-dioxolane-2-one) (FEC) and difluoroethylene carbonate (4,5-difluoro 1,3-dioxolane-2-one) (DFEC) are particularly preferred.

In particular, we believe that the balance between achieving (a) a good SEI layer that is neither too thick nor too thin, (b) good anode performance and (c) a good anode lifetime is best achieved by using specific structured silicon material or particles in the presence of VC and optionally also one or two fluorinated ethylene carbonates, namely FEC and/or difluoroethylene carbonate (DFEC), in specific amounts.

Structured electroactive materials such as the structured silicon materials specifically described herein are known. In particular, the structured silicon used in accordance with the present invention is generally already known but the selection of this form of electroactive material, particularly the structured silicon material and the use of the above additives to achieve the above balance is, we believe, entirely new.

A first aspect of the invention provides a lithium ion rechargeable battery cell comprising:
an anode comprising an electroactive material-containing particles selected from:
a) particles having spaced-apart structural elements, e.g. elongated structures such as pillars, nanowires or similar protrusions, on their surface, the smallest dimension of the structural elements on the particle surface being less than or equal to 10 µm, in particular no more than 1000 nm, preferably at least 50 nm, more preferably at least 100 nm and having an aspect ratio (defined as the ratio of the largest to smallest dimensions of the element) of more than 1, most preferably at least 5;
b) particles that include at least one void, each void being defined by one or more walls having an average wall thickness of ≥10 nm, preferably ≥50 nm,
c) particles comprising fragments of particles that include at least one void, each void being defined by one or more walls having an average thickness of ≥10 nm, preferably ≥20 to 30 nm, more preferably ≥50 nm;
d) particles having a minimum dimension of at least 10 nm, preferably ≥20 to 30 nm, preferably at least 50 nm, e.g. 10-500 nm, preferably 50-500 nm and an aspect ratio (ratio of the smallest to largest dimension) of at least 5, suitably at least 10 and optionally at least 100;

e) particles comprising a columnar bundle of nano-rods having a diameter of 50 to 100 nm and a length of 2 to 5 µm, wherein each nano-rod has a diameter of at least 10 nm;

f) felt structures formed from particles as defined in (d) above;

g) scaffold structures formed from particles as defined in (d) above;

h) substrate particles as defined herein below;

i) or a mixture thereof;

a cathode comprising an active material capable of incorporating lithium and also of liberating lithium electrochemically and an electrolyte;

wherein the electrolyte comprises 0 to 8 wt % of a cyclic carbonate including a vinyl group and 0 to 70 wt % of a fluorinated cyclic carbonate, with the proviso that the total amount of the cyclic carbonate including a vinyl group and the fluorinated cyclic carbonate is in the range 3.5 wt % to 70 wt % based on the total weight of the electrolyte solution.

Structured Electrode Materials

By the term "electroactive material" it should be understood to mean a material, which is able to incorporate into its structure and substantially release there from, metal ion charge carriers such as lithium, sodium, potassium, calcium or magnesium during the charging phase and the discharging phase of a battery. Preferably the material is able to incorporate (or insert) and release lithium.

The electroactive material-containing particles suitably include electroactive materials selected from, but not limited to, Si, Sn, Ge, Ga, Se, Te, B, P, BC, BSi, SiC, SiGe, SiSn, GeSn, WC, $SiO_2$, $TiO_2$, BN, Bas, AlN, AlP, As, AlSb, GaN, GaP, GaAs, GaSb, InN, InP, InAs, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbSe, PbTe, CuF, CuCl, CuBr, Cul, AgF, AgCl, Agbr, Agl, $BeSin_2$, $CaCN_2$, $ZnGeP_2$, $CdSnAs_2$, $ZnSnSb_2$, $CuGeP_3$, $CuSi_2P_3$, $Si_3N_4$, $Ge_3N_4$, $Al_2O_3$, $Al_2CO$, C or mixtures thereof. These structures may also comprise organic polymers, ceramics, inorganic semiconductors and biologically derived compounds, or the like. Preferably the particles comprise silicon as the electroactive material or a silicon-containing electroactive material.

The electroactive materials used to form the structures referred to herein above may include within their structure a dopant such as a p-type or an n-type dopant. Dopants may suitably be included in the material structure to improve the electronic conductivity of the materials. Examples of p-type dopants for silicon include B, Al, In, Mg, Zn, Cd and Hg. Examples of n-type dopants for silicon include P, As, Sb and C.

The electronic conductivity of an anode including particles of an electroactive material as defined above may alternatively be enhanced by including in the structure chemical additives that reduce its resistivity or increase its conductivity.

The electronic conductivity of the particles or an anode material including the particles may also be enhanced by providing on the particles or on an anode material including the particles a coating of an electroactive material having a higher conductivity than that of the electroactive material used to form the particles. Suitable conducting materials include metals or alloys that are compatible with cell components such as copper or carbon.

By the term "silicon-containing electroactive material" it should be understood to mean an electroactive material, which includes silicon within its structure. The silicon-containing electroactive material can comprise silicon having a purity of greater than 90%. The silicon containing electroactive material suitably has a purity of less than 99.99%. Preferably the silicon-containing electroactive material comprises silicon having a purity in the range 90 to 99.99%, preferably 95 to 99.99%, more preferably 99.90% to 99.99% and especially 99.95% to 99.99%. The silicon-containing electroactive material can also include alloys of silicon with metals such as iron and copper, which metals do not inhibit the insertion and release of charge carriers such as lithium into the alloyed silicon during the charging and discharging phases of the battery. As discussed herein below, the silicon containing electroactive material can also include structures having one or more silicon coatings over an electroactive or non-electroactive core or structures having a silicon core and one or more coatings applied thereto, wherein the structure of each coating layer is different to the composition of the preceding layer or to the core, where the core precedes the coating layer.

Where the term "silicon-containing electroactive material" is used herein, it should also be understood to include references to electroactive materials such as tin, germanium, gallium and mixtures thereof. In this respect it should further be understood that all references to electroactive silicon particles and other silicon structures referred to herein include references to identical particles and structures formed from an electroactive material such as tin, germanium, gallium and mixtures thereof. It should, however, be appreciated that electroactive materials comprising silicon are preferred.

As mentioned above, the structured electroactive material is made of particles containing an electroactive material that provide an anode active mass that is open (i.e. contains space within the mass) and allows the growth of the SEI and the expansion of the electroactive material within the anode during charging, i.e. lithiation, of the anode. The open structure of the anode active mass can be brought about by the structure of the particle itself, e.g. it could have structural elements, e.g. pillars or similar protrusions, on its surface that provide spaces between the elements that allow for the growth of the SEI and the expansion of the silicon during lithiation.

In particular, the structured electroactive material is a structured silicon material made of silicon-containing particles that provide an anode active mass that is open (i.e. contains space within the mass) and allows the growth of the SEI and the expansion of the silicon-containing anode during charging, i.e. lithiation, of the anode. The open structure can be brought about by the structure of the particle itself, e.g. it could have structural elements, e.g. pillars or similar protrusions, on its surface that provide spaces between the elements that allow for the growth of the SEI and the expansion of the silicon during lithiation.

In another embodiment, each particle includes voids within its structure, which voids allow the particle to fulfil the same function as the pillared particles referred to herein above.

Alternatively, the particles could be shaped such that they provide space between the particles for the growth of the SEI and the expansion of the electroactive material during lithiation when deposited onto the current collector of an anode. Such particles will generally be elongated and have an aspect ratio (ratio of the smallest to largest dimension) of at least 5 and optionally at least 10, e.g. at least 25 or at least 100.

In particular, the particles could be shaped such that they provide space between the particles for the growth of the SEI and the expansion of the silicon during lithiation when deposited onto the current collector of an anode. Such particles will generally be elongated and have an aspect ratio (ratio of the smallest to largest dimension) of at least 5 and optionally at least 10, e.g. at least 25.

In the first case mentioned above (i.e. particles containing structural elements) the smallest dimension of a structural element should be at least 50 nm, preferably at least 100 nm and less than or equal to 10 μm. The structural elements preferably have an aspect ratio (defined as the ratio of the largest to smallest dimensions of the element) of more than one, most preferably at least five, which helps to improve long range connectivity within the electrode active material. The maximum dimension of the structured electroactive material particle (preferably a silicon particle having spaced-apart structural elements on its surface) is preferably less than 60 μm, most preferably less than 30 μm. If the particles are larger than this in two or more dimensions then it becomes difficult to fabricate cell anodes with layer thicknesses matched to the cathode dimensions.

In the present specification, we state the sizes, compositions and shapes of various structured materials and particles for inclusion in a rechargeable battery cell. It should be understood that when these materials and/or particles are included in a rechargeable battery cell, at least 50% (by weight) of the particles should fall within the size ranges, compositions or shapes specified herein, optionally at least 80%, preferably at least 90%, for example at least 95%.

Except where stated all percentages given herein are based on weight.

The structural elements referred to above having a minimum diameter of at least 0.01 μm, for example at least 0.05 μm and an aspect ratio of at least 5 include electroactive elongate structures selected from fibres, wires, nano-wires, threads, pillars, tubes and rods. These elongate structures are suitably formed into a composite electrode material and applied as a layer to a current collector to form the anode of a lithium ion battery.

As indicated above, the elongate structures may optionally be provided in the form of a felt in which random entanglement of the elongate structures results in the formation of a connected network within the composite electrode or anode material, e.g. with multiple intersections between the elongate structures within the composite. Alternatively, the elongate structures may be formed into a scaffold structure comprising a three-dimensional arrangement of interconnected elongate structures.

By the term "composite electrode material" it should be understood to mean a material comprising a mixture, preferably a substantially homogeneous mixture, of one or more electroactive materials and at least one or more further components which may be selected from, but are not limited to, the group comprising a binder, a conductive material, a viscosity adjuster, a filler, a cross-linking accelerator, a coupling agent, and an adhesive accelerator. The components of the composite material are suitably mixed together to form a homogeneous composite electrode material that can be applied as a coating to a substrate or current collector to form a composite electrode layer. Preferably the components of the composite electrode material are mixed with a solvent to form an electrode mix, which electrode mix can then be applied to a substrate or current collector and dried to form the composite electrode material. The composite electrode material is suitably provided on the current collector in the form of a cohesive mass in which the short term order of the components of the material is substantially retained over at least 100 charging and discharging cycles of a battery including the composite material. Preferably the composite electrode material is porous allowing the liquid electrolyte to permeate the composite and wet at least some of the surfaces of the electroactive materials. The porosity of the composite can be defined as the total volume of void space contained within the composite that is accessible by the liquid electrolyte as a percentage of the total volume of the composite. The porosity may be measured using mercury porosimetry. The composite may have a porosity of at least 5% and is preferably at least 20%. The porosity may be less than 80% and preferably is no more than 60%. Most preferably the porosity is in the range 25-50%.

By the term "electrode mix" it should be understood to mean compositions including a slurry or dispersion of an electroactive material in a solution of a binder as a carrier or solvent. It should also be understood to mean a slurry or dispersion of an electroactive material and a binder in a solvent or liquid carrier.

The following are some non-exhaustive examples of structured silicon particles covered by the above description. It will be appreciated that the present application is not limited to structured silicon particles only and extends to structured particles or elements of other electroactive materials as defined herein:

Silicon-based fibres with a diameter of at least 10 nm, preferably at least 30 nm and more preferably at least 50 nm. Preferably the silicon-based fibres of the first aspect of the invention have a diameter of 10 to 500 nm, preferably 10 to 250 nm, more preferably 50-250 nm and especially 80-200 nm. These silicon containing fibres preferably have a length of at least 500 nm, preferably at least 1 μm and preferably no more than 500 μm. Silicon fibres having a length of 1 to 150 μm, preferably 1-80 μm and especially 5-60 μm are suitably used in the manufacture of cells according to the first aspect of the invention. Also the fibres may be formed into felts or scaffolds comprising such fibres. The fibres may also form the core of a core-shell elongated structure, for example a silicon-based nanowire with an outer conductive coating, or a conductive tube structure (e.g. a carbon nanotubes) with silicon-based material inside the central space of the tube, i.e. silicon-containing tubes. Fibres of other electroactive materials having the dimensions referred to herein above and tubes filled with other electroactive materials (e.g. tin-containing tubes, gallium-containing tubes) are also included within the scope of the present invention.

Silicon based tubes with a wall thickness of ≥10 nm, e.g. ≥50 nm or optionally ≥100 nm and a length of ≥1 μm, e.g. ≥2 μm. Silicon based tubes are generally defined by three independent dimensions. For silicon tubes, the first dimension (usually wall thickness) is suitably of the order of 0.01 μm to 2 μm, preferably 0.05 μm to 2 μm, more preferably 0.08 μm to 0.5 μm. The second dimension is suitably at between 2.5 and 100 times the first dimension for tubes. The third dimension should be between 10 to 500 times as large as the first dimension. The third dimension may be as long as 500 μm, for example. Tubes formed from an electroactive material other than silicon are also included within the scope of the present invention.

Silicon-based ribbon with a thickness of 50-200 nm, e.g. 80-150 nm, a width of 250 nm to 1 μm, e.g. 500-800 nm and a length of ≥1 μm, e.g. ≥5 μm. Also felts comprising such ribbons. Silicon based ribbons may also be defined by three independent dimensions; the first dimension is suitably of the order of 0.05 µm to 2 µm, preferably 0.08 µm to 2 µm, more preferably 0.1 µm to 0.5 µm. The second dimension is suitably at least two or three times larger than the first dimension. The third dimension is suitably 10 to 200 times as large as the first dimension. The total length of the third dimension may be as large as 500 µm, for example. Ribbons formed from an electroactive material other than silicon are also included within the scope of the present invention.

Silicon-based flake with a thickness of 50-200 nm, e.g. 80-150 nm, and the two other dimensions in the range of 1-20 µm, e.g. 3-15 µm. Silicon-based flakes may also be defined by three independent dimensions. The first dimension is suitably of the order of 0.05 µm to 0.5 µm, preferably 0.08 µm to 0.2 µm and more preferably 0.1 µm to 0.15 µm. The second dimension is suitably between 10 and 200 times the first dimension. The third dimension should be 10 to 200 times as large as the first dimension. The total length of the third dimension may be as large as 500 µm, for example. Flakes formed from an electroactive material other than silicon are also included within the scope of the present invention.

A silicon-based pillared particle consisting of a silicon-based particle core of diameter 5-25 µm, e.g. 8-18 µm, with an array of silicon pillars, rods or nanowires attached thereto, the pillars may have a diameter of at least 50 nm and less than or equal to 10 µm, in particular no more than 1000 nm, preferably 50-250 nm, e.g. 100-200 nm, and may have a length of at least 0.5 µm and no more than 200 µm, preferably in the range 1-50 µm, more preferably 1-5 µm, e.g. 2-4 µm. The particle core can have a regular or irregular cross-section and can be spherical or non-spherical. The largest dimension of the silicon-based pillared particle will generally be less than 40 µm, e.g. less than 30 µm. Pillared particles formed from an electroactive material other than silicon are also included within the scope of the present invention.

A silicon-containing particle comprising of a particle core other than silicon, said core having a diameter of 5-25 µm, e.g. 8-18 µm, with an array of silicon-comprising pillars, nanowires or rods attached thereto, the pillars may have a length of at least 0.5 µm and no more than 200 µm, preferably in the range 1-100 µm, more preferably 1-50 µm. The average diameter of the pillars is preferably less than 1000 nm, more preferably less than 250 nm. The particle core can have a regular or irregular cross-section and can be spherical or non-spherical. The largest dimension of the integrated structured particle will generally be less than 40 µm, e.g. less than 30 µm.

A particle comprising a silicon-containing particle core, said core having a diameter of 5-25 µm, e.g. 8-18 µm, with an array of pillars formed from an electroactive material other than silicon attached thereto, the pillars having diameter of 10-500 nm, preferably 50-250 nm, e.g. 100-200 nm, and a length of 1-5 µm, e.g. 2-4 µm. The particle core can have a regular or irregular cross-section and can be spherical or non-spherical. The largest dimension of the integrated structured particle will generally be less than 40 µm, e.g. less than 30 µm.

A silicon-comprising porous particle comprising a silicon based particle having many voids or pores dispersed within it. At least some of the walls between adjacent pores having a thickness of ≥10 nm, preferably ≥20 nm, ≥30 nm or ≥50 nm, e.g. ≥75 nm and extending over a length of ≥100 nm, e.g. ≥150 nm, the diameter of the porous particle being 1-30 µm, e.g. 5-20 µm. Preferably the porous particles included in the cells of the present invention have a principle diameter in the range 1 to 15 µm, preferably 3 to 15 µm and contain pores having diameters in the range 1 nm to 1500 nm, preferably 3.5 to 750 nm and especially 50 nm to 500 nm. Porous particles formed from an electroactive material other than silicon are also included within the scope of the present invention.

A silicon-based porous particle fragment, said fragment being derived from a silicon-containing porous particle referred to above. Preferably the silicon-based porous particle fragment comprises porous particle fragments having a maximum dimension of at least 1 µm, preferably at least 3 µm and a pore wall thickness of at least 0.01 µm, suitably at least 0.05 µm, preferably at least 0.1 µm.

Suitably the diameter of the porous particle fragment is in the range 1 to 40 µm, preferably 1 to 20 µm and more preferably 3 to 10 µm. Porous particle fragments formed from an electroactive material other than silicon are also included within the scope of the present invention.

A silicon-containing nano-rod structure comprising silicon-containing columnar bundles having a diameter of 50 to 100 nm and a length of 2 to 5 µm. Each nano-rod in the structure preferably has a diameter of at least 10 nm.

Silicon-containing substrate particles as described herein and substrate particles formed from an electroactive material other than silicon are also included within the scope of the present invention.

Silicon-containing scaffold structures as described herein and scaffold structures formed from an electroactive material other than silicon are also included within the scope of the present invention.

The term "fibre" should be understood to include wires, nano-wires, threads, filaments, pillars and rods as described herein below and these terms may be used interchangeably. However, it should be appreciated that the use of the term "pillar" in the context of the present invention is used to describe an elongate structure such as a fibre, wire, nano-wire, thread, filament or rod which is attached at one end to a particular substrate. Fibres, wires, nano-wires, threads and filaments may in one embodiment be obtained by detaching pillars from the substrate to which they are attached.

Silicon-based filaments, wires, nano-wires, threads, filaments, pillars and rods are specifically described herein. Filaments, wires, nano-wires, threads, filaments, pillars and rods formed from an electroactive material other than silicon are also included in the scope of the present invention.

Further, by the term "silicon-based fibres, wires, nano-wires, threads, filaments, pillars and rods" it should be understood to include an elongate element which can be defined by two smaller dimensions and one larger dimension, the aspect ratio of the larger dimension to the smallest dimension typically being in the range 5:1 to 1000:1. In this respect the terms may be used interchangeably with each other. Branched structures may be referred to as bipods, tripods or tetrapods depending upon the number of branches attached to a main stem.

In the context of the foregoing, the term "nano-wire" should be further understood to mean an element having a diameter in the range 1 nm to 500 nm, a length in the range 0.1 µm to 500 µm and an aspect ratio that may be greater than 10, preferably greater than 50 and especially greater than 100. Preferably the nano-wires have a diameter in the range 20 nm to 400 nm, more preferably 20 nm to 200 nm and especially 100 nm. Examples of nano-wires that can be included in the compositions of the present invention are disclosed in US 2010/0297502 and US 2010/0285358.

By the term "Pillared Particles" it is to be understood to mean particles comprising a particle core and a plurality of pillars extending there from. The pillared particles can be directly applied to the current collector or can be included in a composite electrode material and may be provided as discrete particles, in the form of a network in which the pillars of one particle overlap or are directly connected to the pillars of another particle in the network or as a mixture of both. The pillared particles are most preferably provided in a composite electrode material in the form of discrete particles which, during the charging and discharging cycles, are able to expand and contract without significantly affecting or impinging upon the expansion and contraction of other pillared particles in the electrode material and which are able to contribute to the continued electrical conductivity of the electrode material over a significant number of charging and discharging cycles.

By the term porous particle it should be further understood to mean particles having a network of voids or channels extending there through. These voids or channels include voids or channels that are enclosed or partially enclosed within the total volume of the particle as well as particles having channels extending into the interior of the particle from its surface. The porous particles are generally characterised by a substantially spherical shape and a relatively smooth surface morphology. By the term "pore" or "channel" as defined in relation to porous particles, it should be understood to mean a void or channel enclosed or partially enclosed within the total volume of the particle as well as a channel extending into the interior of the particle from its surface. The network of pores and/or channels suitably comprises a three dimensional arrangement of pores and/or channels extending through the volume of the particle in which the pore and/or channel openings are provided on two or more planes over the surface of the porous particle. Porous particles typically have a principle diameter in the range 1 to 30 μm, preferably 1 to 15 μm, more preferably 3 to 15 μm and contain pores having diameters in the range 1 nm to 1500 nm, preferably 3.5 to 750 nm and especially 50 nm to 500 nm. Such particles are typically fabricated using techniques such as stain etching of silicon particles or wafers or by etching particles of silicon alloy, such as an alloy of silicon with aluminium. Methods of making such porous particles are well known and are disclosed, for example, in US 2009/0186267, US 2004/0214085 and U.S. Pat. No. 7,569,202.

By the term porous particle fragment it should be understood to include all fragments derived from silicon containing porous particles. Such fragments include structures having a substantially irregular shape and surface morphology, these structures being derived from the silicon material originally defining or bounding the pores or network of pores within the porous particle from which the fragment structures are derived, without themselves comprising pores, channels or a network of pores or channels. These fragments will hereafter be referred to as fractals. The surface morphology of these fractal structures (which are devoid of pores or channels or a network of pores or channels) may include indentations or irregularities arising from the pores or channels or network of pores or channels originally bounded by the silicon structure. These fractal fragments will typically be characterised by the presence of peaks and troughs extending over the surface thereof and will include particles having a spiky appearance as well as those including a plurality of ridges extending from the surface of the particle. The peaks are characterised by a peak height and a peak width. The peak height is defined as the distance between the base of the peak (the place where the peak merges with the body of the fractal) and the apex of the peak. The peak width is defined as the minimum distance between one side of the peak and the other at half height. The term electroactive material-containing porous particle fragment also includes porous particle fragments comprising a network of pores and/or channels defined and separated by electroactive material-containing walls. In particular, the term silicon containing porous particle fragment also includes porous particle fragments comprising a network of pores and/or channels defined and separated by silicon containing walls. These fragments will herein after be referred to as pore containing fragments. By the term "pore" or "channel" as defined in relation to porous particles from which the fragments are derived as well as the porous particle fragments themselves, it should be understood to mean a void or channel enclosed or partially enclosed within the total volume of the particle as well as a channel extending into the interior of the particle from its surface. These pore and/or channel comprising porous particle fragments are also characterised by an irregular shape and surface morphology. In contrast, the porous particles from which the fragments are derived are characterised by a substantially spherical shape and a relatively smooth surface morphology. Where the fractals and pore containing porous particle fragments are described together hereinafter they will collectively be referred to as silicon containing porous particle fragments.

Felts are structures in which fibres of an electroactive material, particularly silicon fibres, are bonded together to form a mat (such as are described in WO2009/010757) or otherwise arranged in a random or non random manner to form an interconnected network of fibres with multiple intersections. Non-bonded felt structures are also included in the scope of the present invention. Pillared particles are disclosed in WO2009/010758. The pillars may be etched on the particle using the techniques disclosed in WO2007/083152, WO2007/083155, WO2010/040985 and WO2010/040986. Fibres can be obtained by etching pillars onto a substrate or particle as described above and severing the pillars from the substrate, e.g. ultrasonically, to form the fibres. Especially preferred structured particles are silicon fibres or silicon pillared particles, which generate silicon to silicon bonds within the anode structure that strengthen the electrode structure.

Electroactive porous particles can be made by various methods, for example see U.S. Pat. No. 7,569,202, US2004/0214085, U.S. Pat. No. 7,244,513 and PCT/GB2010/000943. Sheet-like particles, e.g. flake, and ribbon-like particles can be made as described in WO2008/139157.

By the term "scaffold" it should be understood to mean a three dimensional arrangement of one or more structural elements selected from the group comprising fibres, wires, nanowires, threads, pillars, rods, flakes, ribbons and tubes, which structures are bonded together at their point of contact. The structural elements may be arranged randomly or non-randomly in the three dimensional arrangement. The three dimensional scaffold may comprise coated or uncoated structures having a core comprising an electroactive material such as silicon, tin, germanium or gallium. Alternatively, the scaffold may be a hetero-structure comprising a three-dimensional arrangement of structures comprising an electroactive or a non-electroactive base scaffold material onto which is deposited small islands, nano-wires or a coating of an electroactive material having a composition different to that of an electroactive material from which the scaffold is formed; preferred scaffolds of this type comprise a network of carbon fibres, threads, wires or nano-wires having small islands, nano-wires or a thin film coating of an electroactive material such as silicon, germanium, gallium, tin or alloys or mixtures thereof applied thereto. Where the scaffold comprises a silicon based coating, one or more additional coating layers may be applied thereto. A coating layer may be continuous and extend over substantially the entire surface of the scaffold structure. Alternatively, a coating layer may be discontinuous and may be characterised by an absence of a coating layer over some regions of the surface of the scaffold structure. In one embodiment, the coating material may be distributed randomly or in a set pattern over the surface of the scaffold. Examples of scaffold structures that can be included in the binder compositions of the present invention are disclosed in US 2010/0297502.

Each of the particles, tubes, wires, nano-wires, fibres, rods, sheets and ribbons and scaffolds that can be included in the composite electrode materials used in the manufacture of the battery cells of the present invention may be crystalline, microcrystalline, polycrystalline or amorphous or may include crystalline or polycrystalline regions within an amorphous structure. These structures may be fabricated using etching techniques such as those outlined in WO 2009/010758 or electrospinning as described in US2010/0330419. Alternatively, they can be manufactured using growth techniques such as a catalysed Vapour-Liquid-Solid approach as described in US 2010/0297502. It will be apparent to a skilled person that it is possible to grow nano-particles, nano-wires and nano-tubes on the surface of a conductive substrate such as a carbon particulate substrate using the technique set out in US 2010/0297502.

Elongate structures such as tubes, nano-wires, fibres, rods, sheets and ribbons may also be growth rooted to a substrate or may be harvested there from. Growth rooted structures can be fabricated using techniques known to a person skilled in the art and exemplified in JP2004-281317 and US 2010/0285358. Examples of suitable techniques include affixing structures to a substrate using annealing or impact techniques, for example. Other techniques include chemical vapour deposition, physical vapour deposition, epitaxial growth, atomic layer deposition and the like; these techniques result in growth rooted structures. Alternatively the structures can be formed using etching techniques such as those referred to above.

Where the wires, nano-wires, fibres, rods, pillars, sheets, ribbons and tubes are attached to a substrate, the composition of these structures may be the same or different to that of the substrate.

By the term "carbon substrate" it should be understood to mean a substrate that contains at least 50 w/w % to 100 w/w % carbon and can be used to support the growth thereon of nano-particles, nano-wires or nano-tubes, for example. Examples of carbon based materials that can be used as substrates to support VLS growth of an electroactive particle, nano-wire or nano-tube thereon include carbon black, fullerene, soot, graphite, graphene, graphene powder or graphite foil. Examples of suitable carbon substrates are disclosed in US 2010/0297502.

By the term "substrate particle" it should be understood to mean a particle comprising a dispersion of an electroactive material formed on a particular or granular substrate. The substrate may be an electroactive material, a non-electroactive material or a conductive material. Where the substrate is an electroactive material, it suitably has a different composition to that of the electroactive material dispersed on the substrate. Preferably the particular or granular substrate is a carbon based material, such as graphite, graphene or a conductive carbon such as carbon black. Preferably the dispersed electroactive material is selected from one or more of the group comprising silicon, tin, gallium or germanium or a mixture thereof. Preferred substrate particles comprise a dispersion of nano-particles of an electroactive material having a diameter in the range 1 nm to 500 nm, preferably 1 to 50 nm, on a particular or granular carbon substrate, the substrate particle having a diameter in the range 5 to 50 µm, preferably 20 µm. Silicon is preferred as the dispersed electroactive material. Coverage of the substrate by the silicon nano-particles may be complete or incomplete and is preferably incomplete. Examples of substrate particles that can be used in combination with the electrolyte of the present invention are disclosed in U.S. Pat. No. 6,589,696.

By the term "silicon-based" it should be understood to include structures formed from silicon-containing materials such as elemental silicon having a silicon purity and structure as defined herein below as well as from alloys of silicon with metals such as aluminium, tin, silver, iron, bismuth, zinc, indium, germanium, lead, titanium and combinations thereof. The term "silicon-based" also includes structures which are formed almost entirely from the silicon-containing materials defined herein as well as structures comprising two or more structural components in which at least one component is formed from a material having a composition which differs from that of its adjacent component; in this respect the term silicon based particles includes structures comprising a core formed from a material other than silicon having a silicon-containing coating applied thereto as well as structures in which a non-silicon containing coating has been applied to a silicon-containing core.

The terms tubes, wires, nano-wires, threads, pillars, fibres, rods, filaments, sheets and ribbons should be understood to include both coated and uncoated elongate elements such as wires, nano-wires, threads, pillars, fibres, rods, sheets, tubes, ribbons. Uncoated elongate elements, particles, porous particles and porous particle fragments include silicon-containing particles, porous particles, porous particle fragments, pillared particles, wires, nano-wires, fibres, threads, pillars, rods, filaments, sheets, tubes and ribbons having a uniform composition through a cross-section of the structure, as well as particles, porous particles, porous particle fragments, wires, nano-wires, fibres, threads, pillars, rods, sheets, tubes and ribbons having a silicon-containing core or base layer comprising a silicon-containing material having a first silicon purity and an outer layer comprising a silicon-containing material having a second silicon purity, wherein the second silicon purity is different to the first silicon purity.

Coated particles, porous particles, porous particle fragments, pillared particles, substrate particles, wires, nano-wires, fibres, threads, pillars, rods, sheets, tubes and ribbons include particles, porous particles, porous particle fragments, substrate particles, wires, nano-wires, fibres, rods, sheets, tubes and ribbons comprising a core of an electroactive material such as silicon and having one or more coatings applied thereto are envisaged. Particles, porous particles, porous particle fragments, pillared particles, substrate particles, wires, nano-wires, fibres, threads, pillars, rods, sheets, tubes and ribbons having one or more coatings including an electroactive material such as silicon applied to a core other than silicon are also envisaged. Where a coating is applied, it may provide continuous coverage over the surface to which it is applied or it may only partially cover the exposed area of the underlying surface. Where multiple coatings are applied, each coating may be applied either continuously or discontinuously so that it either fully or partially overlaps an exposed surface area created by a previous layer.

Where multiple layers are applied to a core or an underlying surface (for example, a substrate) it is preferred (although not essential) that each of the coating layers has a different composition to that of the underlying or preceding layer (or the core or substrate where the coat in question is the first coating layer). It will be appreciated that the electroactive materials that can be mixed with the binder compositions of the present invention include one or more elements having a core-shell structure, the structure comprising a core which is surrounded by one or more shells or layers, wherein each shell or layer has a composition that differs from the composition of its preceding shell.

For the avoidance of doubt, coated structures may include structures in which both the core and one or more of the coating layers comprises an electroactive material, structures in which the core comprises an electroactive material and all the coating layers are formed from a non-electroactive material and structures in which the core comprises a non-electroactive material and one or more of the coating layers are formed from an electroactive material. Structures comprising a electroactive core having one or more electroactive coating layers applied thereto are also envisaged. Where particles and elongate elements referred to herein above include a coating of an electroactive material, the cores of these coated elongate elements and particles are suitably selected from materials such as carbon, preferably hard carbon or graphite, an electroactive ceramic material or a suitable metal such as silicon, tin, germanium, gallium or alloys or mixtures thereof. Where the silicon containing structures referred to herein above include a coating, the coating preferably comprises a carbon coating including one or more species selected from the group comprising amorphous carbon, graphite, electroactive hard carbon, conductive carbon, carbon based polymers or carbon black. Coats are typically applied to the silicon-containing structures to a thickness of between 5 and 40% by weight of the coated silicon-containing structure. Methods of coating silicon-containing particles and elongate elements are known to a person skilled in the art and include chemical vapour deposition, pyrolysis and mechanofusion techniques. Carbon coating of silicon structures through the use of Chemical Vapour Deposition techniques is disclosed in US 2009/0239151 and US 2007/0212538. Pyrolysis methods are disclosed in WO 2005/011030, JP 2008/186732, CN 101442124 and JP 04035760. Carbon coatings are able to assist in controlling the formation and stability of SEI layers on the surface of the electroactive material. As indicated above coatings other than carbon based coatings can be used. Examples of suitable alternative coatings include metals such as aluminium, copper, gold and tin as well as conductive ceramic materials and polymer based coatings. Preferably the electroactive elongate element or particle comprises silicon and the coating is a silicon-containing coating.

The diameters of the electroactive particles provided in the cell according to the first aspect of the invention can be determined using a variety of techniques known to a person skilled in the art. Such techniques include air elution analysis, optical granulometry, optical counting methods and laser diffraction techniques.

The silicon material can be doped or undoped. It can be single crystal or polycrystalline or amorphous or a mixture of crystalline and amorphous. However, we have found that with the structured dimensional forms described above it is not necessary to start with polycrystalline and/or amorphous silicon (prior to first charge) to minimise expansion/contraction degradation effects, contrary for example to what is taught in US2009/0305129, US2009/0053589 and U.S. Pat. No. 7,476,469. Silicon material that is essentially mono-crystalline and/or with crystallite size >1 μm is preferred because it can be generally cheaper to prepare and may enable the formation of a more uniform SEI layer during electrode operation.

The structured electroactive material suitably comprises at least 5 wt %, more suitably 10 wt % of the total weight of the active material in the electrode, preferably at least 20 wt %, more preferably at least 50 wt % and especially at least 70 wt %. In particular, the structured electroactive material may be a structured silicon material, which preferably comprises at least 10 wt %, more preferably at least 20 wt %, e.g. at least 50 wt %, of the total weight of the active material in the electrode. The structured silicon material suitably comprises 5 to 90 wt % of the total weight of the active material in the electrode, more suitably 25-90 wt %, preferably 30 to 80 wt % and especially 40 to 70 wt %.

The structured electroactive materials described herein above are suitably formed into a composite electrode material applied to the surface of a current collector to form an anode for inclusion, together with the electrolyte compositions described herein, in the battery cells of the present invention. In particular, anodes are suitably formed from composite electrode materials comprising the structured silicon materials described herein.

It has been found that the use of a cyclic carbonate including a vinyl group and/or a halogenated cyclic carbonate (such as FEC and/or DFEC) as an electrolyte additive within certain concentration ranges defined herein has a particularly pronounced effect in improving the cycling performance of lithium ion cells including a structured electroactive material, particularly a structured silicon material. In particular, it has been found that the use of VC and/or a fluorinated ethylene carbonate, particularly FEC, DFEC or a mixture thereof as an electrolyte additive within certain defined concentration ranges has a particularly pronounced effect in improving the cycling performance of lithium ion cells including structured silicon material.

It will be appreciated from the following disclosure that the concentration of both the cyclic carbonate including a vinyl group and the halogenated cyclic carbonate in the electrolyte solution will depend on whether these components are added independently of each other or are present as a mixture. In general the cyclic carbonate including a vinyl group will suitably comprise at least 1%, 2%, 3%, 5%, 10% or 15% by weight of the electrolyte solution. The concentration of the halogenated cyclic carbonate will, in general, not exceed 70 wt % of the electrolyte solution.

However, where the electrolyte solution comprises a cyclic carbonate including a vinyl group as the only additive, this suitably comprises 3.5 to 8 wt % of the total electrolyte solution, preferably 4.5 to 6 wt % and especially 5 to 6 wt %. Batteries including an electrolyte solution comprising 3.5 to 8 wt %, especially 5 to 6 wt % of a cyclic carbonate including a vinyl group have been observed to exhibit a superior performance compared to batteries including an electrolyte solution in which, the concentration of a cyclic carbonate including a vinyl group falls outside this range. This effect is suitably exemplified in the particular case of adding VC alone to the electrolyte (i.e. no fluorinated ethylene carbonate is added). The improvement in cycling performance is not especially evident if the amount of VC added is the same as that used in the graphite anode art (2% of the weight of the electrolyte) and the amount that it is necessary to add, which is greater than 3.5%, in order to derive these benefits is substantially greater than would be evident from the graphite anode art. However, if the content of VC alone is too high (above about 8% of the weight of the electrolyte), then the performance of the cell falls, which we believe is due to the increased resistance of the electrolyte (lower ionic conductivity). A high VC content would also increase the cost and reduce the shelf life of the electrolyte. We have found that, with a VC content in the range 3.5-8%, especially 5 to 6% based on the weight of the electrolyte, a substantially improved cycling performance can be achieved with anodes of structured silicon material while at the same time maintaining the electrolyte resistance and the cost and the shelf life of the cell at commercially acceptable levels. We believe that the optimum results can be achieved with a VC concentration of around 4.5-6%, e.g. about 5 to 6%. In a preferred first embodiment of the first aspect of the invention, the electrolyte solution comprises 5 to 6% by weight of a cyclic carbonate including a vinyl group. Electrolyte solutions comprising 5 to 6 wt % of vinylene carbonate are particularly preferred. Batteries containing an electrolyte comprising 5 to 6 wt % of vinylene carbonate and a structured silicon selected from silicon fibres or pillared particles of silicon are especially preferred.

The percentages of the additives mentioned herein are calculated based on the weight of the additives as compared to the total weight of the electrolyte solution including additives. For example an electrolyte solution with 5% of a cyclic carbonate including a vinyl group such as VC as an additive would be made by adding 5 g of the cyclic carbonate including a vinyl group (such as VC) to 95 g of the electrolyte solution.

Where a halogenated cyclic carbonate is used alone, this suitably comprises at least 5% of the total weight of the electrolyte, preferably at least 12 wt % and more preferably at least 15 wt %. The concentration of the halogenated cyclic carbonate in the electrolyte solution does not typically exceed 75 wt %, preferably 70 wt %, more preferably 50 wt % and especially 30 wt %. It has been found that in the particular case where the electrolyte solution includes fluoroethylene carbonate (FEC) and/or difluoroethylene carbonate (DFEC) as the halogenated cyclic carbonate at a concentration of between 5 wt % and 50 wt %, batteries prepared using these electrolyte solutions exhibit efficiencies of over 90% over more than 50 cycles. Particularly good results have been obtained by using electrolyte solutions comprising at least 10 wt %, preferably at least 12 wt %, more preferably at least 15 wt % of a halogenated cyclic carbonate. An especially preferred second embodiment of the invention provides a battery cell including an electrolyte comprising at least 10 wt %, preferably at least 12 wt %, more preferably at least 15 wt % of a halogenated cyclic carbonate and a structured silicon selected from silicon fibres and silicon pillared particles and mixtures thereof.

In addition to the additives referred to herein above, the electrolyte solution typically comprises as a base solvent a mixture of a chain or linear carbonate and a cyclic carbonate other than a cyclic carbonate including a vinyl group. The chain or linear carbonate and the cyclic carbonate other than a cyclic carbonate including a vinyl group are suitably present in a volume ratio of between 7:3 and 3:7, preferably between 7:3 and 1:1. Where a halogenated cyclic carbonate is added to the electrolyte solution, this may totally or partially replace the cyclic carbonate in the base solvent mixture, providing that the ratio of the total amount of cyclic carbonate (base cyclic carbonate plus halogenated cyclic carbonate) to chain or linear carbonate remains within the ratio specified herein above.

Alternatively, the halogenated cyclic carbonate can be added to a base electrolyte solution. This addition will typically alter the initial ratio of the cyclic carbonate to the chain (or linear) carbonate. However, the amount of halogenated cyclic carbonate added to the solution should be sufficient such that the volume ratio range of the cyclic to linear carbonates defined above is not exceeded.

Thus, in one embodiment of the present invention where a halogenated cyclic carbonate partially replaces a base solvent cyclic carbonate, an electrolyte solution comprising a mixture of a cyclic and a chain (or linear) carbonate in a ratio of 30:70 will suitably comprise 15 vol % of a halogenated cyclic carbonate, 15 vol % of a base solvent cyclic carbonate and 70 vol % of a base solvent chain (or linear) carbonate. If the concentration of the halogenated cyclic carbonate is increased to 30 vol %, it will only be necessary to add 70 vol % of a base solvent chain (or linear) carbonate in order to maintain the proportion of cyclic and chain carbonates within the 30:70 ratio; no additional base solvent cyclic carbonate will be required since the halogenated cyclic carbonate completely replaces the cyclic carbonate in this embodiment. It will be appreciated that the same considerations will apply in preparing electrolyte solutions having differing proportions of cyclic and chain (or linear) carbonates as base solvents.

Where a halogenated cyclic carbonate is used as an additive this is suitably added to a base solvent comprising a mixture of a cyclic carbonate and a chain or linear carbonate. The halogenated cyclic carbonate can be added to the base solvent in an amount of at least 5% by weight, preferably at least 12 wt %, more preferably at least 15 wt %, for example 30 wt %. The base solvent suitably comprises a cyclic carbonate and a chain or linear carbonate in a ratio of between 7:3 and 3:7, preferably between 7:3 and 1:1.

Examples of cyclic carbonates that can be used as base solvents include, but are not limited to, ethylene carbonate (EC), diethylene carbonate (DEC), propylene carbonate (PC) and butylene carbonate, γ-butyrolactone and γ-valerolactone. Examples of chain or linear carbonates that can be used as base solvents include, but are not limited to, dimethylcarbonate (DMC), diethylcarbonate (DEC), ethyl methyl carbonate (EMC), methyl propyl carbonate, dibutyl carbonate (DBC) and methyl octyl carbonate (MOC). Preferably the base cyclic carbonate is ethylene carbonate (EC). Preferably the chain (or linear) carbonate is ethyl methyl carbonate or diethyl carbonate. In a particularly preferred third embodiment the base solvent comprises a mixture of ethylene carbonate (EC) and ethyl methyl carbonate (EMC). In a preferred embodiment of the first aspect of the invention, there is provided a battery including a structured silicon material selected from a silicon fibre material and silicon pillared particles and an electrolyte comprising a mixture of a cyclic carbonate and a chain or linear carbonate in a ratio of between 30:70 to 70:30, preferably between 30:70 and 1:1, said electrolyte including as an additive at least 5 wt % of a halogenated cyclic carbonate, preferably at least 12 wt %, for example 15 or 30 wt %. In an especially preferred fourth embodiment of the first aspect of the invention there is provided a battery comprising a structured silicon material selected from silicon fibres and silicon pillared particles or mixtures thereof and an electrolyte comprising a mixture of ethylene carbonate and ethyl methyl carbonate in a ratio of between 3:7 and 1:1.

Without wishing to be constrained by theory it is believed that the use of halogenated cyclic carbonates such as FEC and DFEC as electrolyte additives results in the formation of a stable SEI layer containing lithium fluoride and ethylene carbonate derivatives. The SEI layer formed by reaction of the halogenated cyclic carbonate with the silicon surface is believed to be less dense and more flexible than SEI layers formed upon reaction of the silicon surface with ethyl carbonate, for example and these features help it to maintain a stable structure upon prolonged cycling.

An electrolyte comprising a mixture of a cyclic carbonate including a vinyl group and a halogenated cyclic carbonate, particularly a fluorinated cyclic carbonate has been found to give particularly beneficial results when included in a battery. The cyclic carbonate including a vinyl group and the halogenated cyclic carbonate together suitably comprise at least 3.5 wt % of the total weight of the electrolyte solution, preferably at least 5 wt %. The combined amounts will typically be less than 70 wt %, suitably less than 50 wt % and preferably less than 30 wt % of the total weight of the electrolyte solution. The concentration of the cyclic carbonate containing the vinyl group is preferably at least 1 wt %, suitably at least 3 wt % of the total weight of the electrolyte and the concentration of the halogenated cyclic carbonate is suitably at least 3 wt %, preferably at least 12 wt %, for example 15 wt % of the total weight of the electrolyte. Especially beneficial electrolyte solutions are those in which VC is used in combination with one or more fluorinated ethylene carbonates such as FEC and/or DFEC, in which case, the combined amount of such additives should exceed 3.5%, e.g. 5% of the total weight of the electrolyte. The combined amounts will generally be less than 70%, preferably less than 50%, more preferably less than 40% and optionally less than 30% of the total weight of the electrolyte to avoid a significant increase in the electrolyte ionic resistance. An electrolyte solution containing such a mixture of additives should preferably contain at least 1 wt % of VC and at least 3%, suitably at least 12% and preferably at least 15 wt % in total of one or both fluorinated ethylene carbonate (FEC and/or DFEC). When both VC and one or more fluorinated ethylene carbonate are present in the electrolyte, the amount of VC will generally not exceed 10% VC, e.g. it will not exceed 8%, of the total weight of the electrolyte. In a preferred fifth embodiment of the invention the mixture contains 1 to 8 wt % VC and 3 to 60 wt % FEC, preferably 5 to 50 wt %, more preferably 10 to 40 wt % and especially 15 to 80 wt %.

In a preferred embodiment of the first aspect of the invention, batteries are provided including an electrolyte comprising as an additive a mixture of vinylene carbonate and fluoroethylene carbonate or difluoroethylene carbonate or a mixture thereof. In a sixth particularly preferred embodiment, the electrolyte comprises as an additive a mixture comprising 2 wt % vinylene carbonate and 5 wt % of fluoroethylene carbonate or difluoroethylene carbonate or a mixture thereof. A seventh particularly preferred embodiment of the first aspect of the invention provides a battery including an electrolyte comprising a mixture comprising 5 wt % vinylene carbonate and 5 wt % fluoroethylene carbonate or difluoroethylene carbonate or a mixture thereof. An eighth particularly preferred embodiment of the first aspect of the invention provides a battery including an electrolyte comprising a mixture comprising 2 wt % vinylene carbonate and 10 wt % fluoroethylene carbonate or difluoroethylene carbonate or a mixture thereof. A ninth particularly preferred embodiment of the first aspect of the invention provides a battery including an electrolyte comprising a mixture comprising 2 wt % vinylene carbonate and 15 wt % fluoroethylene carbonate or difluoroethylene carbonate or a mixture thereof. A tenth particularly preferred embodiment of the first aspect of the invention provides a battery including an electrolyte comprising a mixture comprising 2 wt % vinylene carbonate and 30 wt % fluoroethylene carbonate or difluoroethylene carbonate or a mixture thereof. A eleventh particularly preferred embodiment of the first aspect of the invention provides a battery including an electrolyte comprising a mixture comprising 5 wt % vinylene carbonate and 10 wt % fluoroethylene carbonate or difluoroethylene carbonate or a mixture thereof. A twelfth particularly preferred embodiment of the first aspect of the invention provides a battery including an electrolyte comprising a mixture comprising 5 wt % vinylene carbonate and 15 wt % fluoroethylene carbonate or difluoroethylene carbonate or a mixture thereof. A thirteenth particularly preferred embodiment of the first aspect of the invention provides a battery including an electrolyte comprising a mixture comprising 5 wt % vinylene carbonate and 30 wt % fluoroethylene carbonate or difluoroethylene carbonate or a mixture thereof. The present inventors have observed that VC appears to show a synergistic effect when present with one or more fluorinated ethylene carbonate (FEC and/or DFEC) as electrolyte additives. Without wishing to be constrained by theory, it is believed that one possible explanation for the beneficial effects of adding both a fluorinated ethylene carbonate and VC to an electrolyte solution is that the reduction potential of the fluorinated ethylene carbonate vs. $Li/Li^+$ is higher than that of ethylene carbonate (EC, which is one of the solvents typically found in the electrolyte—see below), and therefore reduction of the fluorinated ethylene carbonate (FEC and/or DFEC) will occur first during the initial formation charge. The fluorinated ethylene carbonate is also likely to be reduced to a radical ion, which could then initiate polymerisation of VC—see equation (2) above.

$CO_2$ can be added in amounts up to its solubility limit since we have found that it further increases the lifetime of the lithium cells. Without wishing to be constrained by theory, it is believed that the presence of $CO_2$ helps the formation of a good quality $Li_2CO_3$ SEI layer on exposed silicon surfaces. The $CO_2$ can be added by passing $CO_2$ gas through the electrolyte solution so that the $CO_2$ dissolves into it. An appropriate amount of $CO_2$ dissolved in the electrolyte solution is at least 0.05 wt % and no more than 0.5 wt %, preferably 0.05 to 0.25 wt %, more preferably 0.16-0.2 wt % of the final solution.

In particular, it has been found that the addition of $CO_2$ to an electrolyte solution containing a cyclic carbonate including a vinyl group, a halogenated cyclic carbonate or a mixture thereof at a concentration of at least 0.05 wt % and no more than 0.5 wt %, e.g. between 0.05 and 0.25%, preferably between 0.1 and 0.2% and especially between 0.16 and 0.2 wt % further improves the performance of cells including the electrolyte solution. Electrolyte solutions including a mixture of cyclic carbonate including a vinyl group, a halogenated cyclic carbonate and $CO_2$ have been found to exhibit a particularly good performance. An electrolyte solution containing a mixture of a cyclic carbonate including a vinyl group, a halogenated cyclic carbonate and $CO_2$ will suitably comprise no more than 70 wt % (based on the total weight of the electrolyte solution) of this mixture, typically less than 50 wt %, preferably less than 30 wt %. The mixture of additives suitably comprises at least 4 wt %, typically at least 10 wt % of the electrolyte solution, preferably at least 12 wt %, more preferably at least 15 wt %, for example at least 20 wt %. In one embodiment the electrolyte solution suitably comprises 4 wt % to 70 wt % of a mixture of a cyclic carbonate including a vinyl group, a halogenated cyclic carbonate and $CO_2$, typically 10 to 50 wt %, preferably 12 to 50 wt %, more preferably 15 to 30 wt %. The electrolyte solution comprising a mixture of a cyclic carbonate including a vinyl group, a halogenated cyclic carbonate and $CO_2$ will suitably comprise this mixture in an amount of at least 3.5 wt % based on the weight of the electrolyte solution, typically at least 5 wt %, preferably at least 10 wt %, more preferably at least 15 wt %, especially 30 wt %, for example 50 wt %. In a preferred embodiment of the invention the halogenated cyclic carbonate comprises 5 to 50 wt %, preferably 6.5 to 50% of the total weight of the electrolyte, preferably 10 to 30 wt % and especially 15 to 30 wt %. The concentration of cyclic carbonate including a vinyl group in such a mixture is suitably at least 1 wt %, 2 wt %, 3 wt %, 5 wt % or 10 wt %; concentration ranges of 1 to 10 wt %, 2 to 5 wt % and especially 2 to 3 wt % are preferred.

In a fourteenth particularly preferred embodiment of the first aspect of the invention there is provided a battery including an electrolyte comprising as an additive a mixture comprising 5 wt % of fluoroethylene carbonate or difluoroethylene carbonate or a mixture thereof and 0.2 wt % $CO_2$. In a fifteenth particularly preferred embodiment of the first aspect of the invention there is provided a battery including an electrolyte comprising as an additive a mixture comprising 5 wt % of vinylene carbonate and 0.2 wt % $CO_2$.

A sixteenth particularly preferred embodiment of the first aspect of the invention provides a battery including an electrolyte comprising as an additive a mixture comprising 5 wt % of fluoroethylene carbonate or difluoroethylene carbonate, or a mixture thereof, 3 wt % vinylcarbonate and 0.2 wt % $CO_2$. A seventeenth particularly preferred embodiment of the first aspect of the invention provides a battery including an electrolyte comprising as an additive a mixture comprising 10 wt % of fluoroethylene carbonate or difluoroethylene carbonate, or a mixture thereof, 3 wt % vinylcarbonate and 0.2 wt % $CO_2$. An eighteenth particularly preferred embodiment of the first aspect of the invention provides a battery including an electrolyte comprising as an additive a mixture comprising 15 wt % of fluoroethylene carbonate or difluoroethylene carbonate, or a mixture thereof, 3 wt % vinylcarbonate and 0.2 wt % $CO_2$. A nineteenth particularly preferred embodiment of the first aspect of the invention provides a battery including an electrolyte comprising as an additive a mixture comprising 5 wt % of fluoroethylene carbonate or difluoroethylene carbonate, or a mixture thereof, 2 wt % vinylcarbonate and 0.2 wt % $CO_2$. A twentieth particularly preferred embodiment of the first aspect of the invention provides a battery including an electrolyte comprising as an additive a mixture comprising 10 wt % of fluoroethylene carbonate or difluoroethylene carbonate, or a mixture thereof, 2 wt % vinylcarbonate and 0.2 wt % $CO_2$. A twenty-first particularly preferred embodiment of the first aspect of the invention provides a battery including an electrolyte comprising as an additive a mixture comprising 15 wt % of fluoroethylene carbonate or difluoroethylene carbonate, or a mixture thereof, 2 wt % vinylcarbonate and 0.2 wt % $CO_2$.

The inventors do not believe that batteries including a silicon-containing active material and an electrolyte including as an additive, a mixture of a halogenated cyclic carbonate, a cyclic carbonate including a vinyl group and $CO_2$ have hereto before been used and the present invention provides a battery comprising a silicon-containing electroactive material, a cathode comprising an active material capable of incorporating lithium and also of liberating lithium electrochemically and an electrolyte wherein the electrolyte comprises 1 to 8 wt % of a cyclic carbonate containing a vinyl group, 3 to 70 wt % of a fluorinated cyclic carbonate and 0.05 to 0.5 wt %, preferably 0.05 to 0.25 wt % of $CO_2$. Silicon containing materials included in the battery of this embodiment include non-structured silicon materials such as native particles and silicon thin films as well as the structured silicon materials referred to above. Native particles are particles that can be obtained by grinding and sieving and/or classifying a bulk silicon-containing material. The native particles suitably have a maximum dimension of less than 40 μm, preferably less than 25 μm. Preferred batteries comprise a silicon-containing electroactive material (including structured and non-structured silicon materials), a cathode comprising an active material capable of incorporating lithium and also of liberating lithium electrochemically and an electrolyte wherein the electrolyte comprises 1 to 8 wt % vinylene carbonate, 3 to 70 wt % fluoroethylene carbonate and 0.05 to 0.25 wt % of $CO_2$. Particularly preferred batteries comprise a silicon-containing electroactive material (including structured and non-structured silicon materials), a cathode comprising an active material capable of incorporating lithium and also of liberating lithium electrochemically and an electrolyte wherein the electrolyte comprises 2 to 6 wt % vinylene carbonate, 5 to 50 wt % fluoroethylene carbonate and 0.16 to 0.20 wt % $CO_2$. Especially preferred batteries comprise a silicon-containing electroactive material (including structured and non-structured silicon materials), a cathode comprising an active material capable of incorporating lithium and also of liberating lithium electrochemically and an electrolyte as defined in accordance with the sixteenth to twenty-first particularly preferred embodiments of the first aspect of the invention.

It should be appreciated that because the cyclic carbonate including a vinyl group, the halogenated cyclic carbonate and the $CO_2$ will be consumed during the lifetime of the cell, the amounts of additives expressed herein are the amounts that are initially in the electrolyte at the time that the cell is manufactured. In particular, where the electrolyte contains a mixture of VC, a fluorinated ethylene carbonate such as FEC or DFEC and $CO_2$ these will be consumed during the lifetime of the cell, e.g. during charge and discharge of the cell and formation of the SEI layer; the amounts of these additives expressed herein are the initial amounts that are in the electrolyte at the time that the cell is manufactured.

In addition to the structured silicon-containing material as described above, e.g. fibres; felts; scaffolds; pillar bundles; tubes; porous particles; or pillared particles, the anode can include other active materials, i.e. materials that can be lithiated and delithiated during the cycling of the battery cell for example graphite or tin. However, at least 5 wt %, suitably at least 10 wt %, more suitably at least 20 wt %, optionally at least 50 wt % and preferably at least 70 wt % of the active material in the anode is the above structured silicon. The anode can also include other known additives, e.g. forms of carbon black, acetylene black or carbon fibres which are known to be added to lithium cells to increase the conductivity of the anodes. Each electroactive material-containing particle can be composed wholly of one type of electroactive material or can include other active or non-active material, e.g. carbon or tin; where the other material is non-active, it may enhance the electrical conductivity of the anode. For example, the electroactive material may be carbon-coated. In particular, each silicon-containing particle can be composed wholly of silicon or can include other active or non-active material, e.g. carbon or tin; where the other material is non-active, it may enhance the electrical conductivity of the anode. For example, the silicon may be carbon-coated.

For reasons of cost, where silicon is used as the electroactive material in the present invention it is preferably the cheaper silicon having a purity of 99.97% or less, e.g. 99.80% or less or 99.7% or less, preferably at least 90%, rather than the high purity (and hence more expensive) silicon powder having a purity of at least 99.99% or at least 99.999% although the use of this higher purity silicon is not excluded in the context of the present invention. Preferably the initial silicon material is crystalline. An example starting material for making silicon-containing fibres and pillared particles is Silgrain® HQ or Silgrain® Jetmilled Low Fe, both supplied by Elkem and having diameters in the range 10 to 50 μm, suitably 15 to 40 μm and preferably 25 μm. This results in mainly mono-crystalline fibres or pillared particles.

Apart from the additives referred to above, the electrolyte may be any electrolyte that is operational in a lithium ion battery with a silicon anode, e.g. a lithium salt, such as lithium hexafluorophosphate ($LiPF_6$), $LiBF_4$, Lithium bis(oxatlato) borate (LiBOB) or $LiClO_4$ or a mixture thereof, dissolved in one or more cyclic and dialkyl carbonates e.g. ethylene carbonate, dimethyl carbonate, diethyl carbonate, ethyl methyl carbonate. Examples of other electrolyte salts that can be used are found in JP 2008234988, U.S. Pat. No. 7,659,034, US 2007/0037063, U.S. Pat. No. 7,862,933, US 2010/0124707, US 2006/0003226, U.S. Pat. No. 7,476,469, US 2009/0053589 and US 2009/0053589. Preferably the electrolyte salt is $LiPF_6$ or a mixture of $LiPF_6$ and lithium bisoxalate borate (LiBOB). A preferred electrolyte solution comprises 0.9 to 0.95M LiPF6 and 0.05 to 0.1M LiBOB. The concentration of the lithium salt in the electrolyte solution is not limited but is preferably in the range of 0.5 to 1.5M. When larger amounts of additives are used it is preferable to increase the concentration of the lithium salt to prevent excessive depletion of lithium in the final electrolyte solution.

The anode material can be held in a coherent mass by a binder and we have found that PAA (Polyacrylic Acid or alkali metal salts thereof) is especially good in the cell described above. Other suitable binders include CMC and PVdF. Alternatively the anode can be made into a felt or bonded to a copper current collector as described in WO2009/010758 and WO2009/010759 respectively.

The amount of the active material, binder and additives, e.g. conductivity enhancers, used in the composite anode are generally preferably as follows, based on the weights of the dry ingredients:

| | |
|---|---|
| Active material | 60-95%, in which 10-95%, more preferably 20-95% (based on the weights of the dry anode ingredients) is made up of the above structured silicon particles |
| Binder | 5-20%, typically 5-15% |
| Additives | 0-20% (for example conductive additives or fillers) |

Such that the total adds up to 100%.

The cathode material can be any material known by those skilled in the art as suitable for use in lithium-ion batteries. Examples include $LiCoO_2$, Mixed Metal Oxides (MMO, for example $Li_{1+x}Ni_{0.8}CO_{0.15}Al_{0.05}O_2$ or $Li(Li_aNi_xMn_yCo_z)O_2$), phosphate-based cathodes such as $LiFePO_4$, $LiMn_2O_4$, $LiNiO_2$, non-lithiated cathode materials like $V_6O_{13}$, and sulphur/polysulphide cathodes. Preferred cathode materials are $LiCoO_2$ and MMO.

DETAILED DESCRIPTION OF INVENTION

Figure 1:
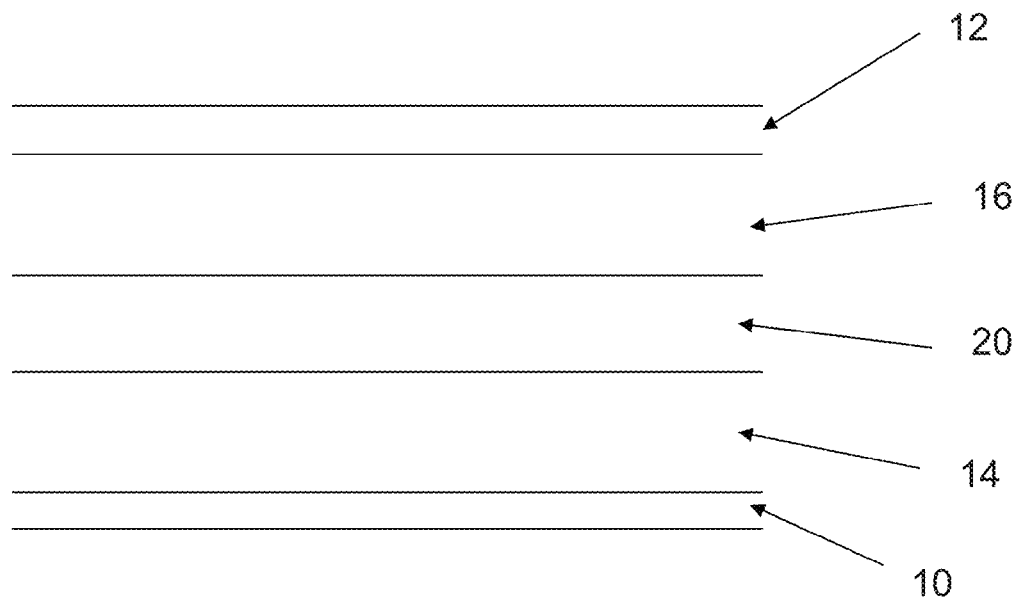
FIG. 1 is a schematic of a cell in accordance with the present invention.

A series of rechargeable battery cells were assembled as depicted in FIG. 1 and used in a series of tests to assess the effect of various additives in various amounts on the ability of a battery cell to undergo repeated charging/discharging cycles.

Electrode and Cell Fabrication

The anode was prepared as follows: the desired amount of structured silicon material was added to carbon that had been bead milled in deionised water. The resulting mixture was then processed using an IKA overhead stirrer at 1200 rpm for around 3 hours. To this mixture, the desired amount of binder in solvent or water was added. The overall mix was finally processed using a Thinky™ mixer for around 15 minutes. Viscosity of the mix was typically 1000-1400 mPas at 20 rpm. The structured silicon material was either fibres or pillared particles as described above. The carbon was added to improve electrical conductivity and was of non-active forms such as carbon black (e.g. Super-P®, Kejten Black®), acetylene black (e.g. Denka Black®) or carbon fibres. The amount of structured silicon material was 74-80% by weight of the total weight of the dry silicon-carbon-binder mixture. The binder formed 8-12% by weight of the dry mix and the carbon was 12-16% by weight. Table 1 below gives the precise amounts of silicon, carbon and binder used for each batch of test cells.

The anode mixture was used to coat a 10 μm thick copper foil (current collector) using a doctor-blade technique with a 30-35 μm thick layer. The resulting electrode was then allowed to dry.

The cathode material used in the test cells is a commercially available lithium cobalt oxide electrode ($LiCoO_2$) or MMO electrode (e.g. $Li_{1+x}Ni_{0.8}Co_{0.15}Al_{0.05}O_2$).

Unless otherwise noted, the electrolyte used is lithium hexafluorophosphate, dissolved in a mixture of ethylene carbonate and ethyl methyl carbonate (in the ratio 3:7 by volume) and containing different amounts of additives, as described below. Where $CO_2$ is added to the electrolyte it comprises 0.16-0.2 wt % of the total mass of the electrolyte.

Two different types of test cells were made:

Soft Pack Pair Cells (SP Cells)

Anode and cathode electrode pieces of the required size were cut out.

The electrodes were re-dried overnight at 120° C., under dynamic vacuum.

Tags were ultrasonically welded to the anode and cathode

The electrodes were wound/folded into cells, with one layer of porous polyethylene separator supplied by Tonen Chemical Corporation (referred to as a Tonen separator) between them.

The cell windings were sealed inside aluminium laminate bags, with one edge left unsealed for electrolyte filling.

The cells were filled with the required weight of electrolyte, under partial vacuum.

The electrolyte was allowed to soak into the electrodes for one hour.

The final edge of the bag was then vacuum sealed.

"Swagelok" Cells (SW Cells)

Anode and cathode discs of 12 mm diameter were prepared and dried over night under vacuum.

The anode disc was placed in a 2-electrode cell fabricated from "Swagelok"® fittings.

Two pieces of Tonen™ separator of diameter 12.8 mm and 16 um thick were placed over the anode disc.

40 μl of electrolyte was added to the cell.

The cathode disc was placed over the wetted separator to complete the cell.

The electrolyte was allowed to soak into the electrodes for 30 minutes.

A plunger of 12 mm diameter containing a spring was then placed over the cathode and finally the cell was hermetically sealed. The spring pressure maintained an intimate interface between the electrodes and the electrolyte.

Once assembled the cells were connected to an Arbin battery cycling rig, and tested on continuous charge and discharge cycles. The constant-current: constant voltage (CC-CV) test protocol used a capacity limit and an upper voltage limit on charge, and a lower voltage limit on discharge. For the soft pack pair cells the voltage limits were 4.2V and 3V respectively. For the "Swagelok" cells the voltage limits were 4.3V and 3V respectively. The testing protocol ensured that the active anode material was not charged below an anode potential of 25 mV to avoid the formation of the crystalline phase $Li_{15}Si_4$ alloy.

The various tests were carried out on various additives and these are described in Examples 1-7 below. Table 1 gives some important parameters of the test cell batches used in each example.

TABLE 1

| Example | Cell types | Additives under test | Cathode Material | Structured Silicon Anode Material | Anode Binder | Anode mix ratios Si:Binder:Carbon Wt % | Anode Coat Weight (gsm) | Anode layer thickness (μm) |
|---|---|---|---|---|---|---|---|---|
| 1 | SP | VC, VEC | $LiCoO_2$ | Fibres | NaCMC | 80:8:12 | 10 | 30 |
| 2 | SP | 2-8% VC | $LiCoO_2$ | Fibres | NaCMC | 80:8:12 | 10 | 30 |
| 3 | SP | 4-10% VC | $LiCoO_2$ | Fibres | NaCMC | 80:8:12 | 14 | 50 |
| 4 | SP | 4% VC vs. 10% VC | $LiCoO_2$ | Pillared Particles | NaCMC | 80:8:12 | 13 | 34 |
| 5 | SP | 5% VC vs. 5% VC + 5% FEC | MMO | Pillared Particles | NaPAA | 76:12:12 | 19 | 37 |
| 6 | SW | 5% VC vs. 2% VC + 5% FEC + $CO_2$ | MMO | Fibres | NaPAA | 74:10:16 | 18 | 35 |
| 7 | SW | 5% VC vs. 5% VC + $CO_2$ | MMO | Fibres | NaPAA | 74:10:16 | 17-18 | 35 |
| 8 | SW | 5% FEC vs. 2% VC + 5% FEC + $CO_2$ | MMO | Fibres | NaPAA | 74:10:16 | 18-19 | 35 |
| 9 | SW | 2% VC + 5% FEC + $CO_2$ vs. 2% VC + 10% FEC + $CO_2$ | MMO | Fibres | NaPAA | 74:13:13 | 10-12 | |
| 10 | SW | No additives vs Dissolved $CO_2$ vs 3% VC + $CO_2$ vs 3% VC + $CO_2$ + 15% FEC | MMO | Pillared particles (ppSi) | NaPAA | 70:12:18 | 15.6-16.5 | |
| 11 | SW | 3% VC + $CO_2$ + 15% FEC vs 3% VC + $CO_2$ + 30% FEC | MMO | Pillared particles (ppSi) | NaPAA | 70:12:18 | 17.4-17.7 | |
| 12 | SW | 30:70 FEC:EMC + 3% VC + $CO_2$ vs 50:50 FEC:EMC + 3% VC + $CO_2$ | MMO | Pillared particles (ppSi) | NaPAA | 70:12:18 | 17.3-17.6 | |
| 13 | SW | 30:70 FEC:EMC vs 30:70 FEC:EMC + 3% VC additive | MMO | Pillared particles (ppSi) | NaPAA | 70:12:18 | 17.8-18.1 | |
| 14 | SW | 3% VC + $CO_2$ +5% FEC- powder 3% VC + $CO_2$ + 10% FEC ppSi | MMO | Powder ppSi | NaPAA | 70:12:18 | 12 | |

Example 1

Electrolytes containing various amounts of vinylene carbonate (VC) and vinylene ethyl carbonate (VEC) were made up and used in several soft pack pair cells with the parameters outlined in Table 1. The active anode material in each cell was silicon fibres of diameter 100-200 nm and length 30-80 μm. This material was made by etching a silicon wafer and severing the pillars from the substrate, e.g. ultrasonically, to form the fibres (as described above and in WO 2007/083155).

Figure 2:
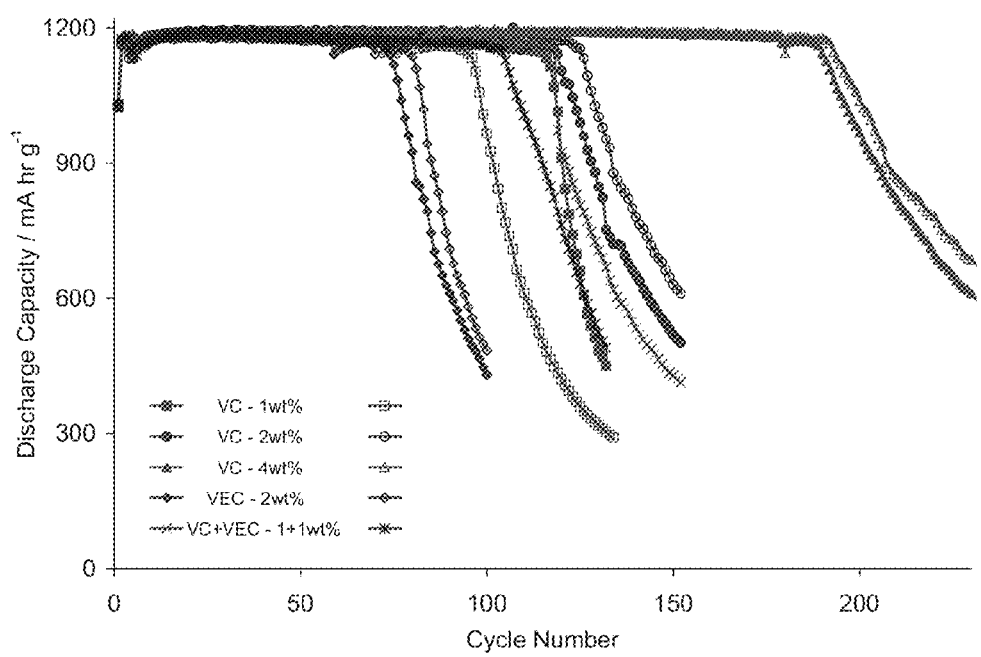
FIG. 2 is graph showing the cycling of silicon fibres in a lithium-ion cell containing an electrolyte with different additives.

In a series of cycles, each cell was charged up to a capacity of 1200 mA·hr·g$^{-1}$ and then discharged over time. The discharge capacity was measured and the results are shown in FIG. 2. The ability to maintain a discharge capacity of 1200 mA·hr·g$^{-1}$ over a number of charging/discharging cycles is indicative of the expected life of the rechargeable battery.

In the graphs of FIG. 2, two cells containing each of the following additives were tested:
2% VEC
1% VC
1% VC plus 1% VEC
2% VC
4% VC As can be seen from the above graphs, the addition of 4% VC provides a spectacularly improved result over the normal VC concentration used in lithium ion rechargeable batteries with carbon anodes.

Example 2

Figure 3:
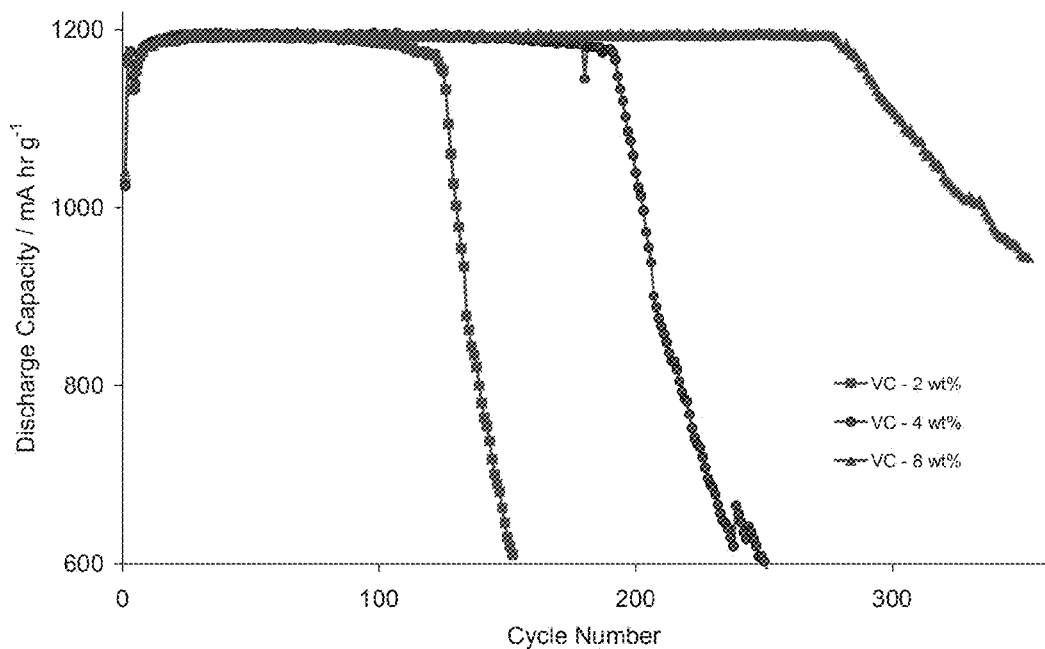
FIG. 3 is a graph showing the results of cycling of a lithium-ion cell having an anode that includes silicon fibres and an electrolyte with different amounts of vinylene carbonate additive.

A test similar to that described above in connection with Example 1 was conducted but with a wider range of VC additives (2% VC, 4% VC and 8% VC). Again, the soft pack test cells used fibre silicon from wafer as described above and were charged to 1200 mAhr/g. The results are shown in FIG. 3, where it is clear that the addition of 8% VC produces a marked improvement in cell life as compared to adding 2 or 4% VC.

It should be noted that the number of cycles that a given cell achieves before a decline in its capacity in respect of a given electrolyte composition is dependent also on other factors of a given cell, including the electrode thickness (weight) and the ratio of cathode active material to silicon anode material. It also depends on the particular conditions prevailing the time, including temperature, charge/discharge rate and the depth of discharge. In any one graph described herein, the cells tested are designed to minimise these extraneous factors. However, the factors vary from example to example and graph to graph and therefore it is not possible to compare the results of one graph with those of another. Rather, within any given graph, the results give a relative measure of the benefit of the different electrolyte formulations rather than an absolute value, which can depend on the above-mentioned factors.

Example 3

Figure 4:
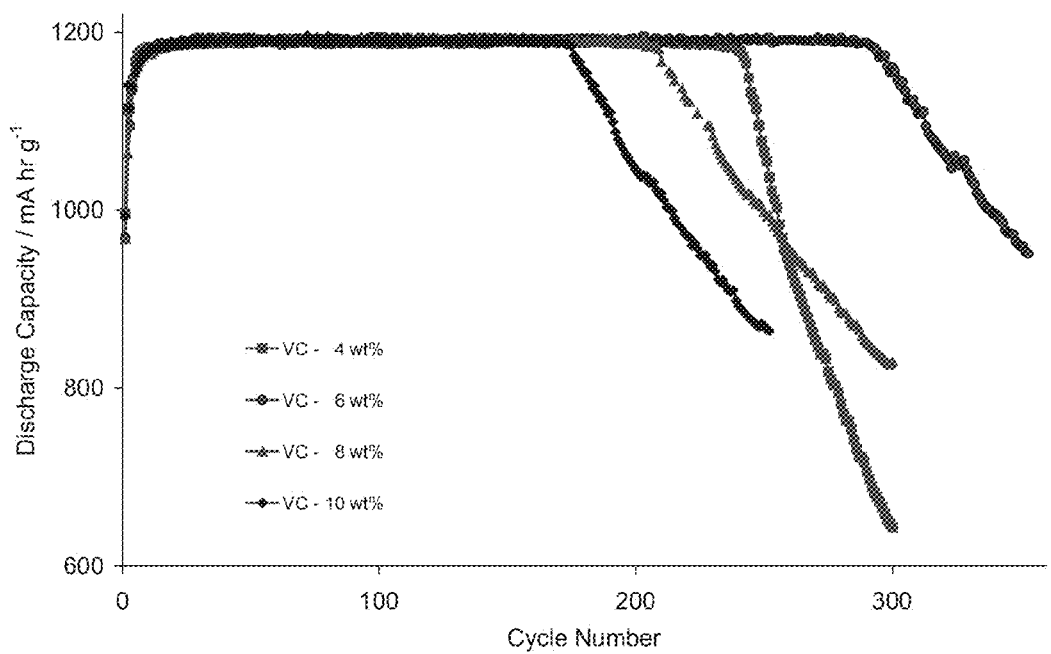
FIG. 4 is a graph showing the cycling of a lithium-ion cell having an anode with silicon fibres and containing an electrolyte with between 4 and 10% by weight of vinylene carbonate.

A further batch of soft pack pair cells, with parameters as listed in Table 1 and 2 were used to test a broader and higher range of VC additives, ranging from 4% to 10%. The cells were similar to those in examples 1 and 2, with the same anode material (fibres) charged to 1200 mAhr/g except that the anode coat weight was higher. The results are shown in FIG. 4, where the plots indicate the following percentages of VC additive:
 4% VC
 6% VC
 8% VC
 10% VC As can be seen from FIG. 4 the advantage of increased battery life falls off when 10% VC is added but is a maximum at about 6% VC.

Example 4

A batch of soft pack pair cells were made with the parameters listed in Table 1. In contrast to Examples 1-3, the silicon structured material in the anode was pillared particles made by etching metallurgical grade silicon particles of size 15-25 μm, as described above and in WO2009/010758. The resulting pillars attached to the particle cores had diameters of 80-200 nm and lengths of 1-5 μm and estimated fractional coverage of the particle core surface of 30-40%. The tests were conducted in the same way as already described except that, in each cycle, the cells were charged to a capacity of 600 mA hr g$^{-1}$ rather than 1200 mA hr g$^{-1}$ so as to lithiate only the pillars, and not the cores of the particles.

Figure 5:
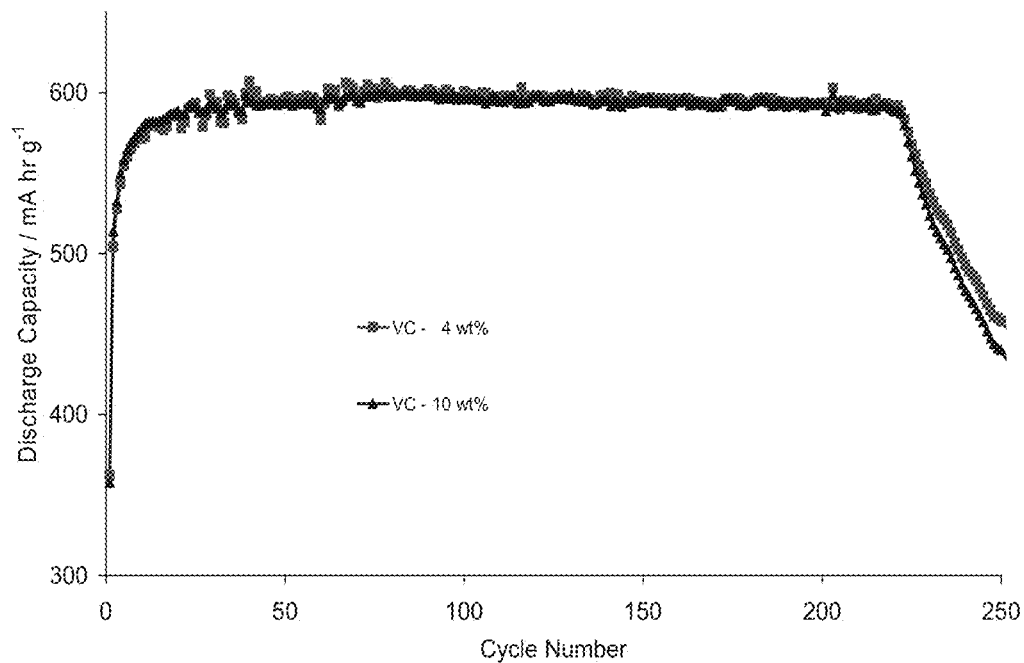
FIG. 5 is a graph showing the cycling of a lithium-ion cell containing an anode with silicon pillared particles and containing an electrolyte with 2% or 10% vinylene carbonate.

Tests were conducted on cells containing 4% and 10% of VC additive. The results are shown in FIG. 5. As can be seen the performance of the cell with 4% VC additive is not improved upon by increasing the VC additive to 10%. It is believed that, in these circumstances, a 4% VC additive level is sufficient to achieve the favourable surface reactions on the silicon and additional amounts of VC provide no further benefit.

Example 5

A batch of soft pack pair cells were made with the parameters listed in Table 1. The structured silicon active anode material was pillared particles as in Example 4. This time the cathodes were $Li_{1+x}Ni_{0.8}Co_{0.15}Al_{0.05}O_2$ and the binder used in the anode was polyacrylic acid (PAA).

Figure 6:
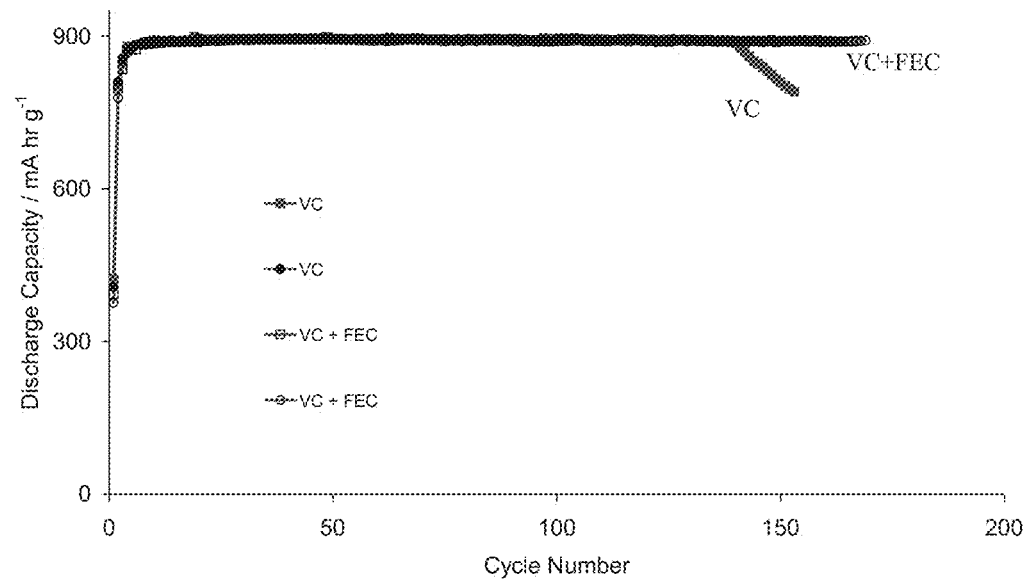
FIGS. 6-8 are plots showing the discharge capacity (FIG. 6), the efficiency (FIG. 7) and the end of charge voltage (FIG. 8) versus number of cycles by cycling of a lithium-ion cell having an anode comprising silicon pillared particles and (a) an electrolyte containing $LiPF_6$ and 5% vinylene carbonate and (b) an electrolyte containing $LiPF_6$, 5% vinylene carbonate and 5% FEC.
Figure 7:
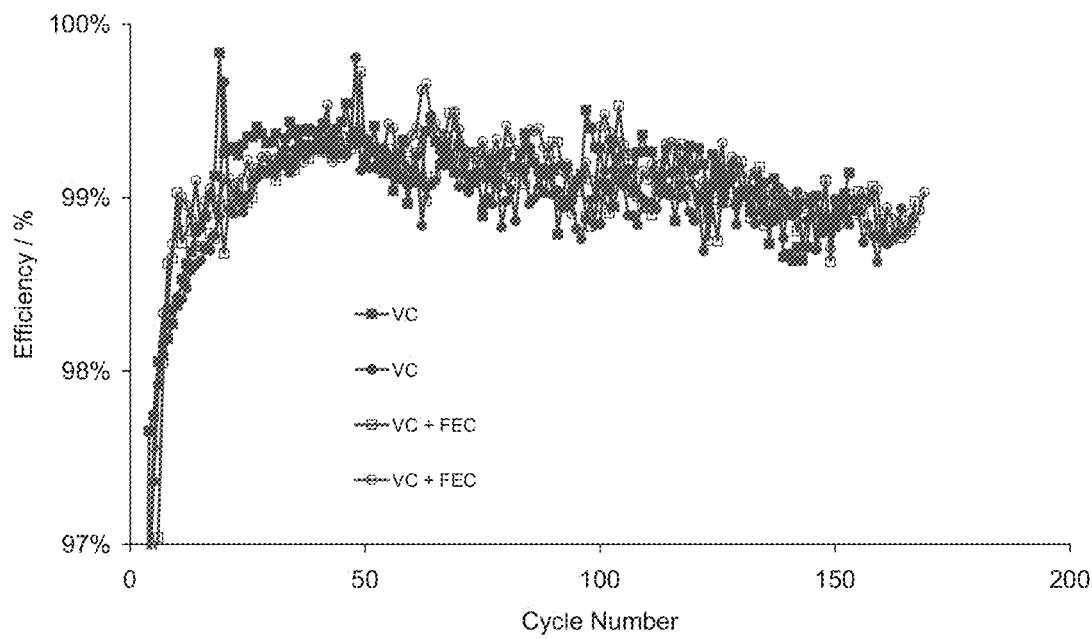
Figure 8:
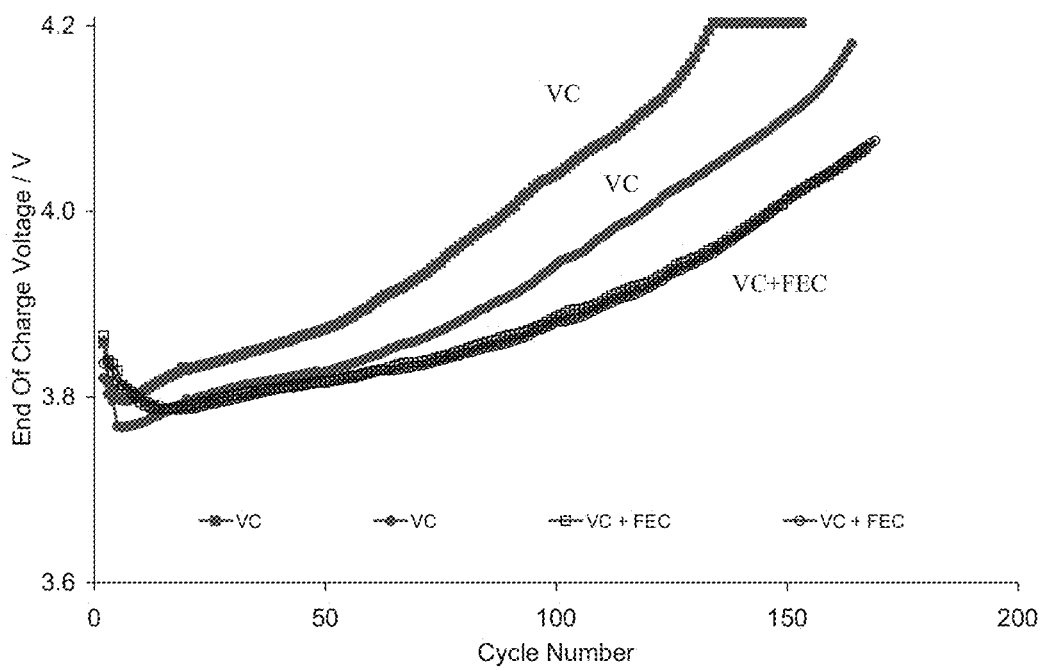

Tests were conducted on cells containing either 5% VC electrolyte additive only or a combination of 5% VC and 5% FEC electrolyte additives. The cells were charged to 900 mAhr/g. The results are shown in FIGS. 6, 7 and 8. FIG. 6 shows that the two cells containing 5% VC+5% FEC additives cycled better than the two cells containing only 5% VC additive. FIG. 7 plots the charge/discharge efficiency of the cells over all cycles. It shows that the running efficiencies are similar for all cells at around 99%. FIG. 8 plots the end of charge voltages of the cells for each cycle. A higher voltage indicates a higher internal cell resistance which in turns indicates lower levels of free lithium left in the cell. Once the end discharge voltage reaches the maximum limit (4.2V in this case) it indicates that the cell no longer has enough free lithium ions to enable it to be charged to it full charge capacity (900 mAhr/g in this case). FIG. 8 shows that the two cells with only 5% VC additive have run out of free lithium earlier than the two cells with 5% VC+5% FEC additives.

It is believed that the lower voltage in the 5% VC+5% FEC cells is due to one or more of the following effects: (a) the electrolyte has lower resistance, while maintaining the same running efficiency; (b) the SEI layer formed has a lower ionic resistance; (c) an increase in the proportion of the running loss that is due to reversible self-discharge, therefore causing the degree of delithiation of the cathode to increase more slowly.

Example 6

A batch of "Swagelok" cells were made with anodes comprising silicon fibres. The silicon fibres were fabricated by detaching pillars from etched 200-800 μm sized particles of metallurgical grade silicon (as described above and in WO2009/010758), the fibres having a diameter of 100-200 nm and a length of 10-40 μm. All cells had a $Li_{1+x}Ni_{0.8}Co_{0.15}Al_{0.05}O_2$ cathode. Half the cells had an electrolyte with 5% VC additive whilst the other half had electrolyte with 2% VC and 5% FEC additives and dissolved $CO_2$. The $CO_2$ was added by bubbling $CO_2$ gas through the electrolyte in the cell for 30 minutes before sealing the cell. It was calculated that 0.26 wt % of $CO_2$ (as a percentage of the total electrolyte weight) was thereby dissolved in the electrolyte.

Figure 9:
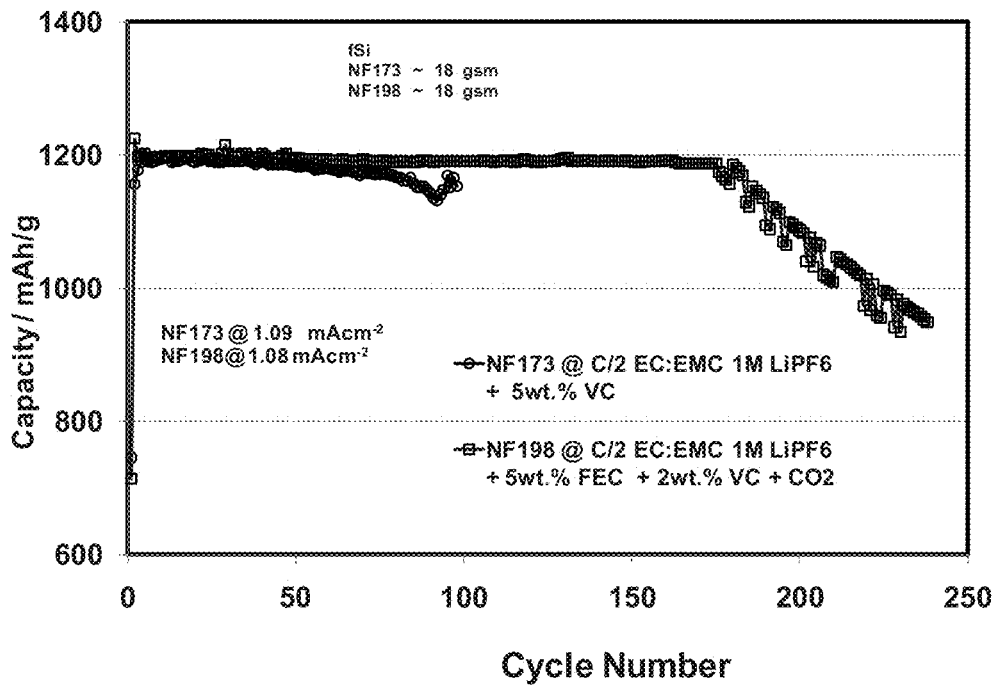
FIGS. 9-11 are plots showing the discharge capacity (FIG. 9), the efficiency (FIG. 10) and the end of charge voltage (FIG. 11) versus number of cycles by cycling of a lithium-ion cell having an anode comprising silicon fibres and (a) an electrolyte containing $LiPF_6$ and 5% vinylene carbonate and (b) an electrolyte containing $LiPF_6$, 2% vinylene carbonate, 5% FEC and into which an amount of $CO_2$ is initially dissolved.
Figure 10:
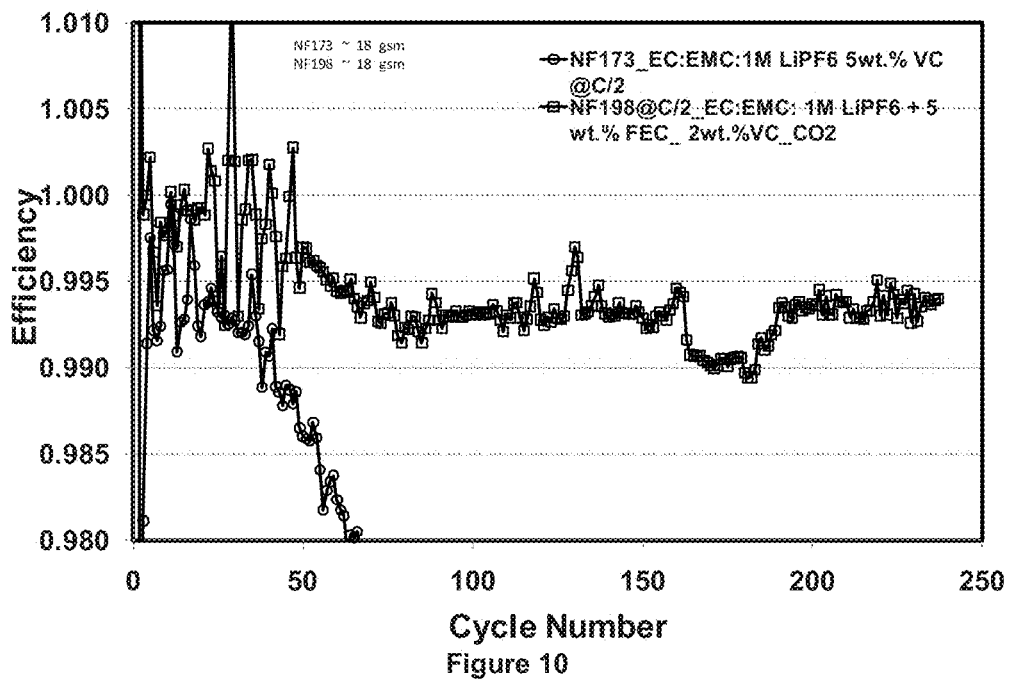
Figure 11:
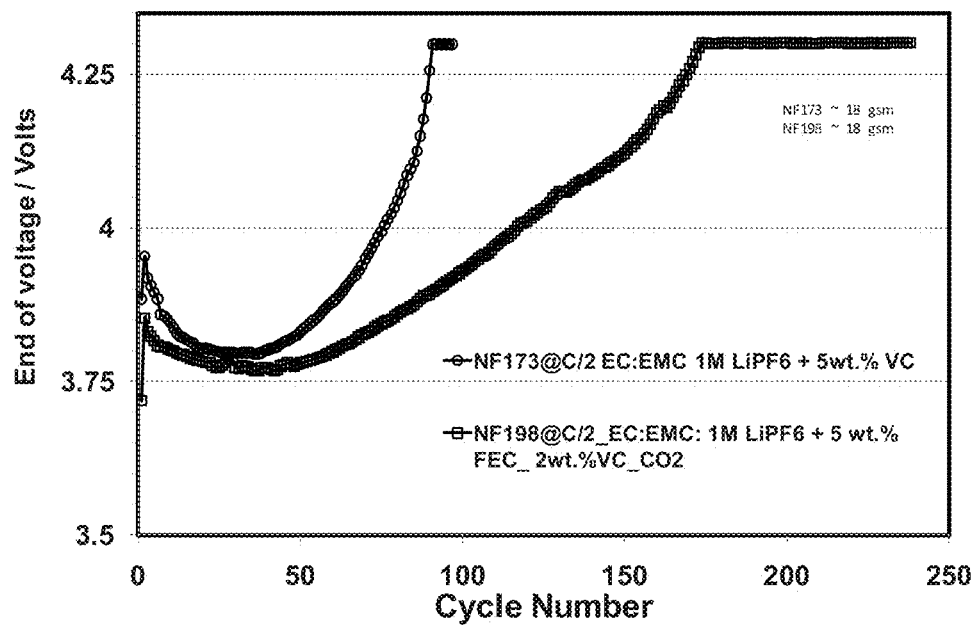

The cells were charged to 1200 mAh/g. FIGS. 9-11 show plots of the discharge capacity (FIG. 9), the efficiency (FIG. 10) and the end of charge voltage (FIG. 11) versus number of charge/discharge cycles for one cell of each additive combination, being indicative of the results for the full batch. In these plots, the cell with electrolyte containing $LiPF_6$ and 5% vinylene carbonate are indicated by the reference number NF173 and the cells with the same electrolyte but containing 5% FEC and 2% VC with dissolved $CO_2$ are indicated by reference number NF198. These results indicate that the cells containing 5% FEC, 2% VC and $CO_2$ show a markedly better performance than identical cells containing 5% VC only, providing more cycles at full capacity, higher efficiency and lower running lithium losses.

Example 7

A batch of "Swagelok" cells were made and tested. The anode and cathode materials were the same as for Example 6. Half the cells had an electrolyte containing $LiPF_6$ and 5% vinylene carbonate. The other half had the same electrolyte with 5% VC additive and, in addition, contained dissolved $CO_2$. The $CO_2$ was added as described in Example 6.

Figure 12:
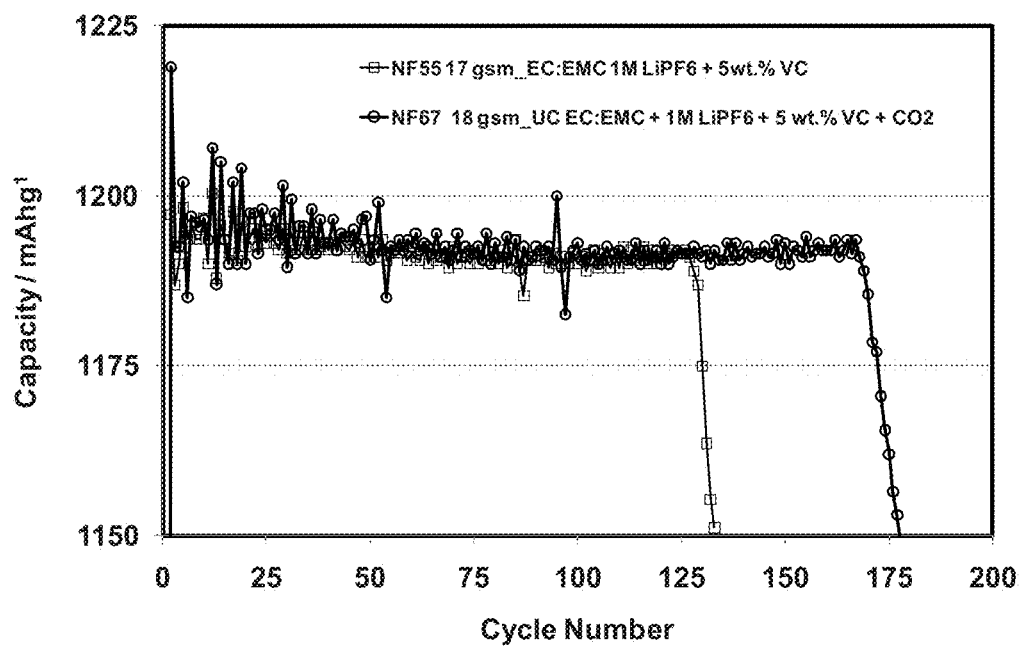
FIGS. 12-14 are plots showing the discharge capacity (FIG. 12), the efficiency (FIG. 13) and the end of charge voltage (FIG. 14) versus number of cycles by cycling of lithium-ion cells having an anode comprising of silicon fibres and (a) an electrolyte containing $LiPF_6$ and 5% vinylene carbonate and (b) an electrolyte containing $LiPF_6$, 5% vinylene carbonate and into which an amount of $CO_2$ is initially dissolved.
Figure 13:
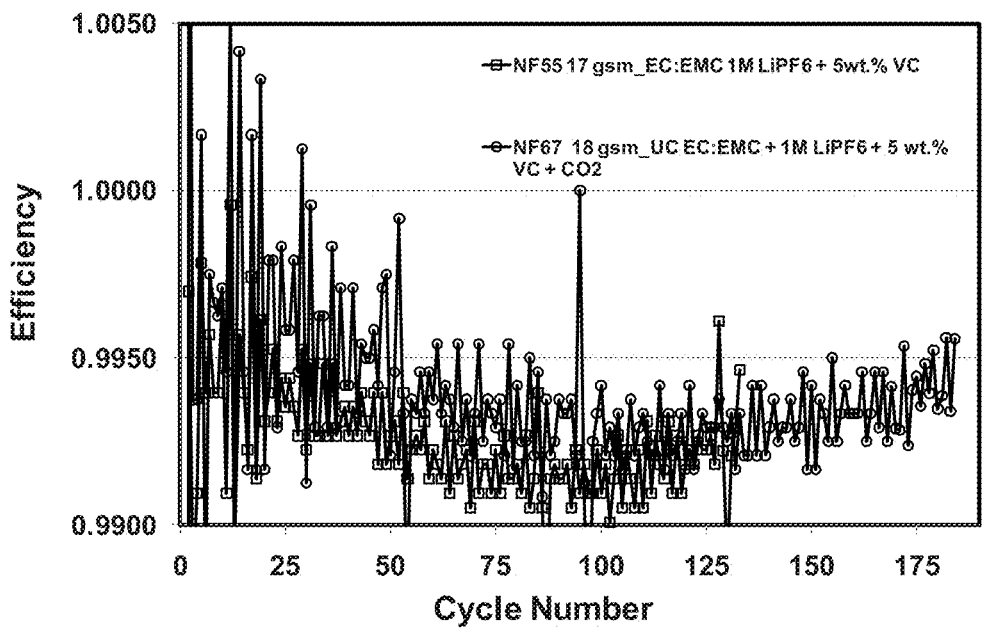
Figure 14:
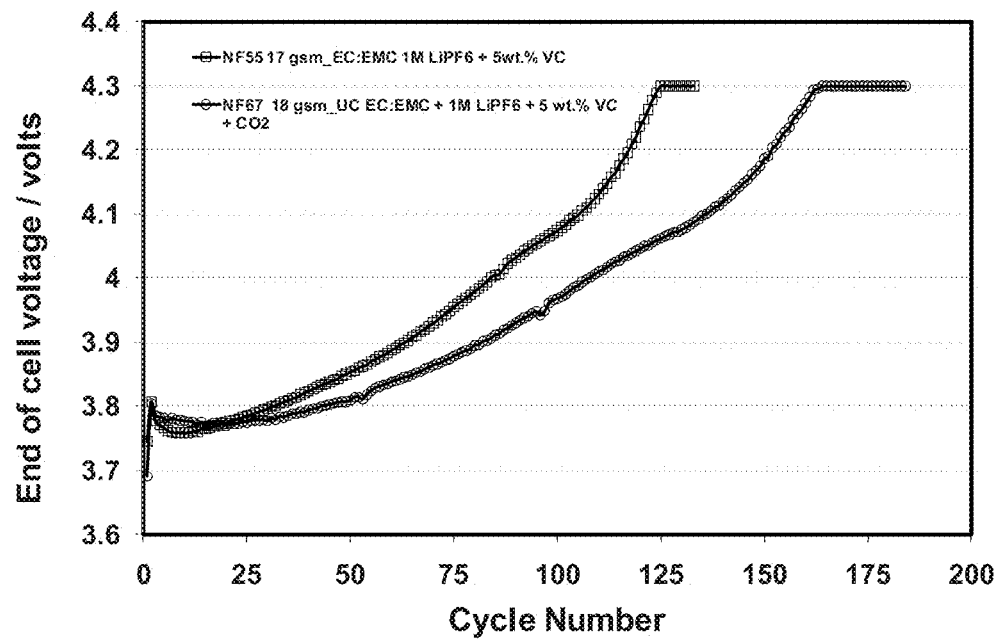

The cells were charged to just under 1200 mAh/g. FIGS. 12-14 show plots of the discharge capacity (FIG. 12), the efficiency (FIG. 13) and the end of charge voltage (FIG. 14) versus number of charge/discharge cycles. In these plots, the cells with electrolyte containing $LiPF_6$ and 5% vinylene carbonate are labelled with the reference number NF55 and the cells with the electrolyte containing $LiPF_6$ and 5% vinylene carbonate and $CO_2$ are labelled with reference number NF67. These results indicate that the cells containing of 5% VC+$CO_2$ show a better performance than identical cells containing 5% VC only.

Example 8

A batch of "Swagelok" cells were made and tested. The anode and cathode materials were the same as for Example 6. Half the cells had an electrolyte containing $LiPF_6$ and 5% FEC. The other half had the same electrolyte with 2% VC and 5% FEC additives and dissolved $CO_2$. The $CO_2$ was added as described in Example 6.

Figure 15:
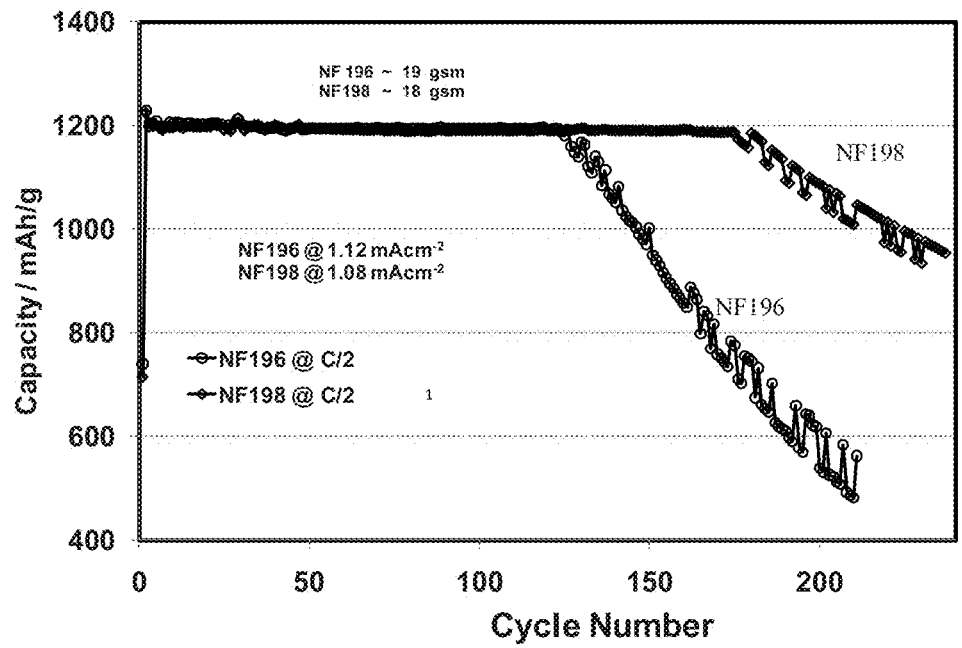
FIGS. 15-16 are plots showing the discharge capacity (FIG. 15) and the end of charge voltage (FIG. 16) versus number of cycles by cycling of a lithium-ion cell having an anode comprising silicon fibres and (a) an electrolyte containing $LiPF_6$ and 5% FEC and (b) an electrolyte containing $LiPF_6$, 2% vinylene carbonate, 5% FEC and into which an amount of $CO_2$ is initially dissolved.
Figure 16:
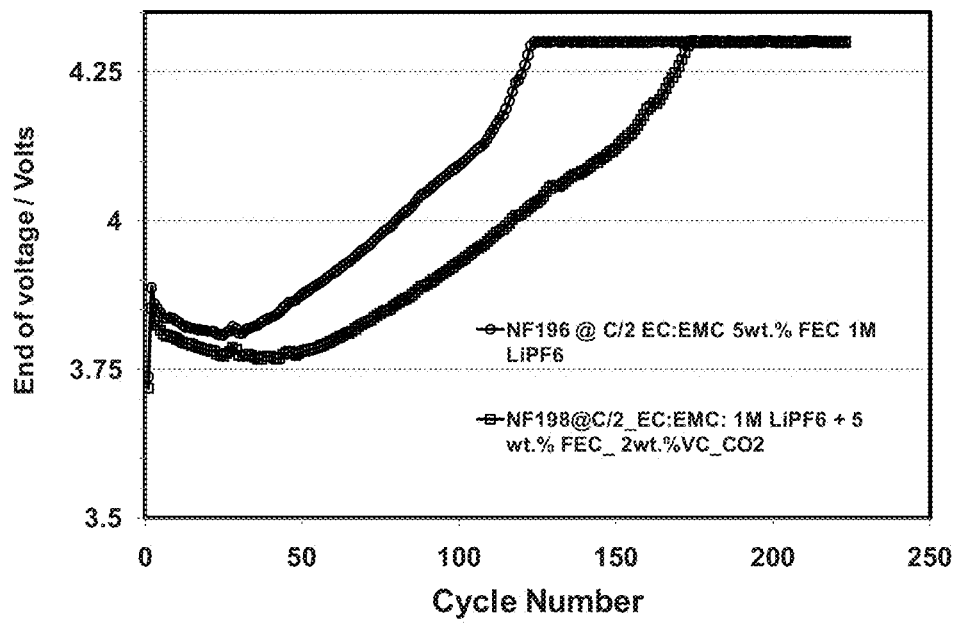

The cells were charged to 1200 mAh/g. FIGS. 15-16 show plots of the discharge capacity (FIG. 15) and the end of charge voltage (FIG. 16) versus number of charge/discharge cycles. In these plots, the cells with electrolyte containing $LiPF_6$ and 5% FEC are labelled with the reference number NF196 and the cells with the electrolyte containing $LiPF_6$ and 2% VC, 5% FEC and $CO_2$ are labelled with reference number NF198. These results indicate that the cells containing 2% VC+5% FEC+$CO_2$ show a better performance and have higher efficiency than identical cells containing 5% FEC only.

Example 9

A batch of "Swagelok" cells were made and tested. The anode and cathode materials were the same as for Example 6. Half the cells had an electrolyte containing LiPF6 and 3% VC+5% FEC and dissolved $CO_2$ (labelled as NF183). The other half had the same electrolyte with 3% VC+10% FEC and dissolved $CO_2$ (labelled as NF279). The $CO_2$ was added as described in Example 6.

Figure 17:
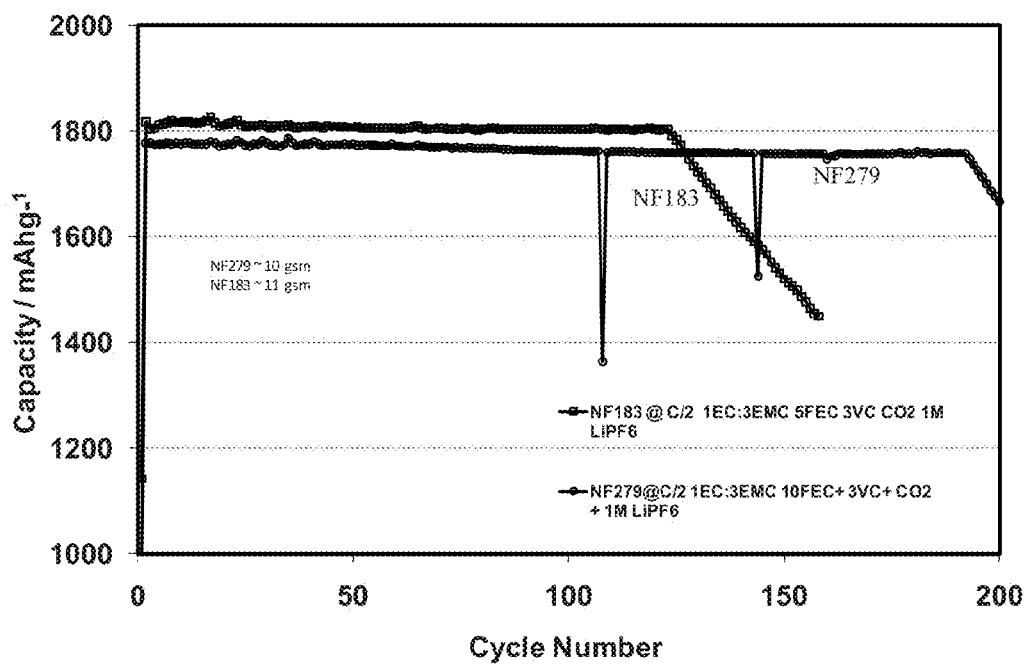
FIGS. 17-18 are plots showing the discharge capacity (FIG. 17) and the end of charge voltage (FIG. 18) versus number of cycles by cycling of a lithium-ion cell having an anode comprising silicon fibres and (a) an electrolyte containing LiPF6 and 3% VC+5% FEC and into which an amount of CO2 is initially dissolved and (b) an electrolyte containing LiPF6, 3% VC+10% FEC and into which an amount of CO2 is initially dissolved.
Figure 18:
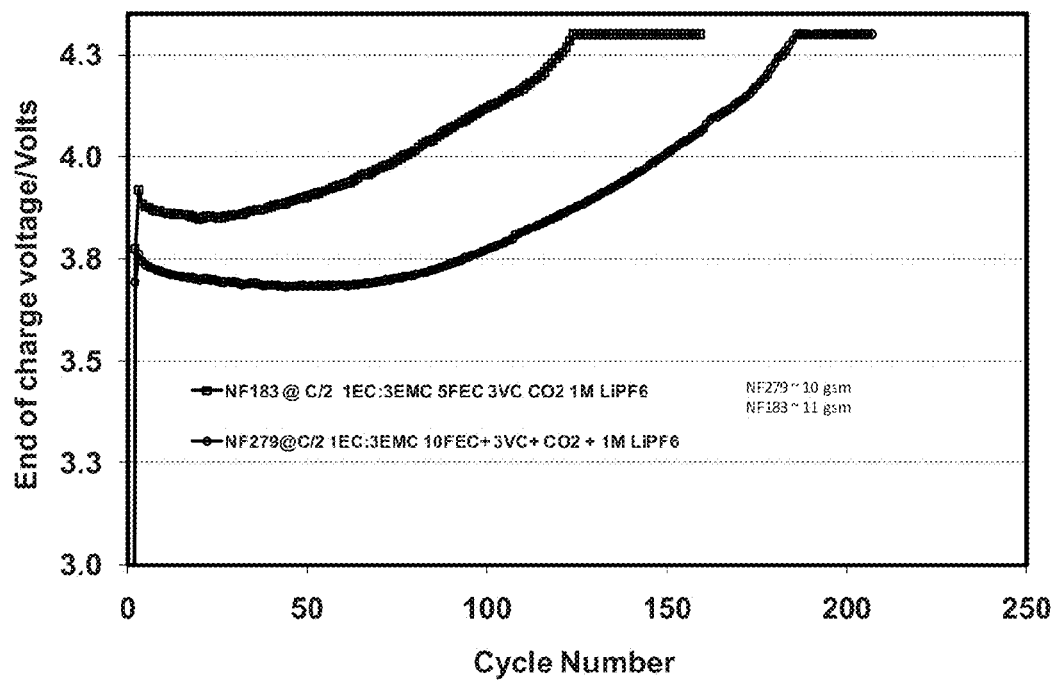

The cells were charged to 1200 mAh/g. FIGS. 17-18 show plots of the discharge capacity (FIG. 17) and the end of charge voltage (FIG. 18) versus number of charge/discharge cycles. These results indicate that the cells containing 10% FEC show a better performance and have higher efficiency than identical cells containing 5% FEC.

From the results above and other observations, we have found that for cells comprising structured silicon material in the anode:
(a) Using less than 3.5% VC as the sole additive has little effect (compare this with conventional graphite cells where typically 2 wt % VC is added). The best improvement for an additive in the form of VC alone appears with 5% VC. Much higher concentrations do not appear to bring significantly better results.
(b) Using 5% FEC on its own shows no improvement over the VC additive.
(c) Using a combined additive of 5% VC and 5% FEC in a cell provides better performance than a cell with 5% VC only or one with 5% FEC only.
(d) The addition of $CO_2$ to a cell with 5% VC shows an improved performance as compared to a similar cell but without the $CO_2$.
(e) Cells with 2% VC+5% FEC+$CO_2$ show a better performance than those with 5% VC only or those with 5% FEC only.
(f) Cells with 2% VC+10% FEC+$CO_2$ show a better performance than those with 2% VC+5% FEC+$CO_2$.

It is thought that the reduction of VC produces polyalkyl lithium carbonate species that suppress both solvent and anion reduction [Aurbach at al. Electrochimica Acta 47 (2002) 4445-4450]. It was found that the resistance of the SEI with VC is smaller than that without VC, suggesting that the presence of VC improves the permeation of lithium ion in the SEI film.

Although we do not wish to be bound by any particular theory, the synergistic effects of FEC, VC and $CO_2$ may be explained by the formation of a high quality of SEI phase with higher ionic conductivity, formed on the surface of silicon that can readily transport lithium ions. FEC is reduced at a more positive potential followed by the reduction of VC and $CO_2$ to form compact, protective and highly conductive SEI layer. In short, the resistance of the SEI phase on silicon in an electrolyte solution of 1EC:3EMC 1M LiPF6 10 wt. % FEC+3 wt. % VC and 0.28 wt. % of $CO_2$ may be lower than the electrolyte containing only one of the additives mentioned above.

Examples 10 to 14

Electrolytes containing various amounts of vinylene carbonate (VC), fluoroethylene ethyl carbonate (VEC) and CO2 were made up and used in several SW cells with the parameters outlined in Table 1. The active anode material in each cell was silicon pillared particles obtained by etching Silgrain® silicon powder having an average diameter of 25 µm in accordance with the methods set out in WO2009/010758, with the exception of one anode which comprised unetched silicon powder. All cells had a $Li_{1+x}Ni_{0.8}Co_{0.15}Al_{0.05}O_2$ cathode. The electrolyte comprised a $LiPF_6$ salt in a base solution of ethyl carbonate and ethyl methyl carbonate (in the ratio 30:70) or a base solution of fluoroethylene carbonate and ethyl methyl carbonate (in the ratio 30:70 or 50:50).

In a series of cycles, each cell was initially charged up to a capacity of 1200 mA·hr·g$^{-1}$ at C/50 and then discharged at the same rate. The cell was then cycled to 1200 mAh/g at a charge rate of C/2 to C/3. The reversible discharge capacity was measured and the results are shown

Example 10

Figure 19:
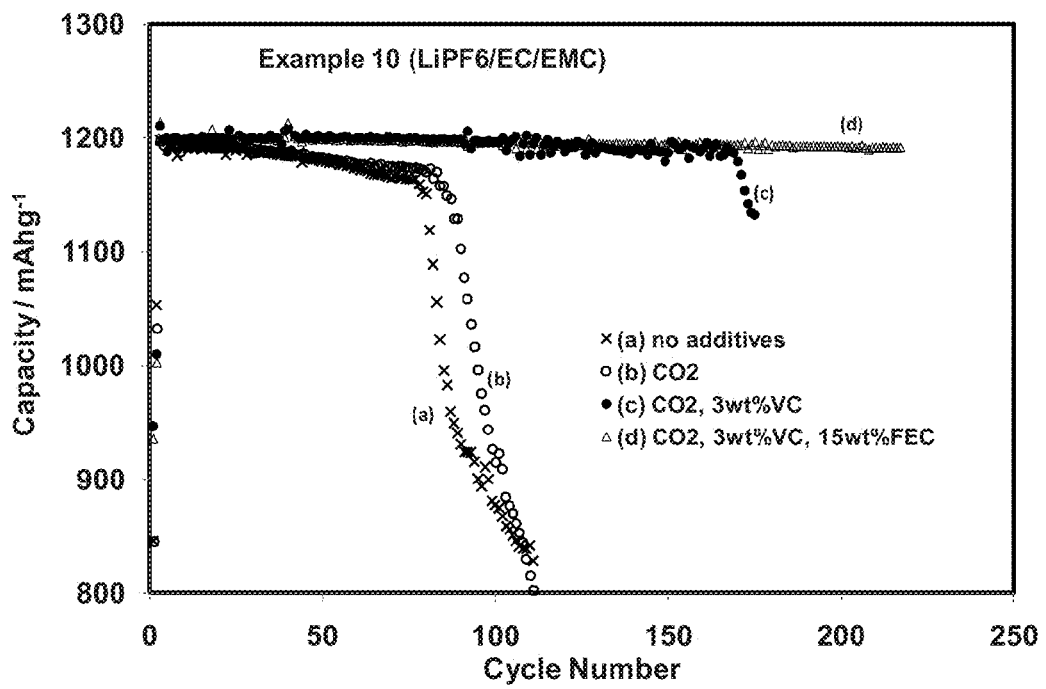
FIGS. 19 and 20 are plots showing the discharge capacity (FIG. 19) and the end of charge voltage (FIG. 20) versus number of cycles by cycling of a lithium-ion cell having an anode comprising pillared particles of silicon and (a) an electrolyte containing $LiPF_6$ and a solvent comprising a 30:70 mixture of ethyl carbonate and ethyl methyl carbonate (no additives) and (b) an electrolyte containing $LiPF_6$ and a solvent comprising a 30:70 mixture of ethyl carbonate and ethyl methyl carbonate and dissolved $CO_2$, (c) an electrolyte containing LiPF6 and a solvent comprising a 30:70 mixture of ethyl carbonate and ethyl methyl carbonate, dissolved $CO_2$ and 3 wt % vinylene carbonate (VC) (added to the 30:70 EC/EMC mixture) and (d) an electrolyte containing LiPF6 and a solvent comprising a 30:70 mixture of ethyl carbonate and ethyl methyl carbonate, dissolved $CO_2$, 3 wt % vinylene carbonate (VC) and 15 wt % fluoro ethylene carbonate (FEC) (added to the 30:70 EC/EMC mixture).
Figure 20:
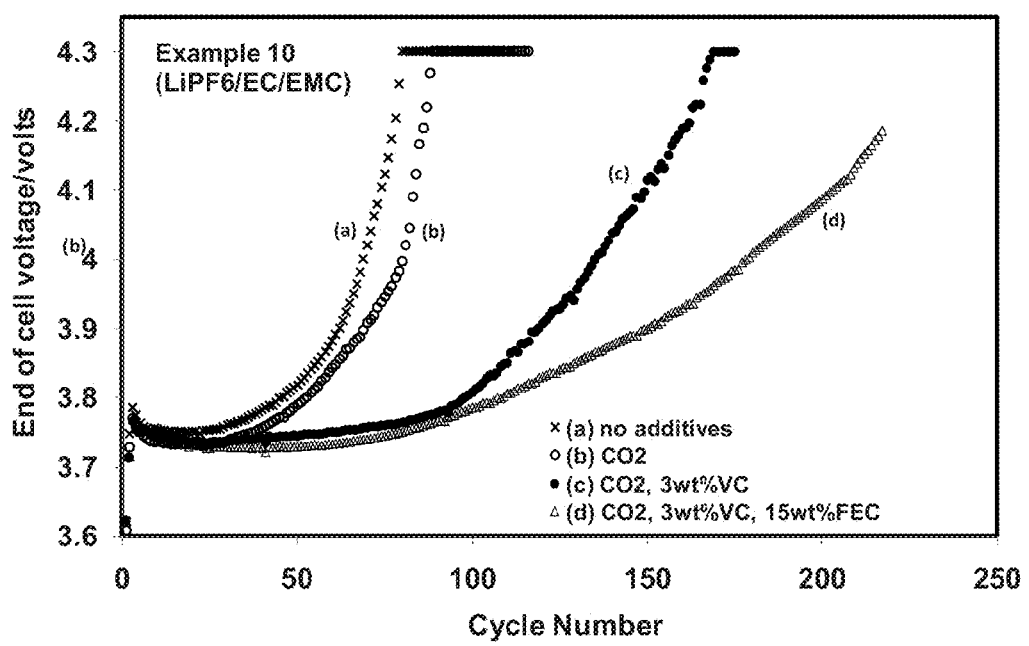

A batch of SW cells were prepared as described above. The electrolyte comprised $LiPF_6$ in a base solution of ethyl carbonate and ethyl methyl carbonate (in the ratio 30:70). A first cell (a) did not contain any additional electrolyte additives. A second cell (b) contained dissolved $CO_2$ as an electrolyte additive. Another cell (c) contained a mixture of dissolved $CO_2$ and 3 wt % VC as an electrolyte additive. Cell (d) contained a mixture of dissolved $CO_2$, 3 wt % VC and 15 wt % FEC as an electrolyte additive The cells were charged to 1200 mAh/g. FIGS. 19-20 show plots of the discharge capacity (FIG. 19) and the end of charge voltage (FIG. 20) versus number of charge/discharge cycles. These results indicate that cells (c) and (d) containing dissolved $CO_2$ and VC or dissolved $CO_2$, VC and FEC perform better than cells without additives or including only $CO_2$ as an additive.

Example 11

A batch of SW cells were fabricated as described above. The electrolyte comprised $LiPF_6$ in a base solution of ethyl carbonate and ethyl methyl carbonate (in the ratio 30:70). Two cells (a) and (b) contained dissolved $CO_2$, 3 wt % VC and 15 wt % FEC as an electrolyte additive. Cells (c) and (d) contained dissolved $CO_2$, 3 wt % VC and 30 wt % FEC as an electrolyte additive.

Figure 21:
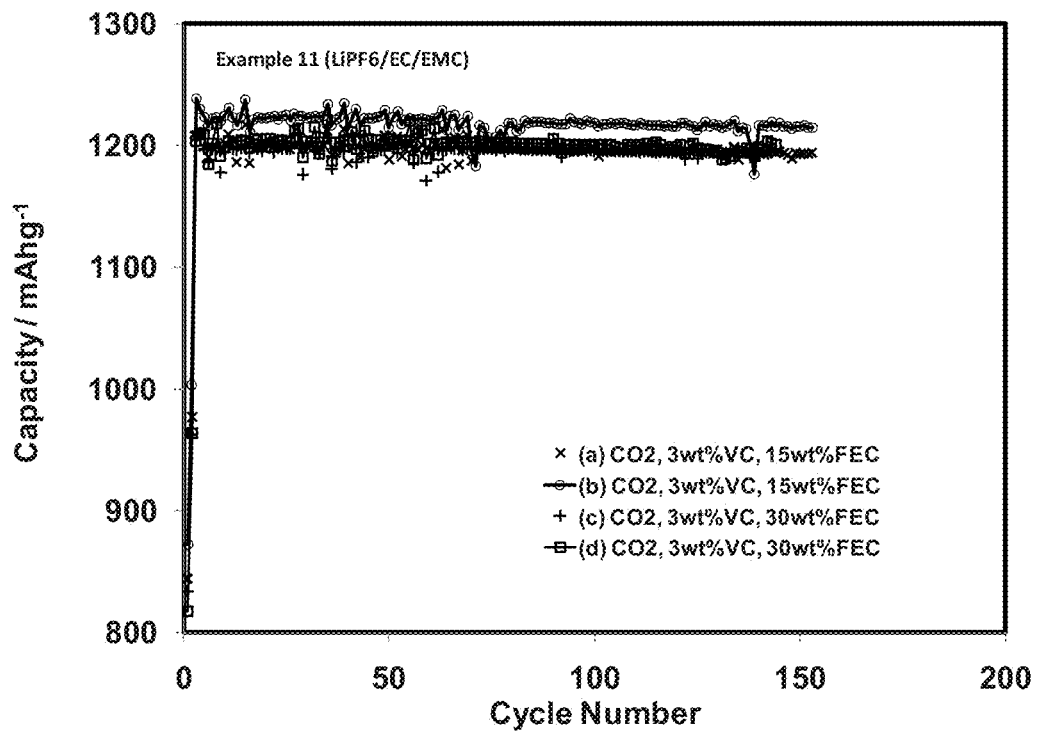
FIGS. 21 and 22 are plots showing the discharge capacity (FIG. 21) and the end of charge voltage (FIG. 22) versus number of cycles by cycling of a lithium-ion cell having an anode comprising pillared particles of silicon and (a) and (b) an electrolyte containing LiPF6 and a solvent comprising a 30:70 mixture of ethyl carbonate and ethyl methyl carbonate and having as additives dissolved $CO_2$, 3 wt % vinylene carbonate (VC) and 15 wt % fluoroethylene carbonate and (c) and (d) an electrolyte containing LiPF6 and a solvent comprising a 30:70 mixture of ethyl carbonate and ethyl methyl carbonate and having as additives dissolved $CO_2$, 3 wt % vinylene carbonate (VC) and 30 wt % fluoroethylene carbonate.
Figure 22:
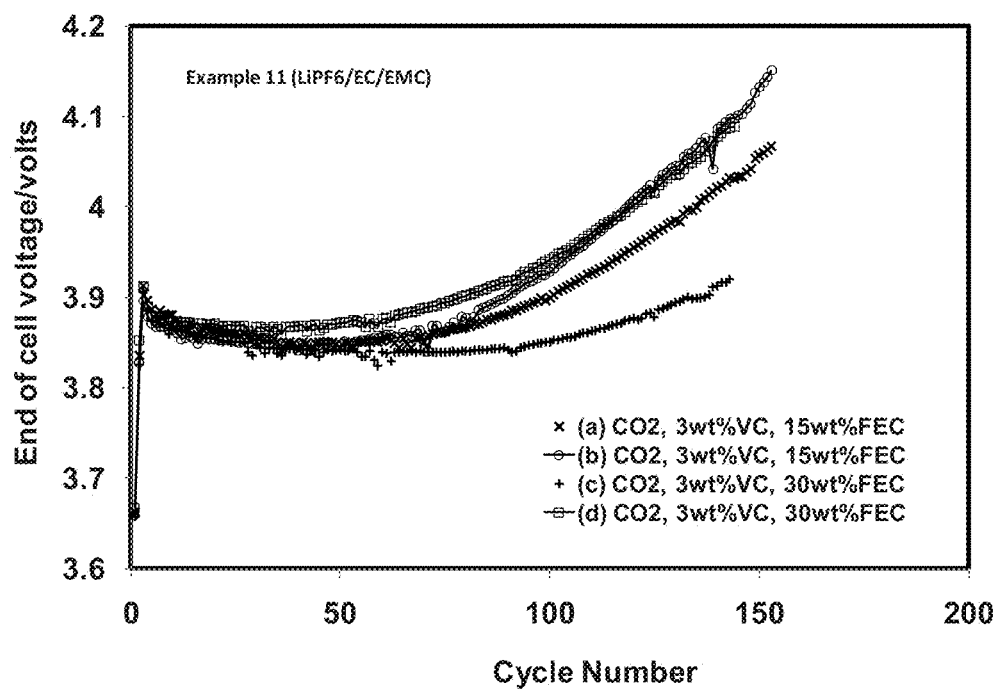

The cells were charged to 1200 mAh/g. FIGS. 21-22 show plots of the discharge capacity (FIG. 21) and the end of charge voltage (FIG. 22) versus number of charge/discharge cycles. These results indicate that there is very little difference between the performance of these cells over at least 150 cycles.

Example 12

A batch of SW cells were prepared as described above. The electrolyte comprised $LiPF_6$ in a base solution of (a) and (b)

fluoroethylene carbonate and ethyl methyl carbonate in the ratio 30:70 and having dissolved $CO_2$ and 3 wt % VC as electrolyte additives and (c) and (d) fluoroethylene carbonate and ethyl methyl carbonate in the ratio 50:50 and having dissolved $CO_2$ and 3 wt % VC as electrolyte additives. After assembly the electrolyte in cells (a) and (b) contained 31.5 wt % fluoroethylene carbonate and the electrolyte in cells (c) and (d) contained 52.5 wt % fluoroethylene carbonate.

Figure 23:
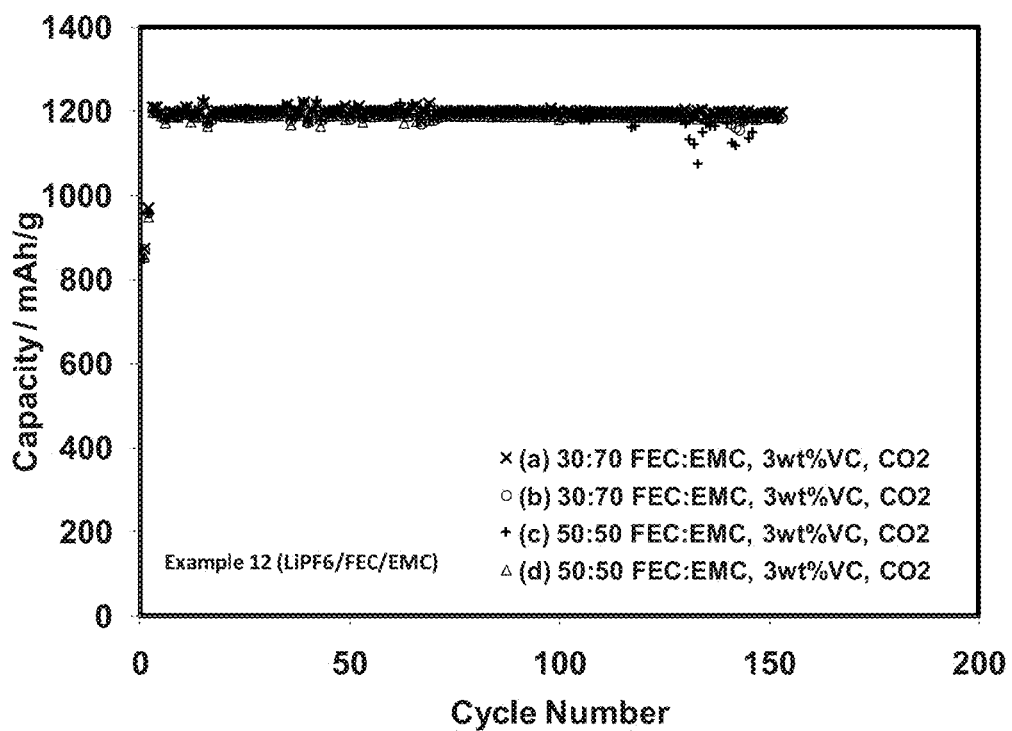
FIGS. 23 and 24 are plots showing the discharge capacity (FIG. 23) and the end of charge voltage (FIG. 24) versus number of cycles by cycling of a lithium-ion cell having an anode comprising pillared particles of silicon and (a) and (b) an electrolyte containing LiPF6 and a solvent comprising a 30:70 mixture of fluoroethylene carbonate and ethyl methyl carbonate and having as additives dissolved $CO_2$ and 3 wt % vinylene carbonate (VC) and (c) and (d) an electrolyte containing LiPF6 and a solvent comprising a 50:50 mixture of fluoroethylene carbonate and ethyl methyl carbonate and having as additives dissolved $CO_2$ and 3 wt % vinylene carbonate (VC).
Figure 24:
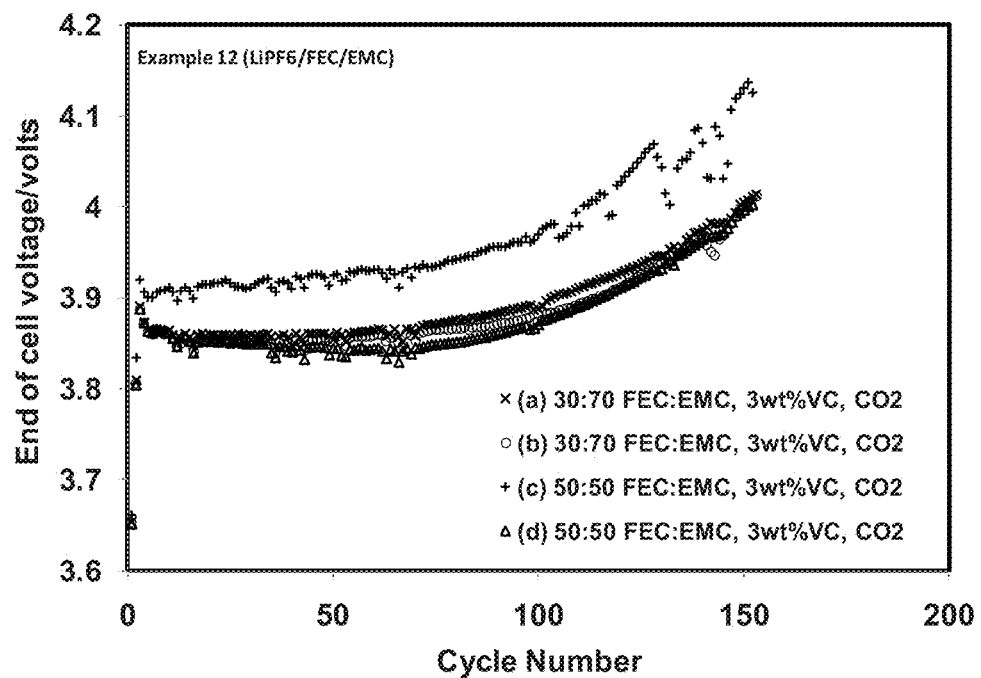

The cells were charged to 1200 mAh/g. FIGS. 23-24 show plots of the discharge capacity (FIG. 23) and the end of charge voltage (FIG. 24) versus number of charge/discharge cycles. These results indicate that there is very little difference between the performance of these cells over at least 150 cycles.

Example 13

A batch of SW cells were prepared as described above. The electrolyte comprised $LiPF_6$ in a base solution of (a) and (b) fluoroethylene carbonate and ethyl methyl carbonate (30:70) and having no additives dissolved therein and (c) and (d) $LiPF_6$ in a base solution of fluoroethylene carbonate and ethyl methyl carbonate (30:70) and having 3 wt % VC as an additive.

Figure 25:
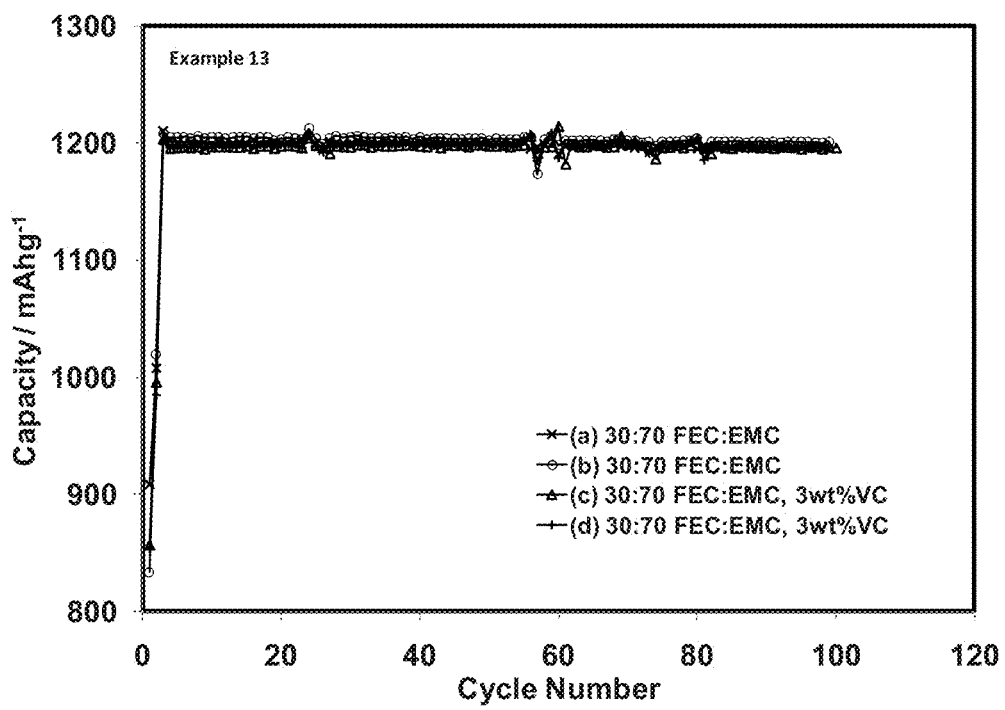
FIGS. 25 and 26 are plots showing the discharge capacity (FIG. 27) and the end of charge voltage (FIG. 28) versus number of cycles by cycling of a lithium-ion cell having an anode comprising pillared particles of silicon and (a) and (b) an electrolyte containing $LiPF_6$ and a solvent comprising a 30:70 mixture of fluoroethylene carbonate and ethyl methyl carbonate (no additives) (c) and (d) an electrolyte containing $LiPF_6$ and a solvent comprising a 30:70 mixture of fluoroethylene carbonate and ethyl methyl carbonate and having as an additive 3 wt % vinylene carbonate.
Figure 26:
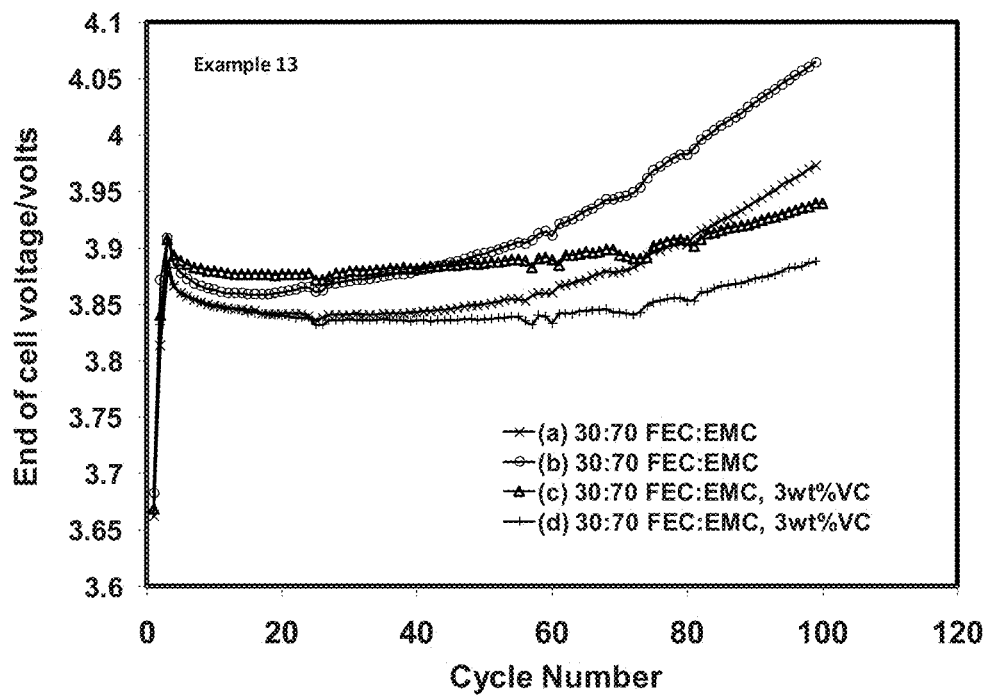

The cells were charged to 1200 mAh/g. FIGS. 25-26 show plots of the discharge capacity (FIG. 25) and the end of charge voltage (FIG. 26) versus number of charge/discharge cycles. There appears to be little difference in the performance of these cells up to 80 cycles from the data of FIG. 25, but the slopes of the voltage vs cycle number curves for cells (c) and (d) are lower than those for cells (a) and (b) at 100 cycles which indicates that cells (c) and (d) will be expected to cycle for longer than cells (a) and (b).

Example 14

An SW cell was prepared using powdered silicon having an average diameter of 25 μm (Elkem Silgrain® silicon powder) and an electrolyte solution comprising 1M LiPF6 in an electrolyte solution comprising a 30:70 mixture of ethyl carbonate (EC) and ethyl methyl carbonate (EMC) having as additives dissolved CO2, 5 wt % FEC and 2 wt % VC.

A further SW cell was prepared using silicon pillared particles having an average diameter of 25 μm (made by etching 25 μm sized particles of metallurgical grade silicon (as described above and in WO2009/010758) to give pillared particles having an array of silicon pillars of average length 3 μm and average diameter 200 nm on a silicon core) and an electrolyte solution comprising 1M LiPF6 in an electrolyte solution comprising a 30:70 mixture of ethyl carbonate (EC) and ethyl methyl carbonate (EMC) having as additives dissolved CO2, 10 wt % FEC and 2 wt % VC. Both cells had an anode coat weight of 12 gsm.

Figure 27:
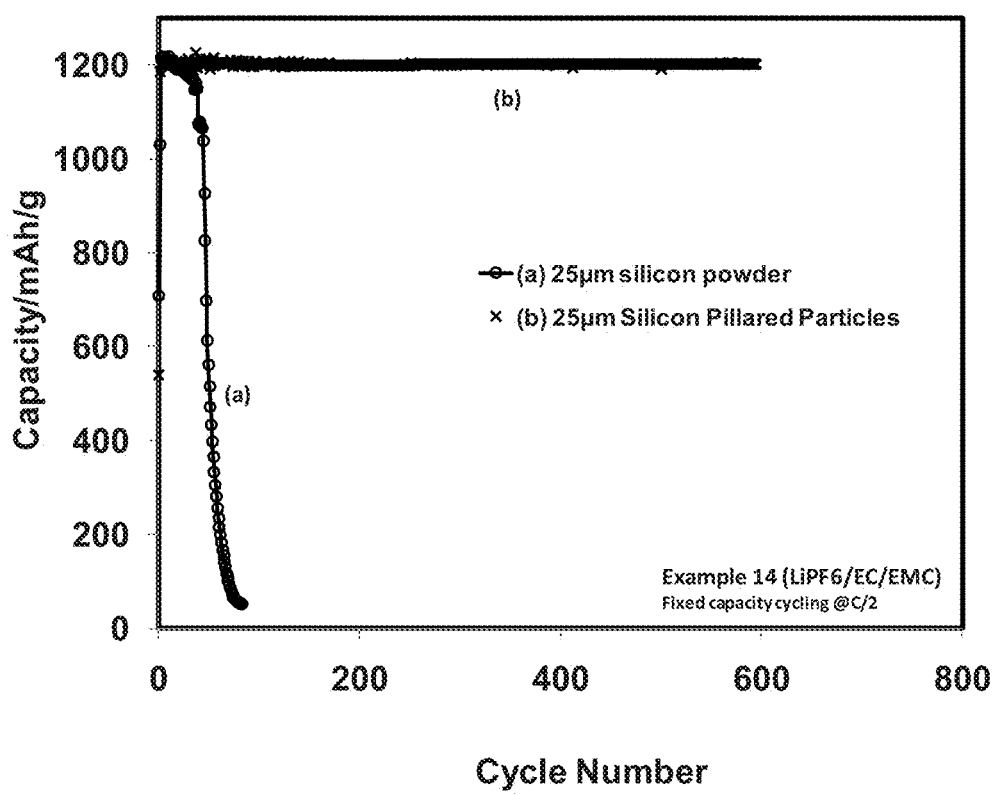
FIG. 27 is a plot showing the discharge capacity versus number of cycles of a battery comprising as an electrolyte composition $LiPF_6$ in a 30:70 mixture of EC and EMC and having as additives dissolved $CO_2$ and 2 wt % VC in which (a) the structured silicon is powdered silicon having an average diameter of 25 μm and the electrolyte further contains 5 wt % FEC as additive and (b) the structured silicon includes pillared particles of silicon having an average diameter of 25 μm and the electrolyte further contains 10 wt % FEC as additive.

The cells were charged to 1200 mAh/g. FIG. 27 shows the plot of the discharge capacity versus number of charge/discharge cycles. It can be seen that the anode prepared using silicon pillared particles could be cycled in excess of 600 cycles—the low coat weight enabled a higher number of cycles than an equivalent cell with higher coat weight. Anodes prepared from powered silicon particles failed at around 50 cycles.

It is believed that this combination of additives when used with an anode mainly comprising structured silicon material results in an improved quality of the SEI layer formed during the first cycle on the silicon surface and also helps to maintain a beneficial SEI structure during the subsequent cell charge/discharge cycles.

In the above examples, some or all of the FEC may be substituted by DFEC.

The invention claimed is:

1. A lithium ion rechargeable battery cell comprising:
   an anode comprising electroactive material-containing particles wherein the electroactive material is selected from one or more of silicon, germanium and tin;
   a cathode comprising an active material adapted to incorporate lithium and also to liberate lithium electrochemically, wherein the anode is adapted to incorporate lithium during lithiation; and
   an electrolyte;
   wherein the electrolyte comprises both a cyclic carbonate including a vinyl group and a fluorinated cyclic carbonate, wherein the total amount of the cyclic carbonate including a vinyl group and the fluorinated cyclic carbonate together is in the range 3.5 wt % to 70 wt % based on the total weight of the electrolyte solution.

2. A lithium ion rechargeable battery cell as claimed in claim 1 wherein the electroactive material-containing particles comprise fibres with a diameter of 10-500 nm and length of 1-150 μm, such fibres optionally being provided in the form of a scaffold or felt comprising such fibres.

3. A lithium ion rechargeable battery cell as claimed in claim 1, wherein the electroactive material-containing particles comprise tubes with a wall thickness of ≥10 nm and length of ≥1 μm.

4. A lithium ion rechargeable battery cell as claimed in claim 1, wherein the electroactive material-containing particles comprise ribbons with a thickness of 50-200 nm, a width of 500 nm to 1 μm and a length of ≥1 μm or felts comprising such ribbons.

5. A lithium ion rechargeable battery cell as claimed in claim 1, wherein the electroactive material-containing particles comprise flakes with a thickness of 50-200 nm and the two other dimensions in the range of 1-20 μm.

6. A lithium ion rechargeable battery cell as claimed in claim 1, wherein the electroactive material-containing particles comprise particles having a particle core and a plurality of silicon-containing structural elements attached thereto, wherein the structural elements comprise pillars, rods or nanowires having a diameter of no more than 1000 nm.

7. A lithium ion rechargeable battery cell as claimed in claim 1, wherein the electroactive material-containing particles comprise silicon-containing porous particles, each particle having a network of voids or pores extending therethrough.

8. A lithium ion rechargeable battery cell as claimed in claim 7 wherein at least some of the walls between adjacent pores have a thickness of ≥10 nm and extend over a length of ≥100 nm, and wherein the diameter of the porous particles is 1-30 μm.

9. A lithium ion rechargeable battery cell as claimed in claim 1, wherein at least some of the electroactive material-containing particles are carbon coated.

10. A lithium ion rechargeable battery cell as claimed in claim 1, wherein the electroactive material-containing particles comprise silicon with a purity of 90-99.990% by weight.

11. A lithium ion rechargeable battery cell as claimed in claim 1, wherein substantially all the electroactive material-containing particles in the anode comprise silicon.

12. A lithium ion rechargeable battery cell according to claim 1, wherein the electrolyte comprises from about 2% to about 50% by weight of a cyclic carbonate including a vinyl group.

13. A lithium ion rechargeable battery cell according to claim 1, wherein the cyclic carbonate including a vinyl group comprises vinylene carbonate.

14. A lithium ion rechargeable battery cell according to claim 1, wherein the fluorinated cyclic carbonate comprises fluoroethylene carbonate, difluoroethylene carbonate or a mixture thereof.

15. A lithium ion rechargeable battery cell as claimed in claim 1, wherein the electrolyte initially includes 0.05 to 0.25 wt % dissolved $CO_2$.

16. A lithium ion rechargeable battery cell according to claim 1 wherein the cyclic carbonate including a vinyl group comprises vinylene carbonate and the fluorinated cyclic carbonate comprises fluoroethylene carbonate, difluoroethylene carbonate or a mixture thereof.

17. A lithium ion rechargeable battery cell according to claim 1, wherein the electrolyte solution further comprises a $C_{1-8}$ chain carbonate, selected from one or more of dimethylcarbonate, diethyl carbonate, and ethyl methyl carbonate, wherein the ratio of the cyclic carbonate (including a cyclic carbonate including a vinyl group and/or a fluorinated cyclic carbonate) to the $C_{1-8}$ chain carbonate is in the range 30:70 to 50:50.

18. A lithium ion rechargeable battery cell according to claim 1, wherein the electrolyte solution further comprises a cyclic carbonate other than a cyclic carbonate including a vinyl group or a fluorinated cyclic carbonate, wherein the cyclic carbonate is selected from one or more of the group comprising ethylene carbonate, propylene carbonate, and butylene carbonate.

19. A lithium ion rechargeable battery cell according to claim 1 wherein the electroactive material-containing particles comprise silicon and wherein the electrolyte comprises 1 to 8 wt % of a cyclic carbonate containing a vinyl group and, at least 3 wt % of a fluorinated cyclic carbonate.

20. A lithium ion rechargeable battery cell according to claim 1, wherein the electrolyte further comprises an electrolyte salt, wherein the electrolyte salt is dissolved in the electrolyte solution to a concentration of between 0.7 to 2M, wherein the electrolyte comprises one or a mixture of lithium containing electrolyte salts selected from the group comprising $LiPF_6$, LiBOB, $LiClO_4$ or a mixture thereof.

21. A lithium ion rechargeable battery cell as claimed in claim 1, wherein the anode comprises a porous composite comprising the electroactive material-containing particles and at least one other component selected from: another active material that can reversibly react electrochemically with lithium, a binder, a conductive material, a viscosity adjuster, a filler or a coupling agent.

22. A lithium ion rechargeable battery cell according to claim 1 wherein the structured electroactive material-containing particles have a smallest dimension of at least 10 nm and a largest diameter that is less than 60 µm.

* * * * *